(12) United States Patent
Brown et al.

(10) Patent No.: US 12,087,997 B2
(45) Date of Patent: Sep. 10, 2024

(54) ANTENNA SYSTEMS FOR CONTROLLED COVERAGE IN BUILDINGS

(71) Applicant: View, Inc., Milpitas, CA (US)

(72) Inventors: Stephen Clark Brown, San Mateo, CA (US); John Sanford, Escondido, CA (US); Erich R. Klawuhn, Santa Barbara, CA (US); Dhairya Shrivastava, Los Altos, CA (US); Robert T. Rozbicki, Saratoga, CA (US); Daniel Loy Purdy, Benicia, CA (US); Todd Daniel Antes, San Jose, CA (US); Todd Gray, Wilmington, DE (US)

(73) Assignee: View, Inc., San Jose, CA (US)

( * ) Notice: Subject to any disclaimer, the term of this patent is extended or adjusted under 35 U.S.C. 154(b) by 0 days.

(21) Appl. No.: 17/609,671

(22) PCT Filed: May 9, 2020

(86) PCT No.: PCT/US2020/032269
§ 371 (c)(1),
(2) Date: Nov. 8, 2021

(87) PCT Pub. No.: WO2020/227702
PCT Pub. Date: Nov. 12, 2020

(65) Prior Publication Data
US 2022/0231399 A1   Jul. 21, 2022

Related U.S. Application Data

(60) Provisional application No. 62/850,993, filed on May 21, 2019, provisional application No. 62/845,764, filed on May 9, 2019.

(51) Int. Cl.
*H01Q 1/12*   (2006.01)
*H01Q 1/00*   (2006.01)
(Continued)

(52) U.S. Cl.
CPC ........... *H01Q 1/1221* (2013.01); *H01Q 1/007* (2013.01); *H04B 7/15507* (2013.01); *H04W 84/047* (2013.01)

(58) Field of Classification Search
CPC ....... H01Q 1/1221; H01Q 1/007; H01Q 1/241
See application file for complete search history.

(56) References Cited

U.S. PATENT DOCUMENTS 4,129,861 A   12/1978   Giglia
4,553,085 A   11/1985   Canzano
(Continued)

FOREIGN PATENT DOCUMENTS

AU   2012209352 A1   8/2013
CN   1161092 A   10/1997
(Continued)

OTHER PUBLICATIONS

AGC, Inc., "AGC completes development of 5G-compatible 'Glass Antenna that adds cellular base station capabilities to windows,'" Press Release, Jun. 3, 2020, 2 pp.
(Continued)

*Primary Examiner* — Hoang V Nguyen
(74) *Attorney, Agent, or Firm* — Weaver Austin Villeneuve & Sampson LLP; Brian D. Griedel

(57) ABSTRACT

Antenna systems for controlled coverage in buildings are disclosed where a data communications network in a building includes one or more external antennas. At least one of the external antennas is disposed on a roof or exterior of the building disposed in or associated with a window, a sky sensor or a digital architectural element. The one or more external antennas are coupled to a network infrastructure of the building via one or more data carrying lines and/or wireless links and are configured for communication with an external wireless network. The network infrastructure
(Continued)

includes one or more data carrying lines, one or more network switches, and at least one control panel. In some embodiments, at least one of the external antennas is configured for communication with an external wireless network.

33 Claims, 35 Drawing Sheets

(51) Int. Cl.
*H04B 7/155* (2006.01)
*H04W 84/04* (2009.01)

(56) References Cited

U.S. PATENT DOCUMENTS

| | | |
|---|---|---|
| 4,864,314 A | 9/1989 | Bond |
| 4,874,903 A | 10/1989 | Clarke |
| 4,932,755 A | 6/1990 | Holdridge et al. |
| 5,139,850 A | 8/1992 | Clarke et al. |
| 5,147,694 A | 9/1992 | Clarke |
| 5,202,788 A | 4/1993 | Weppner |
| 5,384,653 A | 1/1995 | Benson et al. |
| 5,416,617 A | 5/1995 | Loiseaux et al. |
| 5,440,317 A | 8/1995 | Jalloul et al. |
| 5,477,152 A | 12/1995 | Hayhurst |
| 5,579,149 A | 11/1996 | Moret et al. |
| 5,867,495 A | 2/1999 | Elliott et al. |
| 5,959,586 A | 9/1999 | Benham et al. |
| 6,032,020 A | 2/2000 | Cook et al. |
| 6,039,390 A | 3/2000 | Agrawal et al. |
| 6,055,089 A | 4/2000 | Schulz et al. |
| 6,066,801 A | 5/2000 | Kodaira et al. |
| 6,089,721 A | 7/2000 | Schierbeek |
| 6,104,513 A | 8/2000 | Bloom |
| 6,128,471 A | 10/2000 | Quelch et al. |
| 6,262,831 B1 | 7/2001 | Bauer et al. |
| 6,294,111 B1 | 9/2001 | Shacklett, III et al. |
| 6,344,748 B1 | 2/2002 | Gannon |
| 6,407,847 B1 | 6/2002 | Poll et al. |
| 6,456,239 B1 | 9/2002 | Werb et al. |
| 6,567,708 B1 | 5/2003 | Bechtel et al. |
| 6,620,342 B1 | 9/2003 | Burchill et al. |
| 6,703,981 B2 | 3/2004 | Meitzler et al. |
| 6,707,590 B1 | 3/2004 | Bartsch |
| 6,795,226 B2 | 9/2004 | Agrawal et al. |
| 6,809,692 B2 | 10/2004 | Puente Baliarda et al. |
| 6,897,936 B1 | 5/2005 | Li et al. |
| 6,965,813 B2 | 11/2005 | Granqvist et al. |
| 7,133,181 B2 | 11/2006 | Greer |
| 7,391,420 B1 | 6/2008 | Coyne |
| 7,536,370 B2 | 5/2009 | Masurkar |
| 7,684,105 B2 | 3/2010 | Lamontagne et al. |
| 7,722,948 B2 | 5/2010 | Dixon et al. |
| 7,739,138 B2 | 6/2010 | Chauhan et al. |
| 7,800,812 B2 | 9/2010 | Moskowitz |
| 7,941,245 B1 | 5/2011 | Popat |
| 8,085,460 B2 | 12/2011 | Finley et al. |
| 8,099,140 B2 | 1/2012 | Arai |
| 8,149,756 B2 | 4/2012 | Hottinen |
| 8,213,074 B1 | 7/2012 | Shrivastava et al. |
| 8,254,013 B2 | 8/2012 | Mehtani et al. |
| 8,290,627 B2 | 10/2012 | Richards et al. |
| 8,614,848 B2 | 12/2013 | Ueda et al. |
| 8,634,764 B2 | 1/2014 | Cruz et al. |
| 8,705,162 B2 | 4/2014 | Brown et al. |
| 8,780,432 B1 | 7/2014 | Nguyen |
| 8,843,238 B2 | 9/2014 | Wenzel et al. |
| 8,924,076 B2 | 12/2014 | Boote et al. |
| 8,927,069 B1 | 1/2015 | Estinto et al. |
| 8,963,378 B1 | 2/2015 | Fornage et al. |
| 8,975,789 B2 | 3/2015 | Snyker et al. |
| 8,976,440 B2 | 3/2015 | Berland et al. |
| 9,081,246 B2 | 7/2015 | Rozbicki |
| 9,128,346 B2 | 9/2015 | Shrivastava et al. |
| 9,170,008 B2 | 10/2015 | Reul et al. |
| 9,225,286 B1 | 12/2015 | Tweedie |
| 9,300,581 B1 | 3/2016 | Hui et al. |
| 9,348,192 B2 | 5/2016 | Brown et al. |
| 9,442,338 B2 | 9/2016 | Uhm et al. |
| 9,442,341 B2 | 9/2016 | Shrivastava et al. |
| 9,454,055 B2 | 9/2016 | Brown et al. |
| 9,470,947 B2 | 10/2016 | Nagel et al. |
| 9,494,055 B2 | 11/2016 | Rusche |
| 9,551,913 B2 | 1/2017 | Kim et al. |
| 9,664,976 B2 | 5/2017 | Rozbicki |
| 9,677,327 B1 | 6/2017 | Nagel et al. |
| 9,690,174 B2 | 6/2017 | Wang |
| 9,709,869 B2 | 7/2017 | Baumann et al. |
| 9,740,074 B2 | 8/2017 | Agrawal et al. |
| 9,778,533 B2 | 10/2017 | Bertolini |
| 9,898,912 B1 | 2/2018 | Jordan, II et al. |
| 9,906,956 B1 | 2/2018 | Huang |
| 9,946,138 B2 | 4/2018 | Shrivastava et al. |
| 10,001,691 B2 | 6/2018 | Shrivastava et al. |
| 10,110,631 B2 | 10/2018 | Bauer et al. |
| 10,137,764 B2 | 11/2018 | Driscoll et al. |
| 10,153,845 B2 | 12/2018 | Ashrafi |
| 10,254,618 B2 | 4/2019 | Parker |
| 10,268,098 B2 | 4/2019 | Shrivastava et al. |
| 10,286,839 B1 | 5/2019 | Mazuir et al. |
| 10,288,971 B2 | 5/2019 | Phillips et al. |
| 10,299,101 B1 | 5/2019 | Lim et al. |
| 10,303,035 B2 | 5/2019 | Brown et al. |
| 10,329,839 B2 | 6/2019 | Fasi et al. |
| 10,387,221 B2 | 8/2019 | Shrivastava et al. |
| 10,409,652 B2 | 9/2019 | Shrivastava et al. |
| 10,481,459 B2 | 11/2019 | Shrivastava et al. |
| 10,488,837 B2 | 11/2019 | Cirino |
| 10,505,751 B2 | 12/2019 | Casilli |
| 10,514,963 B2 | 12/2019 | Shrivastava et al. |
| 10,532,268 B2 | 1/2020 | Tran et al. |
| 10,673,121 B2 | 6/2020 | Hughes et al. |
| 10,720,766 B2 | 7/2020 | Krammer et al. |
| 10,746,761 B2 | 8/2020 | Rayman et al. |
| 10,747,082 B2 | 8/2020 | Shrivastava et al. |
| 10,768,582 B2 | 9/2020 | Shrivastava et al. |
| 10,797,373 B2 | 10/2020 | Hughes et al. |
| 10,859,983 B2 | 12/2020 | Shrivastava et al. |
| 10,867,266 B1 | 12/2020 | Carlin et al. |
| 10,917,259 B1 | 2/2021 | Chein et al. |
| 10,921,675 B2 | 2/2021 | Barnum et al. |
| 10,949,267 B2 | 3/2021 | Shrivastava et al. |
| 10,954,677 B1 | 3/2021 | Scanlin |
| 10,956,231 B2 | 3/2021 | Shrivastava et al. |
| 10,969,645 B2 | 4/2021 | Rozbicki et al. |
| 10,989,977 B2 | 4/2021 | Shrivastava et al. |
| 11,016,357 B2 | 5/2021 | Brown et al. |
| 11,054,711 B2 | 7/2021 | Shrivastava et al. |
| 11,054,792 B2 | 7/2021 | Shrivastava et al. |
| 11,073,800 B2 | 7/2021 | Shrivastava et al. |
| 11,114,742 B2 | 9/2021 | Shrivastava et al. |
| 11,150,616 B2 | 10/2021 | Shrivastava et al. |
| 11,168,910 B2 | 11/2021 | Alcala Perez |
| 11,182,970 B1 | 11/2021 | Kathol |
| 11,205,926 B2 | 12/2021 | Shrivastava et al. |
| 11,294,254 B2 | 4/2022 | Patterson et al. |
| 11,342,791 B2 | 5/2022 | Rozbicki et al. |
| 11,384,596 B2 | 7/2022 | Shrivastava et al. |
| 11,436,061 B2 | 9/2022 | Shrivastava et al. |
| 11,462,814 B2 | 10/2022 | Hughes et al. |
| 11,566,468 B2 | 1/2023 | Vigano et al. |
| 11,579,571 B2 | 2/2023 | Shrivastava et al. |
| 11,630,366 B2 | 4/2023 | Shrivastava et al. |
| 11,670,833 B2 | 6/2023 | Hughes et al. |
| 11,681,197 B2 | 6/2023 | Shrivastava et al. |
| 11,687,045 B2 | 6/2023 | Shrivastava et al. |
| 11,732,527 B2 | 8/2023 | Rozbicki et al. |
| 11,733,660 B2 | 8/2023 | Shrivastava et al. |
| 11,740,948 B2 | 8/2023 | Shrivastava et al. |
| 11,750,594 B2 | 9/2023 | Vangati et al. |
| 11,754,902 B2 | 9/2023 | Brown et al. |
| 11,799,187 B2 | 10/2023 | Shrivastava et al. |

(56) References Cited

U.S. PATENT DOCUMENTS

| | | |
|---|---|---|
| 11,868,103 B2 | 1/2024 | Shrivastava et al. |
| 11,882,111 B2 | 1/2024 | Vangati et al. |
| 2001/0005083 A1 | 6/2001 | Serizawa et al. |
| 2002/0024424 A1 | 2/2002 | Burns et al. |
| 2002/0027504 A1 | 3/2002 | Davis et al. |
| 2002/0072868 A1 | 6/2002 | Bartone et al. |
| 2002/0109634 A1 | 8/2002 | Aisenbrey |
| 2002/0140611 A1 | 10/2002 | Ligander et al. |
| 2002/0149829 A1 | 10/2002 | Mochizuka et al. |
| 2003/0007462 A1 | 1/2003 | Makinen et al. |
| 2003/0034926 A1 | 2/2003 | Veerasamy |
| 2003/0098791 A1 | 5/2003 | Carlson et al. |
| 2003/0101154 A1 | 5/2003 | Hisano et al. |
| 2003/0112187 A1 | 6/2003 | Whitehouse |
| 2003/0169574 A1 | 9/2003 | Maruyama et al. |
| 2003/0191546 A1 | 10/2003 | Bechtel et al. |
| 2003/0227663 A1 | 12/2003 | Agrawal et al. |
| 2003/0232181 A1 | 12/2003 | Simpson et al. |
| 2004/0001056 A1 | 1/2004 | Atherton et al. |
| 2004/0053576 A1 | 3/2004 | Vasseur et al. |
| 2004/0148057 A1 | 7/2004 | Breed et al. |
| 2004/0150867 A1 | 8/2004 | Lee et al. |
| 2004/0160324 A1 | 8/2004 | Stilp |
| 2004/0160657 A1 | 8/2004 | Tonar et al. |
| 2004/0196179 A1 | 10/2004 | Turnbull |
| 2004/0215520 A1 | 10/2004 | Butler et al. |
| 2004/0236620 A1 | 11/2004 | Chauhan et al. |
| 2005/0082639 A1 | 4/2005 | Kikuta et al. |
| 2005/0117193 A1 | 6/2005 | Poll et al. |
| 2005/0157675 A1 | 7/2005 | Feder et al. |
| 2005/0254442 A1 | 11/2005 | Proctor, Jr. et al. |
| 2005/0260983 A1 | 11/2005 | DiPiazza |
| 2005/0270620 A1 | 12/2005 | Bauer et al. |
| 2005/0270621 A1 | 12/2005 | Bauer et al. |
| 2006/0018000 A1 | 1/2006 | Greer |
| 2006/0033663 A1 | 2/2006 | Saint Clair et al. |
| 2006/0107616 A1 | 5/2006 | Ratti et al. |
| 2006/0145833 A1 | 7/2006 | Brandt et al. |
| 2006/0174333 A1 | 8/2006 | Thomas et al. |
| 2006/0279527 A1 | 12/2006 | Zehner et al. |
| 2007/0008603 A1 | 1/2007 | Sotzing et al. |
| 2007/0042819 A1 | 2/2007 | Li et al. |
| 2007/0053053 A1 | 3/2007 | Moskowitz |
| 2007/0067048 A1 | 3/2007 | Bechtel et al. |
| 2007/0097481 A1 | 5/2007 | Burdis et al. |
| 2007/0115979 A1 | 5/2007 | Balay et al. |
| 2007/0126637 A1 | 6/2007 | Habib et al. |
| 2007/0182705 A1 | 8/2007 | Leyland et al. |
| 2007/0285759 A1 | 12/2007 | Ash et al. |
| 2007/0292606 A1 | 12/2007 | Demiryont |
| 2008/0018979 A1 | 1/2008 | Mahe et al. |
| 2008/0042012 A1 | 2/2008 | Callahan et al. |
| 2008/0043316 A2 | 2/2008 | Moskowitz |
| 2008/0048101 A1 | 2/2008 | Romig et al. |
| 2008/0147847 A1 | 6/2008 | Pitkow et al. |
| 2008/0172312 A1 | 7/2008 | Synesiou et al. |
| 2008/0177919 A1 | 7/2008 | Miyazawa |
| 2008/0184350 A1 | 7/2008 | Chu |
| 2008/0186562 A2 | 8/2008 | Moskowitz |
| 2008/0190759 A1 | 8/2008 | Valentin et al. |
| 2008/0211682 A1 | 9/2008 | Hyland et al. |
| 2008/0238706 A1 | 10/2008 | Kenwright |
| 2009/0014693 A1 | 1/2009 | Zahn |
| 2009/0015740 A1 | 1/2009 | Sagitov et al. |
| 2009/0047900 A1 | 2/2009 | Cruz et al. |
| 2009/0054054 A1 | 2/2009 | Shao et al. |
| 2009/0139052 A1 | 6/2009 | Boenisch |
| 2009/0140219 A1 | 6/2009 | Zahn |
| 2009/0163170 A1 | 6/2009 | Norp et al. |
| 2009/0189458 A1 | 7/2009 | Kawasaki |
| 2009/0224980 A1 | 9/2009 | Cruz et al. |
| 2009/0271042 A1 | 10/2009 | Voysey |
| 2009/0284220 A1 | 11/2009 | Toncich et al. |
| 2009/0323160 A1 | 12/2009 | Egerton et al. |
| 2009/0323161 A1 | 12/2009 | Fuss et al. |
| 2010/0027694 A1 | 2/2010 | Touboul et al. |
| 2010/0039410 A1 | 2/2010 | Becker et al. |
| 2010/0052718 A1 | 3/2010 | Baker et al. |
| 2010/0052844 A1 | 3/2010 | Wesby |
| 2010/0060971 A1 | 3/2010 | Schwendeman et al. |
| 2010/0076615 A1 | 3/2010 | Daniel et al. |
| 2010/0165436 A1 | 7/2010 | Voss et al. |
| 2010/0171667 A1 | 7/2010 | Knudsen |
| 2010/0172010 A1 | 7/2010 | Gustavsson et al. |
| 2010/0188057 A1 | 7/2010 | Tarng |
| 2010/0210233 A1 | 8/2010 | Cook et al. |
| 2010/0228854 A1 | 9/2010 | Morrison et al. |
| 2010/0243427 A1 | 9/2010 | Kozlowski et al. |
| 2010/0245973 A1 | 9/2010 | Wang et al. |
| 2010/0274366 A1 | 10/2010 | Fata et al. |
| 2010/0286839 A1 | 11/2010 | Iaquinangelo et al. |
| 2010/0286937 A1 | 11/2010 | Hedley et al. |
| 2010/0302624 A1 | 12/2010 | Moskowitz |
| 2010/0315693 A1 | 12/2010 | Lam et al. |
| 2011/0031821 A1 | 2/2011 | Greene et al. |
| 2011/0050756 A1 | 3/2011 | Cassidy et al. |
| 2011/0071685 A1 | 3/2011 | Huneycutt et al. |
| 2011/0074342 A1 | 3/2011 | Maclaughlin |
| 2011/0080630 A1 | 4/2011 | Valentin et al. |
| 2011/0083152 A1* | 4/2011 | Centore, III ........... H04N 7/106 725/63 |
| 2011/0097081 A1 | 4/2011 | Gupta et al. |
| 2011/0124313 A1 | 5/2011 | Jones |
| 2011/0148218 A1 | 6/2011 | Rozbicki |
| 2011/0154022 A1 | 6/2011 | Cheng et al. |
| 2011/0159821 A1 | 6/2011 | Park |
| 2011/0164317 A1 | 7/2011 | Vergohl et al. |
| 2011/0170170 A1 | 7/2011 | Boote |
| 2011/0223886 A1 | 9/2011 | Nasielski et al. |
| 2011/0248901 A1 | 10/2011 | Alexopoulos et al. |
| 2011/0260856 A1 | 10/2011 | Rossmann et al. |
| 2011/0261429 A1 | 10/2011 | Sbar et al. |
| 2012/0026573 A1 | 2/2012 | Collins et al. |
| 2012/0033287 A1 | 2/2012 | Friedman et al. |
| 2012/0062975 A1 | 3/2012 | Mehtani et al. |
| 2012/0086363 A1 | 4/2012 | Golding et al. |
| 2012/0133213 A1 | 5/2012 | Borke et al. |
| 2012/0133315 A1 | 5/2012 | Berman et al. |
| 2012/0140492 A1 | 6/2012 | Alvarez |
| 2012/0154241 A1 | 6/2012 | Tatarnikov et al. |
| 2012/0188627 A1 | 7/2012 | Chen et al. |
| 2012/0190386 A1 | 7/2012 | Anderson |
| 2012/0194895 A1 | 8/2012 | Podbelski et al. |
| 2012/0212794 A1 | 8/2012 | Giron et al. |
| 2012/0217346 A1 | 8/2012 | Eberle et al. |
| 2012/0229275 A1 | 9/2012 | Mattern |
| 2012/0235493 A1 | 9/2012 | Kiuchi et al. |
| 2012/0239209 A1 | 9/2012 | Brown et al. |
| 2012/0259583 A1 | 10/2012 | Noboa et al. |
| 2012/0275008 A1 | 11/2012 | Pradhan et al. |
| 2012/0287017 A1 | 11/2012 | Parsche |
| 2012/0293855 A1 | 11/2012 | Shrivastava et al. |
| 2012/0328849 A1 | 12/2012 | Neill et al. |
| 2013/0013921 A1 | 1/2013 | Bhathena et al. |
| 2013/0024029 A1 | 1/2013 | Tran et al. |
| 2013/0054033 A1 | 2/2013 | Casilli |
| 2013/0060357 A1 | 3/2013 | Li et al. |
| 2013/0073681 A1 | 3/2013 | Jiang et al. |
| 2013/0085614 A1 | 4/2013 | Wenzel et al. |
| 2013/0085615 A1 | 4/2013 | Barker |
| 2013/0085616 A1 | 4/2013 | Wenzel |
| 2013/0088331 A1 | 4/2013 | Cho et al. |
| 2013/0131869 A1 | 5/2013 | Majewski et al. |
| 2013/0157493 A1 | 6/2013 | Brown |
| 2013/0158790 A1 | 6/2013 | McIntyre, Jr. et al. |
| 2013/0182308 A1 | 7/2013 | Guarr et al. |
| 2013/0194141 A1 | 8/2013 | Okajima et al. |
| 2013/0196600 A1 | 8/2013 | Capers et al. |
| 2013/0226353 A1 | 8/2013 | Park |
| 2013/0241299 A1 | 9/2013 | Snyker et al. |
| 2013/0243120 A1 | 9/2013 | Tsai et al. |
| 2013/0243425 A1 | 9/2013 | Franklin |
| 2013/0271812 A1 | 10/2013 | Brown et al. |
| 2013/0271813 A1 | 10/2013 | Brown |

(56) References Cited

U.S. PATENT DOCUMENTS

| | | |
|---|---|---|
| 2013/0271814 A1 | 10/2013 | Brown |
| 2013/0278989 A1 | 10/2013 | Lam et al. |
| 2013/0306615 A1 | 11/2013 | Rozbicki et al. |
| 2014/0008992 A1 | 1/2014 | Leabman |
| 2014/0022621 A1 | 1/2014 | Kailasam et al. |
| 2014/0101573 A1 | 4/2014 | Kuo |
| 2014/0149416 A1 | 5/2014 | Wallace |
| 2014/0156097 A1 | 6/2014 | Nesler et al. |
| 2014/0160550 A1 | 6/2014 | Brown et al. |
| 2014/0170863 A1 | 6/2014 | Brown |
| 2014/0171016 A1 | 6/2014 | Sennett et al. |
| 2014/0172557 A1 | 6/2014 | Eden et al. |
| 2014/0182350 A1 | 7/2014 | Bhavaraju et al. |
| 2014/0217967 A1 | 8/2014 | Zeine et al. |
| 2014/0236323 A1 | 8/2014 | Brown et al. |
| 2014/0240474 A1 | 8/2014 | Kondo |
| 2014/0243033 A1 | 8/2014 | Wala et al. |
| 2014/0249876 A1 | 9/2014 | Wu et al. |
| 2014/0273911 A1 | 9/2014 | Dunn et al. |
| 2014/0274458 A1 | 9/2014 | Kronenberg et al. |
| 2014/0300945 A1 | 10/2014 | Parker |
| 2014/0303788 A1 | 10/2014 | Sanders et al. |
| 2014/0319116 A1 | 10/2014 | Fischer et al. |
| 2014/0330538 A1 | 11/2014 | Conklin et al. |
| 2014/0333485 A1 | 11/2014 | Stone et al. |
| 2014/0347190 A1 | 11/2014 | Grimm |
| 2014/0349497 A1 | 11/2014 | Brown et al. |
| 2014/0367057 A1 | 12/2014 | Feldstein |
| 2014/0368048 A1 | 12/2014 | Leabman et al. |
| 2014/0368899 A1 | 12/2014 | Greer |
| 2014/0371931 A1 | 12/2014 | Lin et al. |
| 2015/0002919 A1 | 1/2015 | Jack et al. |
| 2015/0003822 A1 | 1/2015 | Fukada et al. |
| 2015/0023661 A1 | 1/2015 | Borkenhagen et al. |
| 2015/0098121 A1 | 4/2015 | Turnbull et al. |
| 2015/0116811 A1 | 4/2015 | Shrivastava et al. |
| 2015/0120297 A1 | 4/2015 | Meruva |
| 2015/0129140 A1 | 5/2015 | Dean et al. |
| 2015/0137792 A1 | 5/2015 | Filippi et al. |
| 2015/0155737 A1 | 6/2015 | Mayo |
| 2015/0160525 A1 | 6/2015 | Shi |
| 2015/0198640 A1 | 7/2015 | Lee |
| 2015/0222126 A1 | 8/2015 | Leabman et al. |
| 2015/0323287 A1 | 11/2015 | Durand |
| 2015/0378230 A1 | 12/2015 | Gudmunson et al. |
| 2015/0378231 A1 | 12/2015 | Greer et al. |
| 2016/0020647 A1 | 1/2016 | Leabman et al. |
| 2016/0028162 A1 | 1/2016 | Ou et al. |
| 2016/0070151 A1 | 3/2016 | Shrivastava et al. |
| 2016/0091769 A1 | 3/2016 | Rozbicki |
| 2016/0109778 A1 | 4/2016 | Shrivastava et al. |
| 2016/0124283 A1 | 5/2016 | Brown et al. |
| 2016/0134932 A1 | 5/2016 | Karp et al. |
| 2016/0135175 A1 | 5/2016 | Tarlazzi |
| 2016/0147100 A1 | 5/2016 | Van Oosten et al. |
| 2016/0149635 A1 | 5/2016 | Hinman et al. |
| 2016/0154290 A1 | 6/2016 | Brown et al. |
| 2016/0181873 A1 | 6/2016 | Mitcheson et al. |
| 2016/0183056 A1 | 6/2016 | Leabman |
| 2016/0202589 A1 | 7/2016 | Nagel et al. |
| 2016/0203403 A1 | 7/2016 | Nagel et al. |
| 2016/0225832 A1 | 8/2016 | Kwon et al. |
| 2016/0231354 A1 | 8/2016 | Rayman et al. |
| 2016/0248270 A1 | 8/2016 | Zeine et al. |
| 2016/0261837 A1 | 9/2016 | Thompson et al. |
| 2017/0052753 A1 | 2/2017 | Paolini, Jr. et al. |
| 2017/0063429 A1 | 3/2017 | Flask |
| 2017/0070457 A1 | 3/2017 | Sachs |
| 2017/0075183 A1 | 3/2017 | Brown |
| 2017/0075323 A1 | 3/2017 | Shrivastava et al. |
| 2017/0077988 A1 | 3/2017 | Flask |
| 2017/0080341 A1 | 3/2017 | Mao et al. |
| 2017/0082903 A1 | 3/2017 | Vigano et al. |
| 2017/0085834 A1 | 3/2017 | Kim et al. |
| 2017/0097259 A1 | 4/2017 | Brown et al. |
| 2017/0104374 A1 | 4/2017 | Zeine et al. |
| 2017/0117754 A1 | 4/2017 | Noori et al. |
| 2017/0139301 A1 | 5/2017 | Messere et al. |
| 2017/0197494 A1 | 7/2017 | Li |
| 2017/0200424 A1 | 7/2017 | Xu et al. |
| 2017/0212400 A1 | 7/2017 | Shrivastava et al. |
| 2017/0234067 A1 | 8/2017 | Fasi et al. |
| 2017/0243122 A1 | 8/2017 | Komatsu et al. |
| 2017/0251488 A1 | 8/2017 | Urban et al. |
| 2017/0253801 A1 | 9/2017 | Bae et al. |
| 2017/0264865 A1 | 9/2017 | Huangfu |
| 2017/0272145 A1 | 9/2017 | Lilja |
| 2017/0272317 A1 | 9/2017 | Singla et al. |
| 2017/0279930 A1 | 9/2017 | Zhang |
| 2017/0284691 A1 | 10/2017 | Sinha et al. |
| 2017/0285432 A1 | 10/2017 | Shrivastava et al. |
| 2017/0285433 A1 | 10/2017 | Shrivastava et al. |
| 2017/0328121 A1 | 11/2017 | Purdy et al. |
| 2017/0347129 A1 | 11/2017 | Levi et al. |
| 2017/0364046 A1 | 12/2017 | Westrick, Jr. et al. |
| 2017/0364395 A1 | 12/2017 | Shrivastava et al. |
| 2017/0365908 A1 | 12/2017 | Hughes et al. |
| 2018/0076978 A1 | 3/2018 | Schubert et al. |
| 2018/0088432 A1* | 3/2018 | Shrivastava ........... G05B 15/02 |
| 2018/0090992 A1 | 3/2018 | Shrivastava et al. |
| 2018/0095337 A1 | 4/2018 | Rozbicki et al. |
| 2018/0106098 A1 | 4/2018 | Unveren et al. |
| 2018/0129172 A1 | 5/2018 | Shrivastava et al. |
| 2018/0138576 A1 | 5/2018 | Cohen |
| 2018/0144712 A1 | 5/2018 | Threlkel et al. |
| 2018/0176799 A1 | 6/2018 | Lange et al. |
| 2018/0187478 A1 | 7/2018 | Vigano et al. |
| 2018/0189117 A1 | 7/2018 | Shrivastava et al. |
| 2018/0267380 A1 | 9/2018 | Shrivastava et al. |
| 2018/0284555 A1 | 10/2018 | Klawuhn et al. |
| 2018/0301783 A1 | 10/2018 | Bulja et al. |
| 2018/0321042 A1 | 11/2018 | Brewer et al. |
| 2018/0335939 A1 | 11/2018 | Karunamuni et al. |
| 2019/0028287 A1 | 1/2019 | Jin et al. |
| 2019/0036209 A1* | 1/2019 | Au ........................... H01Q 1/44 |
| 2019/0044606 A1 | 2/2019 | Mansikkamaki |
| 2019/0067826 A1 | 2/2019 | Achour et al. |
| 2019/0097827 A1 | 3/2019 | Angle et al. |
| 2019/0155122 A1 | 5/2019 | Brown et al. |
| 2019/0215694 A1 | 7/2019 | Rubin et al. |
| 2019/0219881 A1 | 7/2019 | Shrivastava et al. |
| 2019/0235451 A1 | 8/2019 | Shrivastava et al. |
| 2019/0267840 A1 | 8/2019 | Rozbicki et al. |
| 2019/0271895 A1 | 9/2019 | Shrivastava et al. |
| 2019/0294018 A1 | 9/2019 | Shrivastava et al. |
| 2019/0319335 A1 | 10/2019 | Hughes et al. |
| 2019/0320033 A1 | 10/2019 | Nagata et al. |
| 2019/0324341 A1 | 10/2019 | Tonar et al. |
| 2019/0327320 A1 | 10/2019 | Rubin et al. |
| 2019/0331978 A1 | 10/2019 | Shrivastava et al. |
| 2019/0347141 A1 | 11/2019 | Shrivastava et al. |
| 2019/0353972 A1 | 11/2019 | Shrivastava et al. |
| 2019/0354071 A1 | 11/2019 | Turney et al. |
| 2019/0356508 A1 | 11/2019 | Trikha et al. |
| 2019/0361411 A1 | 11/2019 | Park et al. |
| 2019/0384652 A1 | 12/2019 | Shrivastava et al. |
| 2020/0041963 A1 | 2/2020 | Shrivastava et al. |
| 2020/0041967 A1 | 2/2020 | Shrivastava et al. |
| 2020/0045261 A1 | 2/2020 | Lim et al. |
| 2020/0057421 A1 | 2/2020 | Trikha et al. |
| 2020/0067865 A1 | 2/2020 | Jiménez et al. |
| 2020/0103841 A1 | 4/2020 | Pillai et al. |
| 2020/0150508 A1 | 5/2020 | Patterson et al. |
| 2020/0162856 A1 | 5/2020 | Ziv et al. |
| 2020/0193155 A1 | 6/2020 | Keohane et al. |
| 2020/0241379 A1 | 7/2020 | Barnum et al. |
| 2020/0257179 A1 | 8/2020 | Barnum et al. |
| 2020/0259237 A1 | 8/2020 | Shrivastava et al. |
| 2020/0321682 A1 | 10/2020 | Hughes et al. |
| 2020/0387041 A1 | 12/2020 | Shrivastava et al. |
| 2021/0021788 A1 | 1/2021 | Mcnelley et al. |
| 2021/0040789 A1 | 2/2021 | Rozbicki et al. |
| 2021/0063836 A1 | 3/2021 | Patterson et al. |
| 2021/0119318 A1 | 4/2021 | Hughes et al. |

(56) References Cited

U.S. PATENT DOCUMENTS

| | | | |
|---|---|---|---|
| 2021/0132458 A1 | 5/2021 | Trikha et al. |
| 2021/0165696 A1 | 6/2021 | Shrivastava et al. |
| 2021/0191221 A1 | 6/2021 | Shrivastava et al. |
| 2021/0210053 A1 | 7/2021 | Ng et al. |
| 2021/0232015 A1 | 7/2021 | Brown et al. |
| 2021/0246719 A1 | 8/2021 | Shrivastava et al. |
| 2021/0302799 A1 | 9/2021 | Khanna |
| 2021/0373511 A1 | 12/2021 | Shrivastava et al. |
| 2021/0376445 A1 | 12/2021 | Shrivastava et al. |
| 2021/0383804 A1 | 12/2021 | Makker et al. |
| 2021/0384764 A1 | 12/2021 | Shrivastava et al. |
| 2021/0390953 A1 | 12/2021 | Makker et al. |
| 2022/0011729 A1 | 1/2022 | Shrivastava et al. |
| 2022/0019117 A1 | 1/2022 | Shrivastava et al. |
| 2022/0021099 A1 | 1/2022 | Shrivastava et al. |
| 2022/0121078 A1 | 4/2022 | Vollen et al. |
| 2022/0159077 A1 | 5/2022 | Shrivastava et al. |
| 2022/0171248 A1 | 6/2022 | Shrivastava et al. |
| 2022/0179275 A1 | 6/2022 | Patterson et al. |
| 2022/0231396 A1 | 7/2022 | Rozbicki et al. |
| 2022/0252952 A1 | 8/2022 | Rozbicki et al. |
| 2022/0255351 A1 | 8/2022 | Rozbicki et al. |
| 2022/0298850 A1 | 9/2022 | Shrivastava et al. |
| 2022/0316269 A1 | 10/2022 | Shrivastava et al. |
| 2022/0337596 A1 | 10/2022 | Smith et al. |
| 2022/0365494 A1 | 11/2022 | Shrivastava et al. |
| 2022/0365830 A1 | 11/2022 | Shrivastava et al. |
| 2023/0041490 A1 | 2/2023 | Vangati et al. |
| 2023/0074720 A1 | 3/2023 | Brown et al. |
| 2023/0111311 A1 | 4/2023 | Shrivastava et al. |
| 2023/0120049 A1 | 4/2023 | Vangati et al. |
| 2023/0261358 A1 | 8/2023 | Hughes et al. |
| 2023/0333520 A1 | 10/2023 | Shrivastava et al. |
| 2023/0341740 A1 | 10/2023 | Shrivastava et al. |
| 2023/0393542 A1 | 12/2023 | Shrivastava et al. |

FOREIGN PATENT DOCUMENTS

| | | | | |
|---|---|---|---|---|
| CN | 1219251 A | 6/1999 | | |
| CN | 1267416 A | 9/2000 | | |
| CN | 1276574 A | 12/2000 | | |
| CN | 1311935 A | 9/2001 | | |
| CN | 1599280 A | * 3/2005 | ............... | H04B 7/26 |
| CN | 1692348 A | 11/2005 | | |
| CN | 1723658 A | 1/2006 | | |
| CN | 101032052 A | 9/2007 | | |
| CN | 101154104 A | 4/2008 | | |
| CN | 101253460 A | 8/2008 | | |
| CN | 101401312 A | 4/2009 | | |
| CN | 101501757 A | 8/2009 | | |
| CN | 101510078 A | 8/2009 | | |
| CN | 101856193 A | 10/2010 | | |
| CN | 101868346 A | 10/2010 | | |
| CN | 102255119 A | 11/2011 | | |
| CN | 102325326 A | * 1/2012 | ............ | H04W 16/00 |
| CN | 102326164 A | 1/2012 | | |
| CN | 102414601 A | 4/2012 | | |
| CN | 102598469 A | 7/2012 | | |
| CN | 202443309 U | 9/2012 | | |
| CN | 103051737 A | 4/2013 | | |
| CN | 103168269 A | 6/2013 | | |
| CN | 203019761 U | 6/2013 | | |
| CN | 103238107 A | 8/2013 | | |
| CN | 103282841 A | 9/2013 | | |
| CN | 103327126 A | 9/2013 | | |
| CN | 103345236 A | 10/2013 | | |
| CN | 103547965 A | 1/2014 | | |
| CN | 103649826 A | 3/2014 | | |
| CN | 103793730 A | 5/2014 | | |
| CN | 103842735 A | 6/2014 | | |
| CN | 103987909 A | 8/2014 | | |
| CN | 104102060 A | 10/2014 | | |
| CN | 104114804 A | 10/2014 | | |
| CN | 104321497 A | 1/2015 | | |
| CN | 104335595 A | 2/2015 | | |
| CN | 104884248 A | 9/2015 | | |
| CN | 105143586 A | 12/2015 | | |
| CN | 105974160 A | 9/2016 | | |
| CN | 106125444 A | 11/2016 | | |
| CN | 106164973 A | 11/2016 | | |
| CN | 106462023 A | 2/2017 | | |
| CN | 205992531 U | 3/2017 | | |
| CN | 106575064 A | 4/2017 | | |
| CN | 107111287 A | 8/2017 | | |
| CN | 107850815 A | 3/2018 | | |
| CN | 104730795 B | 5/2018 | | |
| CN | 108139644 A | 6/2018 | | |
| CN | 107112620 B | 12/2019 | | |
| EP | 0413580 A1 | 2/1991 | | |
| EP | 0588514 A1 | 3/1994 | | |
| EP | 0917667 A1 | 5/1999 | | |
| EP | 1929701 A2 | 6/2008 | | |
| EP | 1297380 B1 | 11/2008 | | |
| EP | 2090961 A1 | 8/2009 | | |
| EP | 2357544 A2 | 8/2011 | | |
| EP | 2645474 A1 | 10/2013 | | |
| EP | 2648086 A2 | 10/2013 | | |
| EP | 2733998 A1 | 5/2014 | | |
| EP | 2764998 A1 | 8/2014 | | |
| EP | 2357544 B1 | 10/2014 | | |
| EP | 2851993 A1 | 3/2015 | | |
| EP | 3015915 A1 | 5/2016 | | |
| EP | 2837205 B1 | 2/2017 | | |
| EP | 3293941 A1 | 3/2018 | | |
| EP | 3352053 A1 | 7/2018 | | |
| EP | 3230943 B1 | 7/2021 | | |
| JP | S63271320 A | 11/1988 | | |
| JP | H10215492 A | 8/1998 | | |
| JP | H10233612 A | 9/1998 | | |
| JP | H10246078 A | 9/1998 | | |
| JP | H11500838 A | 1/1999 | | |
| JP | 2000165970 A | 6/2000 | | |
| JP | 2001196826 A | 7/2001 | | |
| JP | 2003284160 A | 10/2003 | | |
| JP | 2004001765 A | 1/2004 | | |
| JP | 2004332350 A | 11/2004 | | |
| JP | 2005303348 A | 10/2005 | | |
| JP | 2006252886 A | 9/2006 | | |
| JP | 2006287729 A | 10/2006 | | |
| JP | 2007156909 A | 6/2007 | | |
| JP | 4139109 B2 | 8/2008 | | |
| JP | 2010152646 A | 7/2010 | | |
| JP | 2012017614 A | 1/2012 | | |
| JP | 2012533060 A | 12/2012 | | |
| JP | 2013515457 A | 5/2013 | | |
| JP | 3184348 U | 6/2013 | | |
| JP | 2014121122 A | 6/2014 | | |
| JP | 2014204550 A | 10/2014 | | |
| JP | 2015128349 A | 7/2015 | | |
| JP | 2015521459 A | 7/2015 | | |
| JP | 2016512677 A | 4/2016 | | |
| JP | 2018050290 A | 3/2018 | | |
| JP | 2018507337 A | 3/2018 | | |
| JP | 2019186771 A | 10/2019 | | |
| KR | 19990088613 A | 12/1999 | | |
| KR | 20030040361 A | 5/2003 | | |
| KR | 20030073121 A | 9/2003 | | |
| KR | 20070089370 A | 8/2007 | | |
| KR | 20080068165 A | 7/2008 | | |
| KR | 20090066107 A | 6/2009 | | |
| KR | 20110128213 A | 11/2011 | | |
| KR | 20120045915 A | 5/2012 | | |
| KR | 20120092921 A | 8/2012 | | |
| KR | 20120117409 A | 10/2012 | | |
| KR | 20130023668 A | 3/2013 | | |
| KR | 20130026740 A | 3/2013 | | |
| KR | 20130112693 A | 10/2013 | | |
| KR | 101323668 B1 | 11/2013 | | |
| KR | 101346862 B1 | 1/2014 | | |
| KR | 20140004175 A | 1/2014 | | |
| KR | 101799323 B1 | 12/2017 | | |
| KR | 20190142032 A | 12/2019 | | |
| KR | 20210032133 A | 3/2021 | | |
| KR | 20210039721 A | 4/2021 | | |

(56) References Cited

FOREIGN PATENT DOCUMENTS

| | | |
|---|---|---|
| RU | 104808 U1 | 5/2011 |
| RU | 2012107324 A | 9/2013 |
| SG | 141352 A1 | 4/2008 |
| TW | 200532346 A | 10/2005 |
| TW | 201029838 A | 8/2010 |
| TW | 201135545 A | 10/2011 |
| TW | 201243470 A | 11/2012 |
| TW | 201344874 A | 11/2013 |
| TW | 201423773 A | 6/2014 |
| TW | M519749 U | 4/2016 |
| TW | 201635840 A | 10/2016 |
| TW | I607269 B | 12/2017 |
| WO | WO-9823116 A2 | 5/1998 |
| WO | WO-0124700 A1 | 4/2001 |
| WO | WO-0182410 A1 | 11/2001 |
| WO | WO-03037056 A1 | 5/2003 |
| WO | WO-03092309 A1 | 11/2003 |
| WO | WO-2008073372 A2 | 6/2008 |
| WO | WO-2010014648 A1 | 2/2010 |
| WO | WO-2010079388 A1 | 7/2010 |
| WO | WO-2010106648 A1 | 9/2010 |
| WO | WO-2011082208 A2 | 7/2011 |
| WO | WO-2011087726 A2 | 7/2011 |
| WO | WO-2012079159 A1 | 6/2012 |
| WO | WO-2012125332 A2 | 9/2012 |
| WO | WO-2012125348 A2 | 9/2012 |
| WO | WO-2012130262 A1 | 10/2012 |
| WO | WO-2013046112 A1 | 4/2013 |
| WO | WO-2013121103 A1 | 8/2013 |
| WO | WO-2013155467 A1 | 10/2013 |
| WO | WO-2013158365 A1 | 10/2013 |
| WO | WO-2013158464 A1 | 10/2013 |
| WO | WO-2013159778 A1 | 10/2013 |
| WO | WO-2013177575 A1 | 11/2013 |
| WO | WO-2014007487 A1 | 1/2014 |
| WO | WO-2014059268 A2 | 4/2014 |
| WO | WO-2014082092 A1 | 5/2014 |
| WO | WO-2014121809 A1 | 8/2014 |
| WO | WO-2014124701 A1 | 8/2014 |
| WO | WO-2014130471 A1 | 8/2014 |
| WO | WO-2015013578 A1 | 1/2015 |
| WO | WO-2015051262 A1 | 4/2015 |
| WO | WO-2015075007 A1 | 5/2015 |
| WO | WO-2015077829 A1 | 6/2015 |
| WO | WO-2015113592 A1 | 8/2015 |
| WO | WO-2015134789 A1 | 9/2015 |
| WO | WO-2016004109 A1 | 1/2016 |
| WO | WO-2016072620 A1 | 5/2016 |
| WO | WO-2016085964 A1 | 6/2016 |
| WO | WO-2016094445 A1 | 6/2016 |
| WO | WO-2016174228 A1 | 11/2016 |
| WO | WO-2016183059 A1 | 11/2016 |
| WO | WO-2017007841 A1 | 1/2017 |
| WO | WO-2017007942 A1 | 1/2017 |
| WO | WO-2017062915 A1 | 4/2017 |
| WO | WO-2017075059 A1 | 5/2017 |
| WO | WO-2017129855 A1 | 8/2017 |
| WO | WO-2017189618 A1 | 11/2017 |
| WO | WO-2017192881 A1 | 11/2017 |
| WO | WO-2018039080 A1 | 3/2018 |
| WO | WO-2018063919 A1 | 4/2018 |
| WO | WO-2018067377 A1 | 4/2018 |
| WO | WO-2018094203 A1 | 5/2018 |
| WO | WO-2018098089 A1 * | 5/2018 ............... E06B 9/24 |
| WO | WO-2018200702 A1 | 11/2018 |
| WO | WO-2018200740 A2 | 11/2018 |
| WO | WO-2018200752 A1 | 11/2018 |
| WO | WO-2019022129 A1 | 1/2019 |
| WO | WO-2019157602 A1 | 8/2019 |
| WO | WO-2019203931 A1 | 10/2019 |
| WO | WO-2019204205 A1 | 10/2019 |
| WO | WO-2019213441 A1 * | 11/2019 ............... E06B 9/24 |
| WO | WO-2020172187 A1 | 8/2020 |
| WO | WO-2020185941 A1 | 9/2020 |
| WO | WO-2020227702 A2 | 11/2020 |
| WO | WO-2020243690 A1 | 12/2020 |
| WO | WO-2020227702 A3 | 1/2021 |
| WO | WO-2021211798 A1 | 10/2021 |

OTHER PUBLICATIONS

"Sage Product Highlights" screenshot, accessed Aug. 28, 2015, 1 page.
"SageGlass Mobile App" screenshot, accessed Aug. 28, 2015, 1 page.
"SageGlass Unplugged" screenshot, accessed Aug. 28, 2015, 1 page.
"SageGlass Unplugged™—wireless dynamic glass", 2014, 2 pages.
APC by Schneider Electric, Smart-UPS 120V Product Brochure, 2013, 8 pp.
AU examination report dated Oct. 1, 2021, in application No. AU2020220165.
AU Office action dated Oct. 22, 2021, in AU Application No. AU2020226999.
Australian Examination Report dated Dec. 24, 2019 in AU Application No. 2015227056.
Australian Examination Report dated Mar. 2, 2020 in AU Application No. 2015353569.
Australian Office Action dated Apr. 8, 2020 in AU Application No. 2015353606.
Australian Office Action dated Aug. 10, 2020 in AU Application No. 2015360714.
Australian Office Action dated Aug. 20, 2019 in AU Application No. 2015353606.
Australian Office Action dated Aug. 9, 2021 in AU Application No. 2015360714.
Australian Office Action dated Dec. 4, 2020 in AU Application No. 2015360714.
Australian Office Action dated Feb. 19, 2021 in AU Application No. 2017260101.
Australian Office Action dated Jun. 3, 2021 in AU Application No. AU 2020220165.
Australian Office Action dated Jun. 4, 2021 in AU Application No. 2015360714.
Australian Office Action dated Mar. 4, 2020 in AU Application No. 2015353606.
Australian Office Action dated May 10, 2019 in AU Application No. 2015353606.
Azini, A.S. et al., "Transparent Antenna Design for Wireless Access Point Application," PIERS Proceedings, Taipei, Mar. 25-28, 2013, pp. 910-913.
Balzano Q., et al., "RF Energy In Cars From Window-mounted Antennas", 36th IEEE Vehicular Technology Conference, 2006, pp. 32-39.
CA Office Action dated Dec. 22, 2021, in Application No. 2968665.
CA Office Action dated Dec. 23, 2021, in Application No. CA2941526.
Cecilio, J., et al., "A configurable middleware for processing heterogenous industrial intelligent sensors," IEEE 16th International Conference on Intelligent Engineering Systems (INES), Jun. 15, 2012, pp. 145-149.
CN Office Action dated Dec. 29, 2021, in application No. 202010466929.9.
CN Notice of Allowance with Supplemental Search Report (w/translation) dated Mar. 1, 2021 in CN Application No. 201580040461.4.
CN Office Action dated Apr. 29, 2020 in CN Application No. 201780038353.2.
CN Office Action dated Apr. 6, 2021 in CN Application No. 201780038353.2.
CN Office Action dated Apr. 6, 2021 in CN Application No. 201911227990.1.
CN Office Action dated Aug. 16, 2019 in CN Application No. 201580015979.2.
CN Office Action dated Aug. 2, 2021, in CN Application No. 201780038353.2.
CN Office Action dated Aug. 28, 2018 in CN Application No. 201580070776.3..

(56) References Cited

OTHER PUBLICATIONS

CN Office Action dated Aug. 3, 2021 in CN Application No. 201780063202.2.
CN Office Action dated Aug. 6, 2019 in CN Application No. 201580070207.9.
CN Office Action dated Dec. 1, 2021, in application No. CN201780069604.
CN Office Action dated Feb. 2, 2019 in CN Application No. 201580015979.2.
CN Office Action dated Feb. 3, 2020 in CN Application No. 201580072749.X.
CN Office Action dated Jan. 15, 2020 in CN Application No. 201580015979.2.
CN Office Action dated Jul. 28, 2021, in CN Application No. 201780057293.9.
CN Office Action dated Jun. 29, 2021 in CN Application No. 202010466929.9.
CN Office Action dated Jun. 3, 2020 in CN Application No. 201580015979.2.
CN Office Action dated Jun. 3, 2021 in CN Application No. 201580072749.X.
CN Office Action dated Mar. 19, 2019 in CN Application No. 201580070776.3..
CN Office Action dated Mar. 5, 2019 in CN Application No. 201580070207.9.
CN Office Action dated Mar. 8, 2021 in CN Application No. 201580072749.X.
CN Office Action dated Mar. 9, 2020 in CN Application No. 201580040461.4.
CN Office Action dated Nov. 12, 2021, in Application No. CN20158072749 with English translation.
CN Office Action dated Nov. 6, 2020 in CN Application No. 201780038353.2.
CN Office Action dated Oct. 21, 2020 in CN Application No. 201580040461.4.
CN Office Action dated Oct. 22, 2020 in CN Application No. 201911227990.1.
CN Office Action dated Oct. 9, 2019 in CN Application No. 201580070776.3.
CN Office Action dated Sep. 15, 2021, in application No. CN201911227990.1.
CN Office Action dated Sep. 30, 2020 in CN Application No. 201580072749.X.
Duchon, Claude E. et al., "Estimating Cloud Type from Pyranometer Observations," Journal of Applied Meteorology, vol. 38, Jan. 1999, pp. 132-141.
EP Examination Report dated Mar. 4, 2019 in EP Application No. 15814233.1.
EP Extended European Search Report mailed on Sep. 14, 2021, in the application EP21182449.7.
EP Extended Search Report dated Dec. 17, 2019 in EP Application No. 19202054.
EP Extended Search Report dated Dec. 4, 2019 in EP Application No. 17793364.5.
EP Extended Search Report dated Feb. 15, 2018 in EP Application No. 15814233.1.
EP Extended Search Report dated Feb. 25, 2020 in EP Application No. 17844188.7.
EP Extended Search Report dated Jun. 19, 2017 in EP Application No. 15758538.1.
EP Extended Search Report dated Jun. 5, 2018 in EP Application No. 15868003.3.
EP Extended Search Report dated Mar. 31, 2020 in EP Application No. 17857230.1.
EP Extended Search Report dated Nov. 11, 2020 in EP Application No. 18791117.7.
EP Extended Search Report dated Nov. 28, 2019 in EP Application No. 19188907.0.
EP Extended Search Report dated Nov. 8, 2018 in EP Application No. 15863112.7.
EP Extended Search Report dated Oct. 1, 2020 in EP Application No. 17858928.9.
EP Extended Search Report dated Sep. 6, 2018 in EP Application No. 15863433.7.
EP Office Action dated Aug. 21, 2018 in EP Application No. 15758538.1.
EP office action dated Aug. 25, 2021, in EP Application No. EP19202054.3.
EP Office Action dated Dec. 16, 2021, in Application No. EP17793364.5.
EP Office Action dated Jan. 29, 2021 in EP Application No. 15868003.3.
EP Office Action dated May 14, 2020 in EP Application No. 15868003.3.
EP Office Action dated Nov. 19, 2020 in EP Application No. 15758538.1.
EP Office Action dated Oct. 1, 2021, in application No. EP17857230.1.
EP Partial Supplementary Search Report dated May 23, 2018 in EP Application No. 15863433.7.
EP Search Report dated Dec. 10, 2021, in Application No. EP19787808.5.
European Office Action dated Feb. 25, 2021 in EP Application No. 15863112.7.
European Office Action dated Jul. 8, 2020 in EP Application No. 15863433.7.
European Office Action dated May 7, 2021 in EP Application No. 15863433.7.
European Office Action dated Oct. 17, 2019 in EP Application No. 15863433.7.
IN Office Action dated Aug. 2, 2021 in IN Application No. 201637028587.
IN Office Action dated Dec. 24, 2021, in Application No. IN202138004005.
IN Office Action dated Nov. 24, 2020 in IN Application No. 201737020192.
Indian Office Action dated Feb. 24, 2021 in IN Application No. 201737021981.
Indian Office Action dated Mar. 24, 2021 in IN Application No. 201817042545.
Indian Office Action dated Sep. 25, 2020 in IN Application No. 201737018864.
International Preliminary Report on Patentability dated Apr. 11, 2019 in PCT/US2017/052798.
International Preliminary Report on Patentability dated Apr. 18, 2019 in PCT Application No. PCT/US17/54120.
International Preliminary Report on Patentability dated Dec. 9, 2021, in PCT Application No. PCT/US2020/035485.
International Preliminary Report on Patentability dated Jan. 12, 2017 in PCT Application No. PCT/US15/38667.
International Preliminary Report on Patentability dated Jun. 22, 2017 in PCT Application No. PCT/US15/64555.
International Preliminary Report on Patentability dated Jun. 8, 2017 in PCT Application No. PCT/US2015/062387.
International Preliminary Report on Patentability dated Jun. 8, 2017 in PCT/US2015/062480.
International Preliminary Report on Patentability dated Mar. 7, 2019 in PCT/US2017/047664.
International Preliminary Report on Patentability dated Nov. 12, 2020 in PCT Application No. PCT/US2019/030467.
International Preliminary Report on Patentability dated Nov. 15, 2018 in PCT Application No. PCT/US2017/031106.
International Preliminary Report on Patentability dated Nov. 18, 2021, issued in PCT/US2020/032269.
International Preliminary Report on Patentability dated Nov. 7, 2019 in PCT Application No. PCT/US2018/029406.
International Preliminary Report on Patentability dated Nov. 7, 2019 in PCT Application No. PCT/US2018/029460.
International Preliminary Report on Patentability dated Oct. 29, 2020 in PCT/US2019/019455.
International Preliminary Report on Patentability dated Sep. 15, 2016 in Application No. PCT/US2015/019031.

(56) References Cited

OTHER PUBLICATIONS

International Preliminary Report on Patentability dated Sep. 24, 2020 in PCT/US2019/022129.
International Search Report and Written Opinion dated Apr. 28, 2020 in PCT Application No. PCT/US2020/018677.
International Search Report and Written Opinion dated Feb. 15, 2016 in PCT/US2015/062480.
International Search Report and Written Opinion dated Jul. 11, 2019 in PCT Application No. PCT/US2019/030467.
International Search Report and Written Opinion dated Mar. 29, 2016 in PCT Application No. PCT/US15/64555.
International Search Report and Written Opinion dated May 29, 2015 in Application No. PCT/US2015/019031.
International Search Report and Written Opinion dated Nov. 16, 2018 in PCT Application No. PCT/US2018/029460.
International Search Report and Written Opinion dated Oct. 15, 2018 in PCT Application No. PCT/US2018/029406.
International Search Report and Written Opinion dated Oct. 16, 2015 in PCT Application No. PCT/US15/38667.
International Search Report and Written Opinion (ISA/EP) dated Dec. 7, 2020 in PCT Application No. PCT/US2020/032269.
International Search Report and Written Opinion (ISA/EP) dated May 9, 2019 in PCT/US2019/022129.
International Search Report and Written Opinion (ISA/EP) dated Sep. 30, 2020 in PCT Application No. PCT/US2020/035485.
International Search Report and Written Opinion (ISA/KR) dated Aug. 22, 2017 in PCT Application No. PCT/US2017/031106.
International Search Report and Written Opinion (ISA/KR) dated Aug. 5, 2021 in PCT Application No. PCT/US2021/027418.
International Search Report and Written Opinion (ISA/KR) dated Dec. 13, 2017 in PCT/US2017/047664.
International Search Report and Written Opinion (ISA/KR) dated Feb. 6, 2018 in PCT/US2017/052798.
International Search Report and Written Opinion (ISA/KR) dated Jan. 9, 2018 in PCT Application No. PCT/US17/54120.
International Search Report and Written Opinion (ISA/KR) dated Jun. 14, 2019 in PCT/US2019/019455.
International Search Report and Written Opinion (ISA/KR) dated Mar. 8, 2016 in PCT Application No. PCT/US2015/062387.
JP Examination Report dated Nov. 26, 2020 in JP Application No. 2017-549175.
JP Office Action dated Dec. 7, 2021, in Application No. JP20170549175 with English translation.
JP Office Action dated Jul. 20, 2021 in JP Application No. 2017-549175.
JP Office Action dated Jun. 16, 2020 in JP Application No. 2017-549175.
JP Office Action dated Mar. 2, 2021 in JP Application No. 2018-557808.
JP Office Action dated Nov. 19, 2019 in JP Application No. 2017-549175.
JP office action dated Sep. 7, 2021, in JP Application No. 2020-175033.
Kipp & Zonen, "Solar Radiation" (known as of Sep. 3, 2014) [http://www.kippzonen.com/Knowledge-Center/Theoretical-info/Solar-Radiation].
KR Office Action dated Apr. 16, 2021 in KR Application No. 10-2018-7035235.
KR Office Action dated Jan. 22, 2021 in KR Application No. 10-2016-7025862.
KR Office Action dated Jul. 31, 2021 in KR Application No. 10-2016-7025862.
KR Office Action dated Oct. 26, 2021, in KR Application No. KR1020217028044 with English translation.
National Aeronautics & Space Administration, "Cloud Remote Sensing and Modeling," (known as of Sep. 3, 2014), published date of Sep. 15, 2014, [http://atmospheres.gsfc.nasa.gov/climate/index.php?section=134].
"Ossia Wireless Charging", screenshot and picture of Cota device, accessed Apr. 20, 2015, 1 page.
Pasternack Enterprises, Inc. Technical Data Sheet for MCX Jack Connector Solder Attachment Surface Mount PCB (PE4889), 2013, 2 pp.
Preliminary Amendment dated Jan. 18, 2017 in U.S. Appl. No. 15/123,069.
Restriction requirement dated Oct. 18, 2021, for U.S. Appl. No. 16/849,540.
Rolith Inc., "NanoWeb: sub-micron transparent metal mesh conductors," [http://www.rolith.com/applications/transparent-conductive-electrodes] retrieved Jan. 29, 2016, 3 pp.
RU Office Action dated Sep. 24, 2018 in RU Application No. 2016139012.
Russian Office Action dated Jul. 10, 2019 in RU Application No. 2017123902.
Saad, A. "Printed millimeter-wave MIMO-based slot antenna arrays for 5G networks," AEU—International Journal of Electronics and Communications, vol. 99, Feb. 2019, pp. 59-69.
Saberin, J. R., "Optically Transparent Antennas for Small Satellites," University of Utah, Dept. of Electrical and Computer Engineering, Masters Thesis, Aug. 2010, 55 pp.
Sim, S., "Next generation data interchange: tool-to-tool application programming interfaces," IEEE Working Conference on Reverse Engineering, Nov. 25, 2000, pp. 278-280.
SunPartner Technologies web page, "Li-Fi", [http://sunpartnertechnologies.com/li-fi/]; 3 pages; retrieved Jan. 24, 2018.
SunPartner Technologies web page, "Smart Building-Cameleon", [http://sunpartnertechnologies.com/vitrage-intelligent/]; 3 pages; retrieved Jan. 24, 2018.
SunPartner Technologies web page, "Smart Building-Design Glass", [http://sunpartnertechnologies.com/vitrage-intelligent/]; 3 pages; retrieved Jan. 24, 2018.
SunPartner Technologies web page, "Smart Building-Vision Glass", [http://sunpartnertechnologies.com/vitrage-intelligent/]; 3 pages; retrieved Jan. 24, 2018.
SunPartner Technologies White Paper, "Wysips Connect, the first solution for the indoor/outdoor VLC lighting saturation problematics," Feb. 26, 2015, 6 pages, [http://sunpartnertechnologies.com/wp-content/uploads/2012/08/White_Paper_LiFi_26_02_2015.pdf].
Taiwan Office Action dated Dec. 31, 2020 issued in TW Application No. 106133563.
Taiwan Office Action dated Jan. 25, 2021 issued in TW Application No. 106128249.
Taiwanese First Office Action dated May 21, 2021 in TW 109134283.
Taiwanese Office Action dated Dec. 12, 2018 in TW Application No. 107129150.
Taiwanese Office Action dated Feb. 27, 2020 in TW Application No. 108126548.
Taiwanese Office Action dated Mar. 16, 2020 in TW Application No. 104139297.
Taiwanese Office Action dated May 13, 2019 in TW Application No. 104139217.
Taiwanese Office Action dated Oct. 1, 2019 in TW Application No. 104139297.
"That's right, 5G could depend on Corning glass in your antenna," by Robert Triggs, Android Authority, Mar. 2, 2018, 5 pp.. [https://www.androidauthority.com/corning-glass-5g-antenna-842341/] downloaded Nov. 13, 2018.
TW Notice of Allowance & Search Report (translated) dated Jul. 30, 2021 in TW Application No. 106133985.
TW Office Action dated May 31, 2021 in TW Application No. TW 106114947.
U.S. Corrected Notice of Allowability dated Jan. 10, 2022, in U.S. Appl. No. 16/334,716.
US Corrected Notice of Allowability dated Jun. 4, 2020 in U.S. Appl. No. 16/298,776.
US Corrected Notice of Allowability dated May 3, 2021 in U.S. Appl. No. 16/253,971.
US Corrected Notice of Allowability dated Sep. 23, 2021, in U.S. Appl. No. 16/338,403.
U.S. Corrected Notice of Allowability for U.S. Appl. No. 16/327,789 dated Mar. 1, 2021.
US Final Office Action dated Dec. 23, 2020 in U.S. Appl. No. 16/338,403.

(56) References Cited

OTHER PUBLICATIONS

US Final Office Action dated Feb. 26, 2015 in U.S. Appl. No. 13/479,137.
US Final Office Action dated Feb. 6, 2020 in U.S. Appl. No. 16/451,784.
US Final Office Action dated Jan. 27, 2014 in U.S. Appl. No. 13/479,137.
US Final Office Action dated Jan. 31, 2019 in U.S. Appl. No. 15/534,175.
US Final Office Action dated Jul. 2, 2019 in U.S. Appl. No. 15/691,468.
US Final Office Action dated Jul. 3, 2019 in U.S. Appl. No. 15/623,237.
US Final Office Action dated Mar. 15, 2018 in U.S. Appl. No. 14/951,410.
US Final Office Action dated Mar. 17, 2017 in U.S. Appl. No. 14/887,178.
US Final Office Action dated Mar. 18, 2020 in U.S. Appl. No. 16/253,971.
US Final Office Action dated Mar. 3, 2020 in U.S. Appl. No. 16/508,099.
US Final Office Action dated May 11, 2021 in U.S. Appl. No. 16/334,716.
US Final Office Action dated Sep. 19, 2016 in U.S. Appl. No. 14/887,178.
U.S. Non-Final Office Action dated Oct. 28, 2021 in U.S. Appl. No. 15/733,765.
U.S. Non-Final Office Action dated Oct. 29, 2021 in U.S. Appl. No. 16/527,554.
US Notice of Allowability (supplemental) dated Sep. 30, 2020 in U.S. Appl. No. 15/123,069.
US Notice of Allowance (corrected) dated Apr. 18, 2019 in U.S. Appl. No. 15/320,725.
US Notice of Allowance dated Apr. 17, 2019 in U.S. Appl. No. 15/534,175.
US Notice of Allowance dated Apr. 17, 2019 in U.S. Appl. No. 15/910,936.
US Notice of Allowance dated Apr. 19, 2021 in U.S. Appl. No. 16/099,424.
US Notice of Allowance dated Apr. 6, 2020 in U.S. Appl. No. 16/298,776.
US Notice of Allowance dated Apr. 9, 2020 in U.S. Appl. No. 15/123,069.
US Notice of Allowance dated Dec. 13, 2018 in U.S. Appl. No. 15/978,029.
US Notice of Allowance dated Dec. 14, 2018 in U.S. Appl. No. 15/910,936.
U.S Notice of Allowance dated Dec. 22, 2021 in U.S. Appl. No. 16/334,716.
US Notice of Allowance dated Dec. 31, 2020 in U.S. Appl. No. 16/523,624.
US Notice of Allowance dated Dec. 31, 2020 in U.S. Appl. No. 16/555,377.
US Notice of Allowance dated Dec. 7, 2020 in U.S. Appl. No. 16/508,099.
US Notice of Allowance dated Feb. 4, 2021 in U.S. Appl. No. 16/253,971.
US Notice of Allowance dated Jul. 1, 2020 in U.S. Appl. No. 15/623,237.
US Notice of Allowance dated Jul. 17, 2019 in U.S. Appl. No. 15/123,069.
US Notice of Allowance dated Jul. 17, 2019 in U.S. Appl. No. 15/320,725.
US Notice of Allowance dated Jul. 25, 2019 in U.S. Appl. No. 15/534,175.
US Notice of Allowance dated Jun. 14, 2021 in U.S. Appl. No. 16/338,403.
US Notice of Allowance dated Mar. 10, 2021 in U.S. Appl. No. 15/691,468.
US Notice of Allowance dated Mar. 20, 2019 in U.S. Appl. No. 15/320,725.
US Notice of Allowance dated Mar. 26, 2021 in U.S. Appl. No. 16/254,434.
US Notice of Allowance dated Mar. 9, 2018 in U.S. Appl. No. 14/887,178.
US Notice of Allowance dated May 14, 2015 in U.S. Appl. No. 13/479,137.
US Notice of Allowance dated May 14, 2019 in U.S. Appl. No. 15/623,235.
US Notice of Allowance dated May 25, 2021 in U.S. Appl. No. 15/709,339.
US Notice of Allowance dated May 26, 2020 in U.S. Appl. No. 16/451,784.
US Notice of Allowance dated May 6, 2020 in U.S. Appl. No. 15/623,237.
US Notice of Allowance dated Nov. 28, 2018 in U.S. Appl. No. 15/123,069.
US Notice of Allowance dated Nov. 3, 2020 in U.S. Appl. No. 15/691,468.
US Notice of Allowance dated Oct. 7, 2021 in U.S. Appl. No. 16/664,089.
US Notice of Allowance dated Oct. 14, 2021 in U.S. Appl. No. 16/664,089.
US Notice of Allowance dated Oct. 22, 2018 in U.S. Appl. No. 14/951,410.
US Notice of Allowance dated Sep. 10, 2021, in the U.S. Appl. No. 15/709,339.
U.S. Notice of Allowance for U.S. Appl. No. 16/327,789 dated Feb. 4, 2021.
US Notice of Allowance (supplemental) dated Jun. 12, 2015 in U.S. Appl. No. 13/479,137.
US Office Action dated Apr. 27, 2018 in U.S. Appl. No. 15/123,069.
US Office Action dated Aug. 21, 2019 in U.S. Appl. No. 16/508,099.
US Office Action dated Aug. 22, 2019 in U.S. Appl. No. 16/298,776.
US Office Action dated Aug. 7, 2018 in U.S. Appl. No. 15/910,936.
US Office Action dated Aug. 7, 2020 in U.S. Appl. No. 16/338,403.
US Office Action dated Feb. 4, 2019 in U.S. Appl. No. 15/623,235.
US Office Action dated Feb. 7, 2019 in U.S. Appl. No. 15/623,237.
US Office Action dated Feb. 7, 2019 in U.S. Appl. No. 15/691,468.
US Office Action dated Jan. 16, 2020 in U.S. Appl. No. 15/529,677.
US Office Action dated Jan. 21, 2021 in U.S. Appl. No. 15/709,339.
US Office Action dated Jul. 21, 2020 in U.S. Appl. No. 16/523,624.
US Office Action dated Jul. 21, 2020 in U.S. Appl. No. 16/555,377.
US Office Action dated Jul. 23, 2020 in U.S. Appl. No. 16/508,099.
US Office Action dated Jul. 24, 2018 in U.S. Appl. No. 15/978,029.
US Office Action dated Jul. 25, 2019 in U.S. Appl. No. 16/253,971.
US Office Action dated Jul. 25, 2019 in U.S. Appl. No. 15/529,677.
US Office Action dated Jul. 29, 2020 in U.S. Appl. No. 16/253,971.
US Office Action dated Jul. 3, 2014 in U.S. Appl. No. 13/479,137.
US Office Action dated Jul. 6, 2018 in U.S. Appl. No. 15/534,175.
US Office Action dated Mar. 25, 2016 in U.S. Appl. No. 14/887,178.
US Office Action dated May 6, 2020 in U.S. Appl. No. 15/691,468.
US Office Action dated Nov. 12, 2020 in U.S. Appl. No. 16/334,716.
US Office Action dated Oct. 23, 2017 in U.S. Appl. No. 14/887,178.
US Office Action dated Sep. 11, 2017 in U.S. Appl. No. 14/951,410.
US Office Action dated Sep. 23, 2013 in U.S. Appl. No. 13/479,137.
US Office Action dated Sep. 23, 2019 in U.S. Appl. No. 16/451,784.
US Office Action dated Sep. 30, 2020 in U.S. Appl. No. 16/254,434.
US Office Action dated Sep. 4, 2018 in U.S. Appl. No. 15/320,725.
U.S. Office Action for U.S. Appl. No. 16/327,789 dated Sep. 28, 2020.
U.S. Appl. No. 15/733,765, inventors Shrivastava et al., filed on Oct. 19, 2020.
U.S. Appl. No. 16/338,403, inventors Shrivastava et al., filed on Mar. 29, 2019.
U.S. Appl. No. 16/949,978, inventors Hughes, et al., filed on Nov. 23, 2020.
U.S. Appl. No. 17/083,128, inventors Patterson et al., filed on Oct. 28, 2020.
U.S. Appl. No. 17/307,848, inventors Shrivastava et al., filed on May 4, 2021.

(56) References Cited

OTHER PUBLICATIONS

U.S. Appl. No. 17/406,301, inventors Shrivastava et al., filed on Aug. 19, 2021.
U.S. Appl. No. 62/102,515, inventors Nagar et al., filed on Jan. 12, 2015.
U.S. Appl. No. 62/102,516, inventors Nagar et al., filed on Jan. 12, 2015.
U.S. Appl. No. 63/124,673, inventors Tai et al., filed on Dec. 11, 2020.
U.S. Appl. No. 63/146,365, inventors Brown et al., filed on Feb. 5, 2021.
U.S. Appl. No. 63/163,305, inventors Trikha et al., filed on Mar. 19, 2021.
U.S. Appl. No. 63/171,871, inventors Gomez-Martinez et al., filed on Apr. 7, 2021.
U.S. Appl. No. 63/181,648, inventors Makker et al., filed on Apr. 29, 2021.
U.S. Appl. No. 63/187,632, inventors Hur et al., filed on May 12, 2021.
U.S. Appl. No. 63/226,127, inventors Lee et al., filed on Jul. 21, 2021.
U.S. Pat. Appl. No. PCT/US2021/027418, inventors Makker et al., filed on Apr. 15, 2021.
US Preliminary Amendment dated Dec. 31, 2019 in U.S. Appl. No. 16/608,159.
U.S. Appl. No. 63/080,899, inventor Makker et al., filed on Sep. 21, 2020.
WeBoost Connect 3G Cell Phone Booster 472205 [https://store.weboost.com/products/connect-3g-directional] retrieved Apr. 1, 2016, 12 pp.
Yasin, T. et al., "A study on the efficiency of transparent patch antennas designed from conductive oxide films," IEEE International Symposium on Antennas and Propagation (APSURSI), Spokane, WA, Jul. 3-8, 2011, pp. 3085-3087.
Yasin, T., "Transparent antennas for solar cell integration," Utah State University, Dept. of Electrical Engineering, Doctoral Thesis, 2013, 98 pp.
Alguindigue. I., et al., "Monitoring and Diagnosis of Rolling Element Bearings Using Artificial Neural Networks," IEEE Transactions on Industrial Electronics, 1993, vol. 40 (2), pp. 209-217.
AU Office Action dated Jan. 11, 2022, in Application No. AU2021201145.
AU Office action dated Sep. 30, 2022, in AU Application No. AU2021215134.
AU Office action dated Apr. 4, 2022, in AU Application No. AU2020226999.
AU Office action dated Apr. 4, 2023, in AU Application No. AU2022202275.
AU Office Action dated Aug. 30, 2022, in Application No. AU20210250838.
AU Office action dated Mar. 20, 2023, in AU Application No. AU20210215134.
AU Office action dated Oct. 12, 2022, in AU Application No. AU2020226999.
Bannat, A., et al., "Artificial Cognition in Production Systems", IEEE Transactions on Automation Science and Engineering, 2011, vol. 8, No. 1, pp. 148-174.
Bucci, G., et al., "Digital Measurement Station for Power Quality Analysis in Distributed Environments," IEEE Transactions on Instrumentation and Measurement, 2003, vol. 52(1), pp. 75-84.
Byun, J. et al., "Development of a Self-adapting Intelligent System for Building Energy Saving and Context-aware Smart Services", IEEE Transactions on Consumer Electronics, Feb. 2011, vol. 57, No. 1, pp. 90-98.
CA Office Action dated Aug. 15, 2023, in Application No. CA2968665.
CA Office Action dated Dec. 13, 2021, in Application No. CA2970300.
CA Office Action dated Feb. 22, 2023, in Application No. CA2970300.
CA Office Action dated Jul. 31, 2023, in Application No. CA3156883.
CA Office Action dated Jun. 1, 2023, in Application No. CA3023072.
CA Office Action dated Nov. 15, 2022 in Application No. CA2968665.
CA Office Action dated Sep. 1, 2023, in Application No. CA3034630.
CA Office Action dated Sep. 13, 2022, in Application No. CA2970300.
Chen, H. et al. "The Design and Implementation of a Smart Building Control System", 2009 IEEE International Conference on e-Business Engineering, pp. 255-262.
CN Office Action dated Apr. 15, 2022 in CN Application No. 201780063202.2 with English translation.
CN Office Action dated Apr. 18, 2022, in Application No. CN202011547257.0 with English translation.
CN Office Action dated Apr. 27, 2022, in Application No. CN201780057293.9 with English translation.
CN Office Action dated Aug. 1, 2022, in Application No. CN201880037591.6 With English translation.
CN Office Action dated Aug. 17, 2023, in Application No. CN202111203764.7 with English translation.
CN Office Action dated Aug. 19, 2022, in Application No. CN202080022001.X with English translation.
CN Office Action dated Aug. 2, 2021, in CN Application No. 201780038353.2 with English translation.
CN Office action dated Aug. 22, 2022 in Application No. CN202011547257.0 With English translation.
CN Office Action dated Aug. 31, 2022 in Application No. CN201780069604.3 with English translation.
CN Office Action dated Dec. 1, 2021, in application No. CN201780069604.3 with English translation.
CN Office Action dated Jan. 10, 2023, in Application No. CN202080022001.X with English translation.
CN Office Action dated Jan. 12, 2023 in CN Application No. CN202011547257 with English translation.
CN Office Action dated Jul. 28, 2023, in Application No. CN201980031543.
CN Office Action dated Mar. 16, 2023, in Application No. CN202080022001 .X with English translation.
CN Office Action dated Mar. 2, 2022, in Application No. CN201880037591.6 with English translation.
CN Office Action dated Mar. 30, 2023 in Application No. CN201980031543 with English translation.
CN Office Action dated May 17, 2022, in Application No. CN201780069604.3 With English Translation.
CN Office Action dated May 20, 2022, in Application No. CN202010466929.9 with English translation.
CN Office Action dated May 24, 2023, in Application No. CN202080022001 .X with English translation.
CN Office Action dated Nov. 1, 2022, in Application No. CN201880037591.6 with English translation.
CN Office Action dated Oct. 10, 2022, in Application No. CN201780057293.9, with English Translation.
CN Office Action dated Sep. 15, 2021, in application No. CN201911227990.1 with English translation.
CN Office Action dated Sep. 28, 2022 in Application No. CN202010466929.9 with English translation.
EP Office Action dated Jul. 13, 2022 in Application No. EP20170858928.
EP Office Action dated Sep. 12, 2022 in Application No. EP20180791117.7.
EP Extended European search report dated Jan. 3, 2023 in Application No. EP22198532.8.
EP Extended European Search report dated May 26, 2023, in Application No. EP23153638.4.
EP Office Action dated Jan. 17, 2022, in Application No. 17858928.9.
EP Office Action dated Jun. 30, 2022 in Application No. EP20190727174.
EP office action dated Apr. 24, 2023, in application No. EP21182448.7.
EP Office Action dated Feb. 15, 2022, in Application No. EP19188907.0.
EP office action dated Jul. 3, 2023, in application No. EP17858928.9.
EP Office Action dated Jun. 3, 2022, in Application No. EP19713970.2.
EP Office Action dated Jun. 19, 2023 in Application No. EP19727174.5.
EP office action dated Jun. 21, 2023, in application No. EP20200757159.

(56) References Cited

OTHER PUBLICATIONS

EP office action dated Jun. 29, 2023, in application No. EP19787808.5.
EP office action dated Mar. 10, 2023, in application No. EP20712740.8.
European Office Action dated Apr. 25, 2023 in Application No. EP19188907.
Hadziosmanovic, D., et al., "Through the Eye of the Plc: Semantic Security Monitoring for Industrial Processes," Proceedings of the 30th Annual Computer Security Applications Conference, 2014, pp. 126-135.
Hameed, Z. et al., "Condition Monitoring and Fault Detection of Wind Turbines and Related Algorithms: a Review.", Renewable and Sustainable energy reviews, 2009, vol. 13, pp. 1-39.
IN Office Action dated Aug. 5, 2022 In Application No. IN201937050525.
IN Office Action dated Jan. 13, 2022, in Application No. 201937044701.
IN Office Action dated Dec. 5, 2022 in Application No. IN202238032780.
IN Office Action dated May 10, 2022, in Application No. IN202037043494.
International Preliminary Report on Patentability dated Mar. 3, 2022, in Application No. PCT/US2020/070427.
International Preliminary Report on Patentability dated Oct. 6, 2022 in PCT Application PCT/US2021/023834.
International Preliminary Report on Patentability dated Feb. 10, 2022 issued in Application No. PCT/US2020/044337.
International Preliminary Report on Patentability dated Oct. 27, 2022, in PCT Application No. PCT/US2021/027418.
International Preliminary Report on Patentability dated Sep. 28, 2023, in PCT Application No. PCT/US2022/020730.
International Search Report and Written Opinion dated Aug. 8, 2022, in Application No. PCT/US2022/023605.
International Search Report and Written Opinion dated Jul. 6, 2022, in PCT Application No. PCT/US2022/020730.
International Search Report and Written Opinion dated Sep. 1, 2022, in Application No. PCT/US2022/024812.
International Search Report and Written Opinion dated Sep. 1, 2022 in Application No. PCT/US2022/028850.
JP Office Action dated Jul. 5, 2022, in Application No. JP2021-119155 with English translation.
JP Office Action dated Jun. 6, 2023, in application No. JP2022-149815 with English translation.
JP Office Action dated Jun. 6, 2023, in Application No. JP2020-560912 with English translation.
JP Office Action dated Mar. 1, 2022, in Application No. JP2020-175033 with translation.
JP Office Action dated Nov. 8, 2022 for JP Application No. 2021-119155 with English translation.
JP office action dated Sep. 7, 2021, in JP Application No. 2020-175033 with English translation.
KR Office Action dated Apr. 13, 2022, in KR Application No. KR1020217028044 with English translation.
KR Office Action dated Apr. 25, 2023, in Application No. KR10-2017-7017128 with English translation.
KR Office Action dated Aug. 2, 2023, in Application No. KR10-2022-7042723 with English translation.
KR Office Action dated Dec. 7, 2022, in Application No. KR10-2022-7005495 WithEnglish translation.
KR Office Action dated Dec. 7, 2022 in Application No. KR10-2022-7036992 with English translation.
KR Office Action dated Dec. 22, 2021, in Application No. KR1020177018491 with English translation.
KR Office Action dated Feb. 22, 2022, in Application No. KR1020177017285 with English translation.
KR Office Action dated Jul. 10, 2023, in application No. KR 10-2023-7021596 with English Translation.
KR Office Action dated Jul. 26, 2023, in Application No. KR10-2022-7037562 with English translation.
KR Office Action dated May 12, 2023, in Application No. KR10-2022-7027386 with English translation.
KR Office Action dated May 25, 2022, in Application No. KR1020227005495 With English Translation.
KR Office Action dated Nov. 3, 2022, in Application No. KR10-2022-7027386 withEnglish Translation.
Laskar, S.H., et al., "Power Quality Monitoring by Virtual Instrumentation using LabVIEW", 2011 46th International Universities' Power Engineering Conference (UPEC), 2011, pp. 1-6.
Mumaw, R.J et al., "There is More to Monitoring a Nuclear Power Plant Than Meets the Eye", Human factors, 2000, vol. 42, No. 1, pp. 36-55.
Tuokko, R., et al., "Micro and Desktop Factory Road Map", Tampere University of Technology, 2012, pp. 1-114.
TW Office Action dated Jun. 6, 2022 in Application No. TW108115291 With English Translation.
TW Office Action dated Apr. 26, 2022 in Application No. TW110144841 with English translation.
TW Office Action dated Apr. 27, 2023, in application No. TW20220142122 with English translation.
TW Office Action dated Apr. 29, 2022, in Application No. TW110140314 with English translation.
TW Office Action dated Jan. 12, 2023 in Application No. TW108115291 with English translation.
TW Office Action dated Jan. 28, 2022, in Application No. TW110109128 with English translation.
TW Office Action dated Jul. 11, 2022 In Application No. TW110146990 with English translation.
TW Office Action dated Jun. 17, 2023, in application No. TW107114217 with English translation.
TW Office Action dated Mar. 13, 2022, in Application No. TW106114947 with English translation.
TW Office Action dated Mar. 15, 2022, in Application No. TW109112242 with Englishtranslation.
TW Office Action dated May 31, 2023 in Application No. TW111144104 with English translation.
TW Office Action dated Nov. 23, 2022 in Application No. TW107114217 with English translation.
TW Office Action dated Nov. 29, 2021, in Application No. TW109134283 with English translation.
U.S. Non-Final office Action dated Sep. 21, 2022 in U.S. Appl. No. 17/301,026.
U.S. Notice of Allowance dated May 12, 2022, in U.S. Appl. No. 17/171,667.
U.S Advisory Action dated Aug. 23, 2023 in U.S. Appl. No. 17/194,795.
U.S. Corrected Notice of Allowance dated Jan. 6, 2023 in U.S. Appl. No. 16/655,032.
U.S. Corrected Notice of Allowance dated Jun. 27, 2022 in U.S. Appl. No. 16/527,554.
U.S Corrected Notice of Allowance dated Apr. 26, 2022 in U.S. Appl. No. 16/334,716.
U.S. Corrected Notice of Allowance dated Apr. 28, 2022, in U.S. Appl. No. 15/733,765.
U.S. Corrected Notice of Allowance dated Feb. 15, 2023 in U.S. Appl. No. 16/949,978.
U.S. Corrected Notice of Allowance dated Jul. 17, 2023, in U.S. Appl. No. 16/980,305.
U.S. Corrected Notice of Allowance dated Jul. 17, 2023, in U.S. Appl. No. 17/301,026.
U.S. Corrected Notice of Allowance dated Jun. 3, 2022 In U.S. Appl. No. 16/849,540.
U.S. Corrected Notice of Allowance dated Jun. 12, 2023, in U.S. Appl. No. 17/453,469.
U.S. Corrected Notice of Allowance dated May 26, 2023 in U.S. Appl. No. 17/355,086.
U.S. Corrected Notice of Allowance dated Sep. 6, 2022 in U.S. Appl. No. 16/849,540.
U.S. Final office Action dated May 19, 2023 in U.S. Appl. No. 17/194,795.
U.S. Non Final Office Action dated Jan. 31, 2022 in U.S. Appl. No. 16/849,540.

(56) References Cited

OTHER PUBLICATIONS

U.S. Non-Final office Action dated Jan. 23, 2023 in U.S. Appl. No. 17/869,725.
U.S. Non-Final office Action dated Nov. 14, 2022 in U.S. Appl. No. 17/804,802.
U.S. Non-Final office Action dated Nov. 15, 2022 in U.S. Appl. No. 17/355,086.
U.S. Non-Final office Action dated Sep. 9, 2022 in U.S. Appl. No. 17/249,442.
U.S. Non-Final Office Action dated Aug. 12, 2022, in U.S. Appl. No. 16/655,032.
U.S. Non-Final Office Action dated Aug. 24, 2023 in U.S. Appl. No. 17/656,612.
U.S. Non-Final Office Action dated Aug. 31, 2023, in U.S. Appl. No. 17/194,795.
U.S. Non-Final Office Action dated Dec. 2, 2022 in U.S. Appl. No. 16/980,305.
U.S. Non-Final Office Action dated Dec. 6, 2022 in U.S. Appl. No. 17/453,469.
U.S. Non-Final office Action dated Dec. 21, 2022 in U.S. Appl. No. 17/194,795.
U.S. Non-Final Office Action dated Jul. 3, 2023, in U.S. Appl. No. 17/385,810.
U.S. Non-Final Office Action dated Jul. 20, 2023, in U.S. Appl. No. 17/804,802.
U.S. Non-final Office Action dated Jul. 28, 2022 in U.S. Appl. No. 16/655,032.
U.S. Non-Final Office Action dated Mar. 1, 2023 in U.S. Appl. No. 17/380,785.
U.S. Non-Final office Action dated Mar. 9, 2023 in U.S. Appl. No. 17/909,925.
U.S. Non-Final Office Action dated May 9, 2023 in U.S. Appl. No. 17/307,848.
U.S. Non-Final Office Action dated Nov. 18, 2022, in U.S. Appl. No. 17/307,848.
U.S. Non-Final Office Action dated Oct. 24, 2022, in U.S. Appl. No. 17/486,716.
U.S. Non-Final office Action dated Sep. 8, 2022 in U.S. Appl. No. 17/406,301.
U.S. Non-Final office Action dated Sep. 29, 2022 in U.S. Appl. No. 16/949,978.
U.S. Non-Final Office Action dated Sep. 29, 2023, in U.S. Appl. No. 17/989,603.
U.S. Notice of Allowance dated Apr. 6, 2022, in U.S. Appl. No. 15/733,765.
U.S. Notice of Allowance dated Aug. 3, 2023, in U.S. Appl. No. 17/869,725.
U.S. Notice of Allowance dated Aug. 10, 2023 in U.S. Appl. No. 17/301,026.
U.S. Notice of Allowance dated Aug. 23, 2023 in U.S. Appl. No. 17/909,925.
U.S. Notice of Allowance dated Aug. 29, 2023 in U.S. Appl. No. 17/486,716.
U.S. Notice of Allowance dated Aug. 31, 2023 in U.S. Appl. No. 17/380,785.
U.S. Notice of Allowance dated Dec. 29, 2022 in U.S. Appl. No. 16/655,032.
U.S. Notice of Allowance dated Feb. 1, 2023 in U.S. Appl. No. 16/949,978.
U.S. Notice of Allowance dated Feb. 7, 2023 in U.S. Appl. No. 17/249,442.
U.S. Notice of Allowance dated Feb. 14, 2023 in U.S. Appl. No. 17/355,086.
U.S. Notice of Allowance dated Feb. 16, 2022 in U.S. Appl. No. 16/664,089.
U.S. Notice of Allowance dated Jan. 17, 2023 in U.S. Appl. No. 17/406,301.
U.S. Notice of Allowance dated Jan. 25, 2023 in U.S. Appl. No. 17/406,301.
U.S. Notice of Allowance dated Jul. 6, 2023 in U.S. Appl. No. 17/870,480.
U.S. Notice of Allowance dated Jul. 13, 2023 in U.S. Appl. No. 17/940,951.
U.S. Notice of Allowance dated Jun. 7, 2023 in U.S. Appl. No. 17/453,469.
U.S. Notice of Allowance dated Jun. 7, 2023 in U.S. Appl. No. 17/870,480.
U.S Notice of Allowance dated Jun. 8, 2022 in U.S. Appl. No. 15/733,765.
U.S. Notice of Allowance dated Jun. 12, 2023, in U.S. Appl. No. 17/940,951.
U.S. Notice of Allowance dated Jun. 16, 2023, in U.S. Appl. No. 17/301,026.
U.S. Notice of Allowance dated Jun. 20, 2022 in U.S. Appl. No. 16/527,554.
U.S. Notice of Allowance dated Mar. 31, 2023 in U.S. Appl. No. 17/249,442.
U.S. Notice of Allowance dated May 11, 2023 in U.S. Appl. No. 16/949,978.
U.S. Notice of Allowance dated May 19, 2023 in U.S. Appl. No. 17/249,442.
U.S. Notice of Allowance dated May 22, 2023 in U.S. Appl. No. 17/486,716.
U.S. Notice of Allowance dated May 23, 2023 in U.S. Appl. No. 17/869,725.
U.S. Notice of Allowance dated May 24, 2023 in U.S. Appl. No. 16/980,305.
U.S. Notice of Allowance dated May 26, 2022, in U.S. Appl. No. 16/849,540.
U.S. Notice of Allowance dated May 26, 2023, in U.S. Appl. No. 17/453,469.
U.S. Notice of Allowance dated Sep. 18, 2023, in U.S. Appl. No. 17/380,785.
U.S. Notice of Allowance dated Sep. 20, 2023, in U.S. Appl. No. 17/453,469.
U.S. Appl. No. 17/916,986, inventors Makker et al., filed on Oct. 4, 2022.
U.S. Appl. No. 17/989,603, Inventors Shrivastava et al., filed on Nov. 17, 2022.
U.S. Appl. No. 18/138,846, inventors Hughes H., et al., filed on Apr. 25, 2023.
U.S. Appl. No. 18/213,843, inventors Shrivastava D, et al., filed on Jun. 25, 2023.
U.S. Appl. No. 18/237,146, inventors Shrivastava D, et al., filed on Aug. 23, 2023.
U.S. Appl. No. 18/310,443, inventors Shrivastava et al., filed on May 1, 2023.
U.S. Restriction requirement dated Mar. 15, 2023 in U.S. Appl. No. 17/385,810.
U.S. Supplemental Notice of Allowance dated Aug. 1, 2022 in U.S. Appl. No. 17/171,667.
Woods, D., "The Alarm Problem and Directed Attention in Dynamic Fault Management.", Ergonomics, 1995, vol. 38, No. 11, pp. 2371-2393.
CA Office Action dated Dec. 5, 2023 in Application No. 2970300.
CA Office Action dated Dec. 27, 2023 in CA Application No. 3172227.
CA Office Action dated Nov. 9, 2023, in CA Application No. 3139813.
CA Office Action dated Oct. 26, 2023, in CA Application No. 3039342.
CA Office Action dated Oct. 31, 2023, in Application No. CA3129952.
CA Office Action dated Sep. 28, 2023, in Application No. CA3062817.
CN Office Action dated Dec. 12, 2023 in CN Application No. 201980003232.3.
CN Office Action dated Jul. 28, 2023, in Application No. CN201980031543 with English translation.
CN Office Action dated Sep. 26, 2023, in CN Application No. 202080060919.3 with English Translation.
EP Extended European Search report dated Oct. 24, 2023, in Application No. EP23161161.7.

(56) References Cited

OTHER PUBLICATIONS

IN Office Action dated May 29, 2023, in Application No. IN202118042940.
International Preliminary Report on Patentability and Written Opinion dated Nov. 23, 2023 in PCT Application No. PCT/US2022/024999.
International Preliminary Report on Patentability and Written Opinion dated Nov. 23, 2023 in PCT Application No. PCT/US2022/028850.
International Preliminary Report on Patentability dated Oct. 19, 2023, in PCT Application No. PCT/US2022/023605.
International Preliminary Report on Patentability dated Oct. 26, 2023, in Application No. PCT/US2022/024812.
International Search Report and Written Opinion dated Jul. 26, 2022 in Application No. PCT/US2022/024999.
International Search Report and Written Opinion dated Nov. 16, 2022 in PCT Application No. PCT/US2022/074162.
KR Office Action dated Sep. 25, 2023, in Application No. KR10-2022-7027386 withEnglish Translation.
U.S. Corrected Notice of Allowance dated Dec. 4, 2023 in U.S. Appl. No. 17/453,469.
U.S. Corrected Notice of Allowance dated Oct. 31, 2023, in U.S. Appl. No. 17/453,469.
U.S. Final Office Action dated Dec. 28, 2023 in U.S. Appl. No. 17/385,810.
U.S. Non-Final Office Action dated Dec. 28, 2023 in U.S. Appl. No. 18/310,443.
U.S. Non-Final Office Action dated Nov. 16, 2023 in U.S. Appl. No. 17/194,795.
U.S. Notice of Allowance dated Dec. 12, 2023 in U.S. Appl. No. 17/486,716.
U.S. Notice of Allowance dated Dec. 13, 2023 in U.S. Appl. No. 17/453,469.
U.S. Notice of Allowance dated Dec. 21, 2023 in U.S. Appl. No. 17/909,925.
U.S. Notice of Allowance dated Jan. 8, 2024 in U.S. Appl. No. 17/989,603.
U.S. Appl. No. 18/281,913 inventors Trikha N, et al., filed on Sep. 13, 2023.
U.S. Appl. No. 18/513,707, inventors Vangati M R, et al., filed on Nov. 20, 2023.
U.S. Appl. No. 18/555,129, inventors MakkerT, et al., filed on Oct. 12, 2023.
U.S. Appl. No. 18/555,275, inventors Hur Yerang et al., filed on Oct. 13, 2023.
CA Office Action dated Jan. 11, 2024 in CA Application No. 3038974.
CA Office Action dated Jan. 26, 2024 in CA Application No. CA3167832.
CN Office Action dated Dec. 12, 2023 in CN Application No. 201980003232.3, with English Translation.
CN Office Action dated Jan. 15, 2024 in CN Application No. CN202011606768.5, with English Translation.
EP Extended European Search report dated Apr. 2, 2024 in EP Application No. 21752901.5.
EP Office Action dated Feb. 21, 2024 in EP Application No. 20729442.2.
EP Partial Supplementary European Search report dated Mar. 6, 2024, in EP Application No. 21775725.1.
International Preliminary Report on Patentability and Written Opinion dated Feb. 8, 2024 in PCT Application No. PCT/US2022/074162.
JP Office Action dated Feb. 13, 2024 in JP Application No. 2020-560912, with English Translation.
U.S. Advisory Action dated Mar. 13, 2024 in U.S. Appl. No. 17/385,810.
U.S. Non Final Office Action dated Mar. 21, 2024, in U.S. Appl. No. 17/634,150.
U.S. Non-Final Office Action dated Feb. 23, 2024 in U.S. Appl. No. 17/313,760.
U.S. Non-Final Office Action dated Mar. 14, 2024 in U.S. Appl. No. 17/597,701.
U.S. Notice of Allowance dated Feb. 14, 2024 in U.S. Appl. No. 17/989,603.
U.S. Notice of Allowance dated Feb. 28, 2024 in U.S. Appl. No. 17/989,603.
U.S. Appl. No. 18/428,413, inventors Shrivastava D, et al., filed on Jan. 31, 2024.
U.S. Restriction Requirement dated Jan. 24, 2024 in U.S. Appl. No. 17/612,479.
Zheng, Z., et al., "Subscription to Multiple Stream Originators, Draft-zhou-netconf-multi-stream-originators-10," Internet Engineering Task Force, 2019, vol. 6, pp. 1-21.
CN Office Action dated Apr. 11, 2024 in CN Application No. 201980003232.3.
EP Extended European Search report dated Mar. 6, 2024 in EP Application No. 23214710.8.
U.S. Non-Final Office Action dated Apr. 24, 2024 in U.S. Appl. No. 18/237,146.
U.S. Non-Final Office Action dated May 7, 2024 in U.S. Appl. No. 17/385,810.
U.S. Notice of Allowance dated May 1, 2024 in U.S. Appl. No. 18/310,443.

* cited by examiner

Cavity for Antenna

ANTENNA SYSTEMS FOR CONTROLLED COVERAGE IN BUILDINGS

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

As high data rate wireless connectivity becomes not only expected, but a necessity, buildings must not only allow transmission of wireless signals, but must also facilitate such transmission. This is particularly the case, as wireless connectivity moves to higher frequency carrier bands such as is the case with 5G wireless networks.

SUMMARY

According to some implementations, a data communications network in a building includes one or more external antennas. At least one of the external antennas is disposed on a roof or exterior of the building and associated with a window, a sky sensor or a digital architectural element. The one or more external antennas are coupled to a network infrastructure of the building via one or more data carrying lines and/or wireless links. The network infrastructure comprises one or more data carrying lines, one or more network switches, and at least one control panel.

In some examples, at least one of the external antennas may be configured for communication with an external wireless network.

In some examples, the network infrastructure may include one or more building network antennas and associated radios installed in and/or on the building and configured to provide wireless data connection in an interior of the building and/or adjacent to the building.

In some examples, the radios may be configured to provide Wi-Fi, CBRS or cellular wireless data connection in the interior of the building and/or adjacent to the building.

In some examples, the one or more external antennas may include one or more donor antennas configured for communication with an external cellular network.

In some examples, the at least one control panel may be configured to connect to an external cellular network via a backhaul comprising a high speed cable.

In some examples, the one or more data carrying lines of the network infrastructure may support data communication at 1 Gb/second or faster.

In some examples, the at least one control panel may be coupled to one or more window controllers for connection to one or more IGUs.

In some examples, at least one of the external antennas disposed in or associated with a digital architectural element may include a radiating element disposed exterior to the building coupled with an electrical connector disposed in an interior of the building by way of a pass-through arrangement. In some examples, the pass-through arrangement may be configured to provide a weather tight seal between the building interior and the building exterior. In some examples, the pass-through arrangement may include an electrical coupling between the electrical connector and the radiating element. In some examples, the electrical connector may be configured to connect with the network infrastructure of the building.

According to some implementations, a method of providing connection to an external wireless network includes communicating with the external wireless network using one or more external antennas, at least one of the external antennas being disposed in or associated with a sky sensor or a digital architectural element including a sensor assembly on a roof or exterior of a building and transmitting data between the one or more external antennas and a network infrastructure of the building using one or more data carrying lines and/or wireless links. The network infrastructure includes one or more data carrying lines, one or more network switches, and at least one control panel.

In some examples, the network infrastructure may include one or more building network antennas and associated radios installed in and/or on the building and the method comprises the one or more building network antennas providing wireless data connection in an interior of the building and/or adjacent to the building.

In some examples, the method may further include the associated radios providing Wi-Fi, CBRS or cellular wireless data connection in the interior of the building and/or adjacent to the building.

In some examples, the one or more external antennas may include one or more donor antennas communicating with an external cellular network.

In some examples, the method may further include the at least one control panel communicating with an external cellular network via a backhaul comprising a high speed cable.

In some examples, the method may include assigning antenna and/or radio protocols to the antennas and/or radios prior to varying the operational parameter where the operational parameter is a frequency or power.

In some examples, the method may further include sequentially varying an operational parameter of each of the antennas and/or radios while measuring a signal strength at the other antennas and/or radios as a function of the varied parameter and selecting a value of the operational parameter for each of the antennas and/or radios based on the measured signal strength.

According to some implementations, a system includes a plurality of antennas and/or radios distributed in a building; and at least one logic device. The at least one logic device includes logic for configuring the plurality of antennas and/or radios by: supplying power to the antennas and/or radios, varying an operational parameter of at least one of the antennas and/or radios while measuring a signal strength at the other antennas and/or radios as a function of the varied operational parameter, and selecting a value of the operational parameter for operation of the at least one of the antennas and/or radios based on the measured signal strength.

In some examples, the logic for configuring the plurality of antennas and/or radios may further include determining the location of each of the antennas in the building.

In some examples, the operational parameter may be an antenna and/or radio protocol, frequency or power.

In some examples, the logic for configuring the plurality of antennas and/or radios may include assigning antenna and/or radio protocols to the antennas and/or radios prior to varying the operational parameter where the operational parameter is a frequency or power.

In some examples, the logic may further include sequentially varying an operational parameter of each of the antennas and/or radios while measuring a signal strength at the other antennas and/or radios as a function of the varied parameter and selecting a value of the operational parameter for each of the antennas and/or radios based on the measured signal strength.

In some examples, the at least one logic device may be a local logic device or a remote logic device.

According to some implementations, a data communications network in a building includes one or more antennas internal to the building and one or more antennas external to the building and a wired or wireless coupling between at least one external antenna and at least one internal antenna. The at least one external antenna is communicatively coupled with an external cellular network. The at least one internal antenna is configured to transmit a wireless signal received by the external antenna from the external cellular network to one or more locations internal or proximate to the building. The data communications network is configured to control wireless coverage to the one or more locations.

In some examples, some of the one or more locations may be internal to the building and others of the one or more locations may be external to the building.

In some examples, the at least one external antenna may be coupled to a network infrastructure of the building via one or more data carrying lines and/or wireless links and the network infrastructure may include one or more data carrying lines, one or more network switches, and at least one control panel.

In some examples, a plurality of internal antennas may be distributed within the building.

In some examples, the network infrastructure may have a vertical data plane between building floors and a horizontal data plane all within a single floor or multiple contiguous floors. In some examples, the vertical data plane includes multiple control panels and a high capacity data carrying line.

In some examples, the building may include at least one rooftop donor antenna and at least one control panel configured to communicate with the external cellular network via a physical electrical or optical line. In some examples, the rooftop donor antenna may be configured to provide downlinks into the building to provide wireless service to occupants and/or interior devices.

These and other features and embodiments will be described in more detail below with reference to the drawings.

DETAILED DESCRIPTION

Introduction

Figure 1:
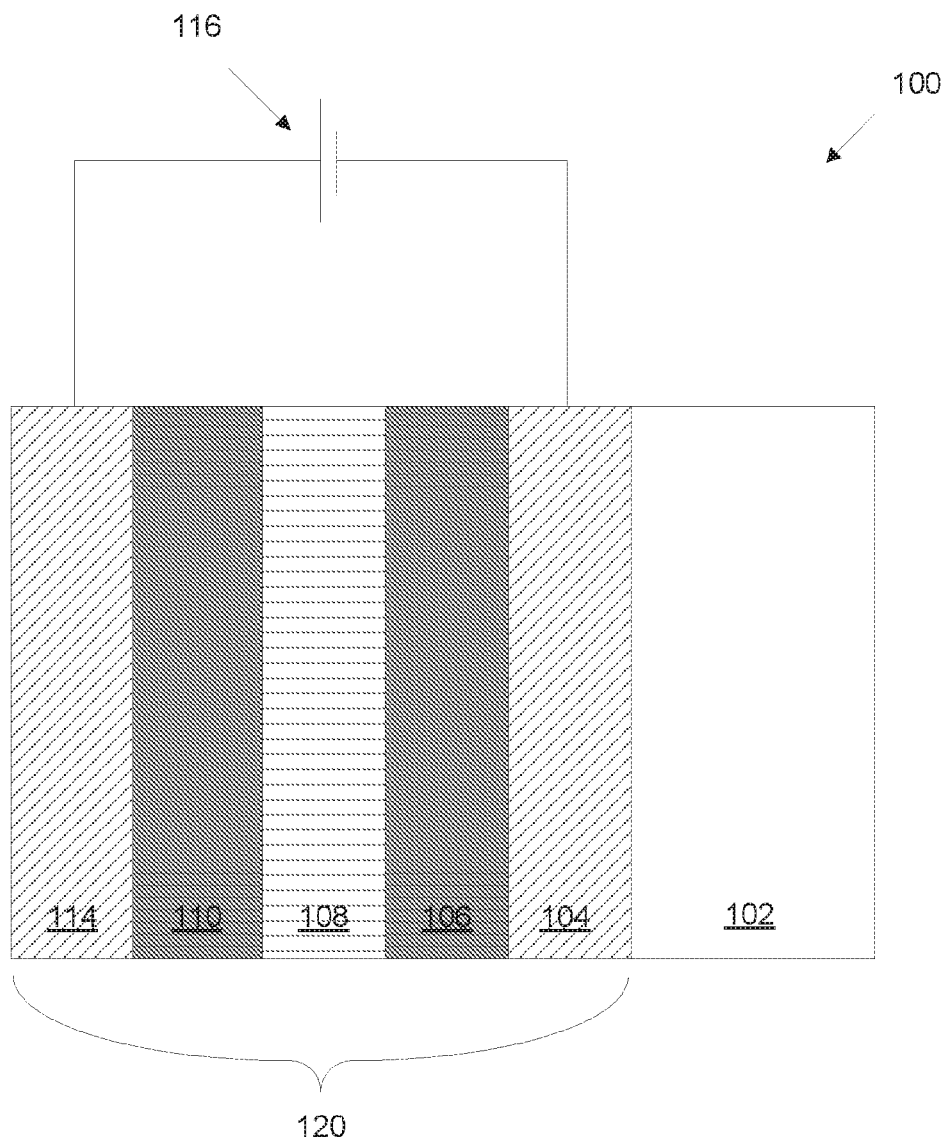
FIG. 1 shows a cross-sectional view of an electrochromic device coating that may be used in a tintable window.

Certain disclosed embodiments provide a network infrastructure available for various purposes such as providing high bandwidth wireless communications services to occupants of a building and/or users outside the building. In the latter case, the network infrastructure may work in concert with, or as a partial replacement of, the infrastructure of cellular carriers. The network infrastructure is provided in a building that optionally includes electrically switchable windows. Examples of components sometimes included with the network infrastructure include a high speed backhaul, including, e.g., cables and switches, physical antennas, and transceivers or radios.

The disclosed network infrastructures may provide additional coverage (beyond that provided by the cellular carrier itself) in the interior of the building and/or provide or supplement the cellular carrier's ability to provide coverage and capacity outside the building, typically near to the building, e.g., within about one hundred meters of the building, sometimes within a line of site. In some cases, a building and associated network infrastructure can even serve as a cellular tower.

High speed, high frequency communications protocols such as 5G face numerous challenges before they can be widely accepted and deployed. For example, compared to lower frequency communications bands, high frequency bands require more antennas. For example, it is estimated that to deploy a 5G cellular service in a given area will require over twice as many antennas as are required to provide the same level of cellular service for 4G. Some of those antennas may be provided in a building or a portion of a building.

Consider the example of providing 5G or other wireless coverage in an urban canyon, such as a street in major metropolitan area such as Manhattan, N.Y. or Singapore. 5G service will require many antennas to provide adequate coverage and adequate capacity. There is insufficient public space such as telephone poles where a carrier could deploy antennas to provide adequate 5G coverage and capacity. To this end, the private buildings that line an urban canyon provide locations for 5G antennas.

Unfortunately, 5G and other high frequency protocols are susceptible to attenuation. 5G communications (particularly at their high frequency bands such as in the range of about 6 to 30 GHz) are particularly susceptible to attenuation by conductive structures such as reinforced concrete in walls, aluminum coated thermal insulation in building walls and floors, Low-E films on glass, and possibly electrochromic devices on glass. To address this, active elements such as repeaters may be provided in a building. For example, cellular repeaters may be disposed on or proximate to the walls, windows, floors, and/or ceilings that attenuate wireless signals.

Note that when describing the cellular protocols disclosed herein, 5G is frequently used as an example. However, the disclosed embodiments pertain to any wireless communications protocol or combination of protocols.

Functions:

The communications infrastructure described herein may serve various functions, some of which are listed here.

1. Some systems described herein are configured to selectively block and transmit wireless signals in a controllable manner. In various embodiments, a system is configured so that transmission of wireless communications is based on location, time, and/or other criteria and is fully controlled. In some embodiments, this is accomplished by using controllable active elements that convert and retransmit signals. For example, a receiving antenna faces in one direction on one side of a wall or window and a transmitter antenna faces in a generally opposite direction on the other side of the wall or window. Between the receiver and transmitter, the active element includes one or more transceivers or other signal converters. When the element is on or active, it is transmitting signal, and when the element is off or inactive, it is not transmitting signal. In some embodiments, an active element that receives and automatically retransmits wireless communications signals is a repeater. The repeater may boost signal and/or transmit it to a location that would not otherwise receive the signals.

A repeater or other active element may include a particular antenna combination, with one type of antenna on the inside of the building and a different type of antenna on the outside of the building (or on opposites of an internal wall or window. In relation to the description of various antenna types herein, some embodiments employ a handle antenna on the outside the building coupled to one of the other antennas (e.g., a microstrip antenna) on the inside of the building. In some implementations, one or both antennas are disposed on a mullion feature such as a beauty cap.

It has been observed that electrochromic windows may provide signal blocking in the range of 10-20 dB of insertion loss, depending on the transmission frequency, with greater loss occurring at higher frequencies. Hence, some embodiments employ wireless re-transmitters or repeaters to circumvent the blocking by electrochromic windows. In some embodiments, such re-transmitters are disposed on or proximate to IGUs.

In certain embodiments, a window or wall contains a layer or structure that fully blocks wireless transmission over a particular spectral range. In one example, a blocking layer completely covers one surface of a lite, e.g., surface 3 of an IGU. Examples of blocking structures for windows are described in U.S. patent application Ser. No. 15/709,339, filed Sep. 19, 2017, which is incorporated herein by reference in its entirety. Security systems employing repeaters may employ walls and windows that effectively block transmission of electromagnetic signals in certain regions of the spectrum, e.g., in at least the 5G region.

A signal repeater or re-transmitter need not retransmit the wireless signal directly across a wall or window. In some cases, it may selectively transmit a wireless signal through the building to one or more locations remote from where the signal was received. It may carry the received signal using a wired network running a protocol such as Ethernet. For example, an externally generated wireless signal is received on a sensor on a building's roof or an exterior wall and, from there, transmitted over wires to distant locations within the building such as ten floors below the roof or even to the basement.

In some cases, a re-transmitting system transmits cellular signals (or other appropriate wireless signals) to selected building locations at selected times, which may be delayed from when a wireless signal was initially received. In other words, the communications may be stored (e.g., in a buffer) and/or be re-transmitted after a delay. The re-transmission may be done independently of where and when communications embodied in the cellular signals are received.

2. Given the large number of 5G antennas expected to be required for adequate coverage and capacity in building-dense regions such as centers of certain large cities, deploying 5G antennas on exterior portions of buildings may supplement the data carrying and antenna infrastructure of a cellular carrier's network. In some cases, such antennas may be connected to high bandwidth network infrastructures such as the Ethernet network infrastructure within the buildings. An example fully or partially wired network infrastructure for supporting such 5G applications is described in WO 2019/246497, assigned to the assignee of the present invention and hereby incorporated herein by reference in its entirety.

Various arrangements of antennas may be deployed to support 5G cellular and other communications services. Both coverage and capacity may be considered when designing the wireless communication infrastructure. Coverage may be addressed by providing various antennas strategically located to provide cellular service to a defined area. Capacity may be addressed by having high-bandwidth data carrying lines and switches. Some examples of high capacity infrastructure are provided in US Provisional Patent Application No. WO 2019/246497, previously incorporated herein by reference in its entirety. Capacity may also be addressed by providing a plurality of antennas within a defined region.

In certain embodiments, individual antennas are dedicated to particular protocols, each having its own base band radio. For example, one or more antennas may be designed for use with low power citizens broadband radio (CBRS), including a CBRS base band radio. Note that in the United States CBRS is a 150 M Hz wide broadcast band of the 3.5 GHz band (3550 MHz to 3700 MHz), that may be used to provide wireless services unlicensed by the United States Federal Communications Commission. Other antennas and associated base band radios may be provided for cellular communications according with a particular protocol. The required base band radios may be installed at various locations in a building, including, for example, in digital architectural elements.

Various embodiments support multiple frequency bands and/or multiple protocols. Examples include cellular (3G, 4G, 5G, etc.), Wi-Fi, CBRS, and various wireless networks including WLANs and associated applications such as voice over WLAN. In some cases, a given antenna or combination of antennas, and sometimes associated transmitters and/or receivers, is protocol independent. For example, carrier A and carrier B may use different radios and/or protocols, some of which may be defined by the Multimedia over Coaxial Alliance (MoCA). In some instances, similar antenna structures may be used to send and/or receive signals for multiple protocols.

Certain infrastructures contain devices for interior (within a building) communications via a 5G protocol without supporting Wi-Fi. Because 5G is limited to a relatively small line of sight, many 5G antennas must be deployed throughout a building. These may be disposed at locations where Wi-Fi antennas normally reside. In some installations, 5G will have sufficient bandwidth and coverage to serve all the functions that Wi-Fi currently serves.

Tintable Windows, IGUs, and Window Networks

In various embodiments, although not all embodiments, a building network infrastructure supports a control system for one or more tintable windows such as electrochromic windows. While the disclosed embodiments focus on electrochromic windows (also referred to as optically switchable windows, tintable and smart windows), the concepts disclosed herein may apply to other types of switchable optical devices including, for example, liquid crystal devices and suspended particle devices, among others. For example, a liquid crystal device or a suspended particle device, rather than an electrochromic device, could be incorporated into some or all of the disclosed implementations.

Tintable Windows

A tintable window (sometimes referred to as an optically switchable window) is a window that exhibits a controllable and reversible change in an optical property when a stimulus is applied, e.g., an applied voltage. Tintable windows can be used to control lighting conditions and the temperature within a building by regulating the transmission of solar energy and thus heat load imposed on the interior of the building. The control may be manual or automatic and may be used for maintaining occupant comfort while reducing the energy consumption of heating, air conditioning and/or lighting systems. In some cases, tintable windows may be responsive to environmental sensors and user control. In this application, tintable windows are most frequently described with reference to electrochromic windows located between the interior and the exterior of a building or structure. However, this need not be the case. Tintable windows may operate using liquid crystal devices, suspended particle devices, microelectromechanical systems (MEMS) devices (such as microshutters), or any technology known now, or later developed, that is configured to control light transmission through a window. Windows with MEMS devices for tinting are further described in U.S. patent application Ser. No. 14/443,353, filed May 15, 2015, and titled "MULTI-PANE WINDOWS INCLUDING ELECTROCHROMIC DEVICES AND ELECTROMECHANICAL SYSTEMS DEVICES," which is herein incorporated by reference in its entirety. In some cases, tintable windows can be located within the interior of a building, e.g., between a conference room and a hallway. In some cases, tintable windows can be used in automobiles, trains, aircraft, and other vehicles in lieu of a passive or non-tinting window.

Electrochromic (EC) device coatings—An EC device coating (sometimes referred to as an EC device (ECD) is a coating including at least one layer of electrochromic material that exhibits a change from one optical state to another when an electric potential is applied across the EC device. The transition of the electrochromic layer from one optical state to another optical state can be caused by reversible ion insertion into the electrochromic material (for example, by way of intercalation) and a corresponding injection of charge-balancing electrons. In some instances, some fraction of the ions responsible for the optical transition is irreversibly bound up in the electrochromic material. In many EC devices, some or all of the irreversibly bound ions can be used to compensate for "blind charge" in the material.

In some implementations, suitable ions include lithium ions (Li+) and hydrogen ions (H+) (i.e., protons). In some other implementations, other ions can be suitable. Intercalation of lithium ions, for example, into tungsten oxide ($WO_{3-y}$ ($0<y\le\sim0.3$)) causes the tungsten oxide to change from a transparent state to a blue state. EC device coatings as described herein are located within the viewable portion of the tintable window such that the tinting of the EC device coating can be used to control the optical state of the tintable window.

A schematic cross-section of an electrochromic device 100 in accordance with some embodiments is shown in FIG. 1. The EC device coating is attached to a substrate 102, a transparent conductive layer (TCL) 104, an electrochromic layer (EC) 106 (sometimes also referred to as a cathodically coloring layer or a cathodically tinting layer), an ion conducting layer or region (IC) 108, a counter electrode layer (CE) 110 (sometimes also referred to as an anodically coloring layer or anodically tinting layer), and a second TCL 114. Elements 104, 106, 108, 110, and 114 are collectively referred to as an electrochromic stack 120. A voltage source 116 operable to apply an electric potential across the electrochromic stack 120 effects the transition of the electrochromic coating from, e.g., a clear state to a tinted state. In other embodiments, the order of layers is reversed with respect to the substrate. That is, the layers are in the following order: substrate, TCL, counter electrode layer, ion conducting layer, electrochromic material layer, TCL.

In various embodiments, the ion conductor region 108 may form from a portion of the EC layer 106 and/or from a portion of the CE layer 110. In such embodiments, the electrochromic stack 120 may be deposited to include cathodically coloring electrochromic material (the EC layer) in direct physical contact with an anodically coloring counter electrode material (the CE layer). The ion conductor region 108 (sometimes referred to as an interfacial region, or as an ion conducting substantially electronically insulating layer or region) may then form where the EC layer 106 and the CE layer 110 meet, for example through heating and/or other processing steps. Electrochromic devices fabricated without depositing a distinct ion conductor material are further discussed in U.S. patent application Ser. No. 13/462,725, filed May 2, 2012, and titled "ELECTROCHROMIC DEVICES," which is herein incorporated by reference in its entirety. In some embodiments, an EC device coating may also include one or more additional layers such as one or more passive layers. For example, passive layers can be used to improve certain optical properties, to provide moisture or to provide scratch resistance. These or other passive layers also can serve to hermetically seal the EC stack 120. Additionally, various layers, including transparent conducting layers (such as 104 and 114), can be treated with anti-reflective or protective oxide or nitride layers.

In certain embodiments, the electrochromic device is configured to reversibly cycle between a clear state and a tinted state. In the clear state, a potential is applied to the electrochromic stack 120 such that available ions in the stack that can cause the electrochromic material 106 to be in the tinted state reside primarily in the counter electrode 110. When the potential applied to the electrochromic stack is reversed, the ions are transported across the ion conducting layer 108 to the electrochromic material 106 and cause the material to enter the tinted state.

It should be understood that the reference to a transition between a clear state and tinted state is non-limiting and suggests only one example, among many, of an electrochromic transition that may be implemented. Unless otherwise specified herein, whenever reference is made to a clear-tinted transition, the corresponding device or process encompasses other optical state transitions such as non-reflective-reflective, transparent-opaque, etc. Further, the terms "clear" and "bleached" refer to an optically neutral state, e.g., untinted, transparent or translucent. Still further, unless specified otherwise herein, the "color" or "tint" of an electrochromic transition is not limited to any particular wavelength or range of wavelengths. As understood by those of skill in the art, the choice of appropriate electrochromic and counter electrode materials governs the relevant optical transition.

In certain embodiments, all of the materials making up electrochromic stack 120 are inorganic, solid (i.e., in the solid state), or both inorganic and solid. Because organic materials tend to degrade over time, particularly when exposed to heat and UV light as tinted building windows are, inorganic materials offer the advantage of a reliable electrochromic stack that can function for extended periods of time. Materials in the solid state also offer the advantage of not having containment and leakage issues, as materials in the liquid state often do. It should be understood that any one or more of the layers in the stack may contain some amount of organic material, but in many implementations, one or more of the layers contain little or no organic matter. The same can be said for liquids that may be present in one or more layers in small amounts. It should also be understood that solid state material may be deposited or otherwise formed by processes employing liquid components such as certain processes employing sol-gels or chemical vapor deposition.

Figure 2A:
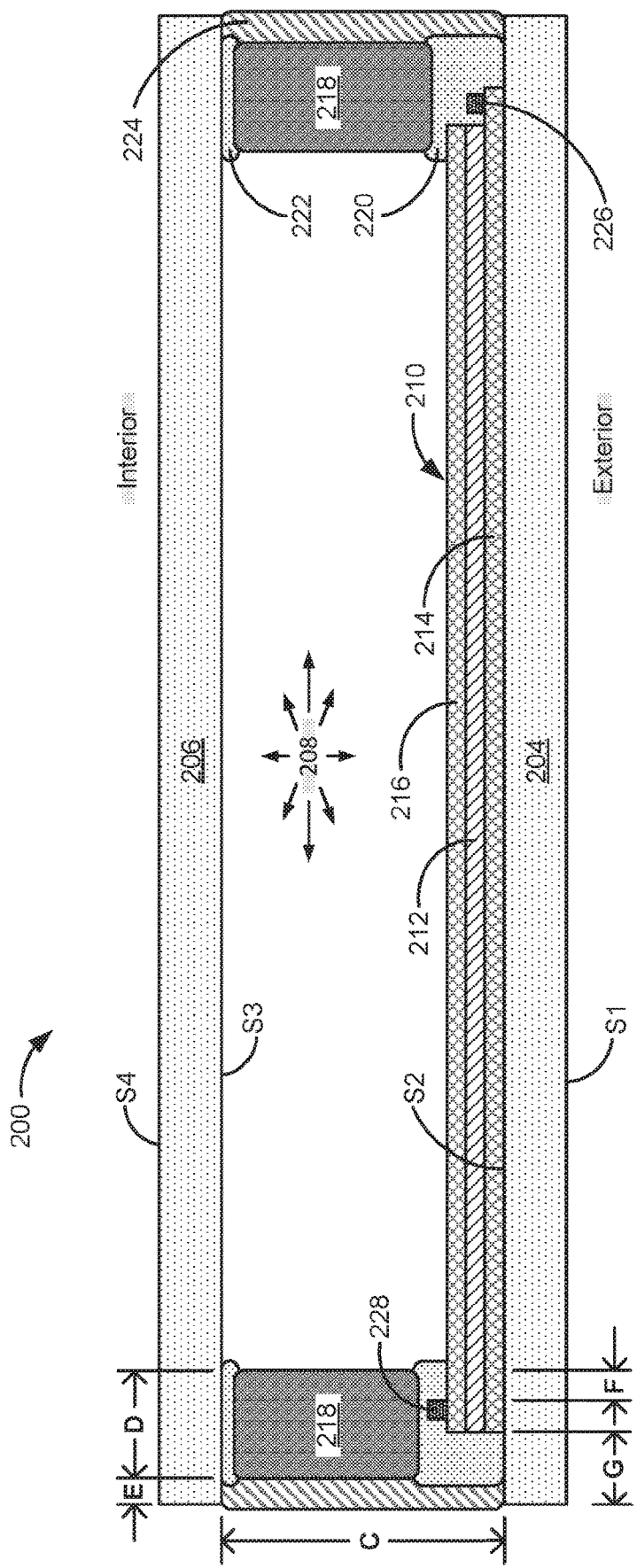
FIG. 2A show a cross-sectional side view of a tintable window constructed as an IGU.
Figure 2B:
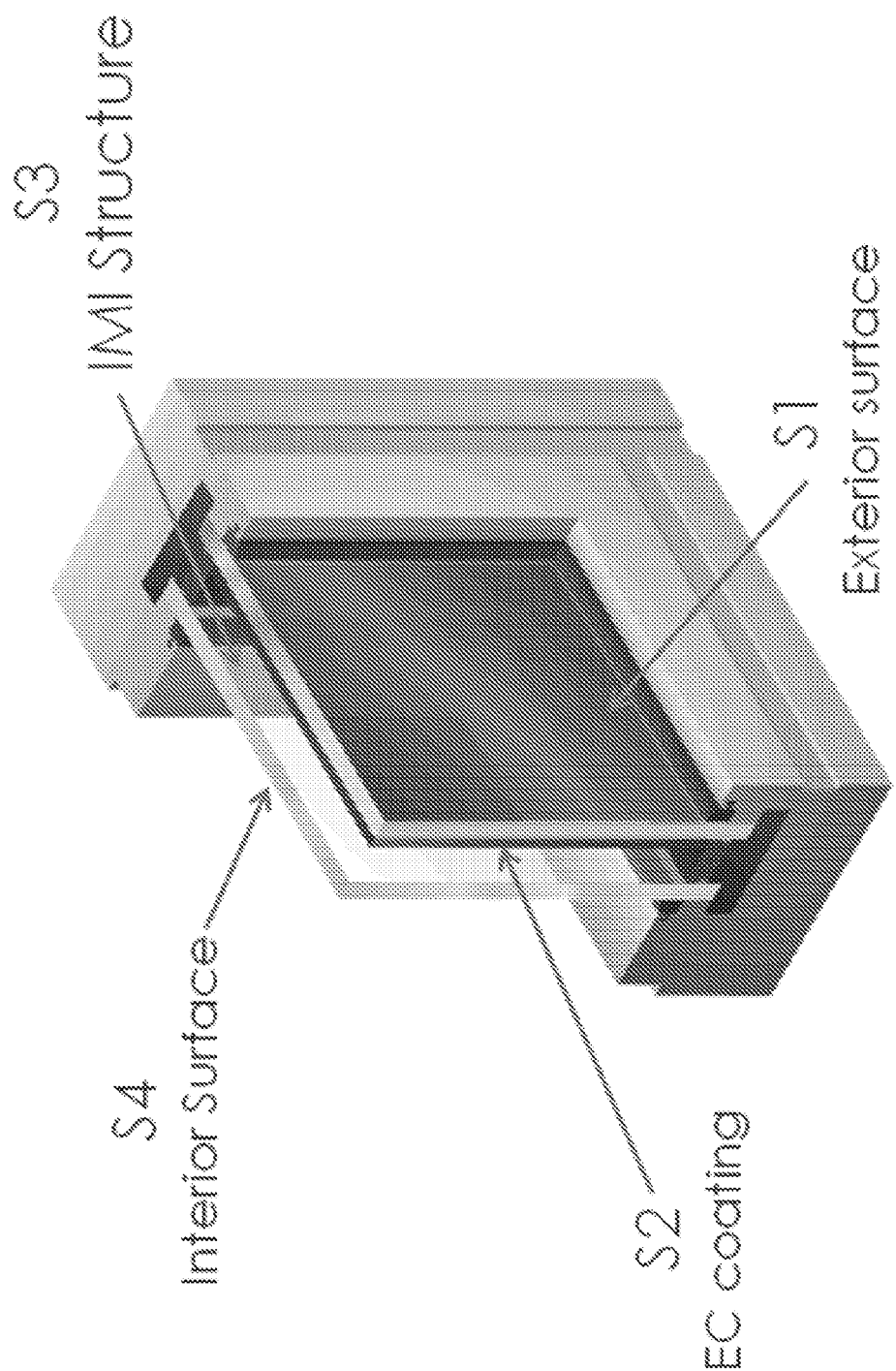
FIG. 2B shows a perspective sectional view of a corner portion of an IGU.

FIGS. 2A and 2B show a cross-sectional view of an example tintable window embodied in an insulated glass unit ("IGU") 200 in accordance with some implementations. Generally speaking, unless stated otherwise, the terms "IGU," "tintable window," and "optically switchable window" are used interchangeably. This depicted convention is generally used, for example, because it is common and because it can be desirable to have IGUs serve as the fundamental constructs for holding electrochromic panes (also referred to as "lites") when provided for installation in a building. An IGU lite or pane may be a single substrate or a multi-substrate construct, such as a laminate of two substrates. IGUs, especially those having double- or triple-pane configurations, can provide a number of advantages over single pane configurations; for example, multi-pane configurations can provide enhanced thermal insulation, noise insulation, environmental protection and/or durability when compared with single-pane configurations. A multi-pane configuration also can provide increased protection for an ECD, for example, because the electrochromic films, as well as associated layers and conductive interconnects, can be formed on an interior surface of the multi-pane IGU and be protected by an inert gas fill in the interior volume, 208, of the IGU. The inert gas fill provides at least some of the (heat) insulating function of an IGU. Electrochromic IGU's have added heat blocking capability by virtue of a tintable coating that absorbs (or reflects) heat and light.

FIG. 2A shows an example implementation of an IGU 200 that includes a first pane 204 having a first surface S1 and a second surface S2. In some implementations, the first surface S1 of the first pane 204 faces an exterior environment, such as an outdoors or outside environment. The IGU 200 also includes a second pane 206 having a first surface S3 and a second surface S4. In some implementations, the second surface S4 of the second pane 206 faces an interior environment, such as an inside environment of a home, building or vehicle, or a room or compartment within a home, building or vehicle.

In some implementations, each of the first and the second panes 204 and 206 are transparent or translucent—at least to light in the visible spectrum. For example, each of the panes 204 and 206 can be formed of a glass material and especially an architectural glass or other shatter-resistant glass material such as, for example, a silicon oxide ($SO_x$)-based glass material. As a more specific example, each of the first and the second panes 204 and 206 can be a soda-lime glass substrate or float glass substrate. Such glass substrates can be composed of, for example, approximately 75% silica ($SiO_2$) as well as $Na_2O$, CaO, and several minor additives. However, each of the first and the second panes 204 and 206 can be formed of any material having suitable optical, electrical, thermal, and mechanical properties. For example, other suitable substrates that can be used as one or both of the first and the second panes 204 and 206 can include other glass materials as well as plastic, semi-plastic and thermoplastic materials (for example, poly(methyl methacrylate), polystyrene, polycarbonate, allyl diglycol carbonate, SAN (styrene acrylonitrile copolymer), poly(4-methyl-1-pentene), polyester, polyamide), or mirror materials. In some implementations, each of the first and the second panes 204 and 206 can be strengthened, for example, by tempering, heating, or chemically strengthening.

Generally, each of the first and the second panes 204 and 206, as well as the IGU 200 as a whole, is a rectangular solid. However, in some other implementations other shapes are possible and may be desired (for example, circular, elliptical, triangular, curvilinear, convex or concave shapes). In some specific implementations, a length "L" of each of the first and the second panes 204 and 206 can be in the range of approximately 20 inches (in.) to approximately 10 feet (ft.), a width "W" of each of the first and the second panes 204 and 206 can be in the range of approximately 20 in. to approximately 10 ft., and a thickness "T" of each of the first and the second panes 204 and 206 can be in the range of approximately 0.3 millimeters (mm) to approximately 10 mm (although other lengths, widths or thicknesses, both smaller and larger, are possible and may be desirable based on the needs of a particular user, manager, administrator, builder, architect or owner). In examples where thickness T of substrate 204 is less than 3 mm, typically the substrate is laminated to an additional substrate which is thicker and thus protects the thin substrate 204. Additionally, while the IGU 200 includes two panes (204 and 206), in some other implementations, an IGU can include three or more panes.

Furthermore, in some implementations, one or more of the panes can itself be a laminate structure of two, three, or more layers or sub-panes.

The first and second panes 204 and 206 are spaced apart from one another by a spacer 218, which is typically a frame structure, to form an interior volume 208. In some implementations, the interior volume is filled with Argon (Ar), although in some other implementations, the interior volume 108 can be filled with another gas, such as another noble gas (for example, krypton (Kr) or xenon (Xe)), another (non-noble) gas, or a mixture of gases (for example, air). Filling the interior volume 208 with a gas such as Ar, Kr, or Xe can reduce conductive heat transfer through the IGU 200 because of the low thermal conductivity of these gases as well as improve acoustic insulation due to their increased atomic weights. In some other implementations, the interior volume 208 can be evacuated of air or other gas. Spacer 218 generally determines the height "C" of the interior volume 208; that is, the spacing between the first and the second panes 204 and 206. In FIG. 2A, the thickness of the ECD, sealant 220/222 and bus bars 226/228 is not to scale; these components are generally very thin but are exaggerated here for ease of illustration only. In some implementations, the spacing "C" between the first and the second panes 204 and 206 is in the range of approximately 6 mm to approximately 30 mm. The width "D" of spacer 218 can be in the range of approximately 5 mm to approximately 25 mm (although other widths are possible and may be desirable).

Although not shown in the cross-sectional view, spacer 218 is generally a frame structure formed around all sides of the IGU 200 (for example, top, bottom, left and right sides of the IGU 200). For example, spacer 218 can be formed of a foam or plastic material. However, in some other implementations, spacers can be formed of metal or other conductive material, for example, a metal tube or channel structure having at least 3 sides, two sides for sealing to each of the substrates and one side to support and separate the lites and as a surface on which to apply a sealant, 224. A first primary seal 220 adheres and hermetically seals spacer 218 and the second surface S2 of the first pane 204. A second primary seal 222 adheres and hermetically seals spacer 218 and the first surface S3 of the second pane 206. In some implementations, each of the primary seals 220 and 222 can be formed of an adhesive sealant such as, for example, polyisobutylene (PIB). In some implementations, IGU 200 further includes secondary seal 224 that hermetically seals a border around the entire IGU 200 outside of spacer 218. To this end, spacer 218 can be inset from the edges of the first and the second panes 204 and 206 by a distance "E." The distance "E" can be in the range of approximately 4 mm to approximately 8 mm (although other distances are possible and may be desirable). In some implementations, secondary seal 224 can be formed of an adhesive sealant such as, for example, a polymeric material that resists water and that adds structural support to the assembly, such as silicone, polyurethane and similar structural sealants that form a watertight seal.

In the implementation shown in FIG. 2A, an ECD 210 is formed on the second surface S2 of the first pane 204. In some other implementations, ECD 210 can be formed on another suitable surface, for example, the first surface S1 of the first pane 204, the first surface S3 of the second pane 206 or the second surface S4 of the second pane 206. The ECD 210 includes an electrochromic ("EC") stack 212, which itself may include one or more layers as described with reference to FIG. 1.

Window Controllers

Window controllers may be associated with one or more tintable windows and are configured to control a window's optical state by applying a stimulus to the window—e.g., by applying a voltage or a current to an EC device coating. Window controllers as described herein may have many sizes, formats, and locations with respect to the optically switchable windows they control. Typically, a controller may be attached to a lite of an IGU or laminate, but it can also be in a frame that houses the IGU or laminate or even in a separate location. As previously mentioned, a tintable window may include one, two, three or more individual electrochromic panes (an electrochromic device on a transparent substrate). Also, an individual pane of an electrochromic window may have an electrochromic coating that has independently tintable zones. A controller as described herein can control all electrochromic coatings associated with such windows, whether the electrochromic coating is monolithic or zoned.

If not directly attached to a tintable window, IGU, or frame, the window controller is generally located in proximity to the tintable window. For example, a window controller may be adjacent to the window, on the surface of one of the window's lites, within a wall next to a window, or within a frame of a self-contained window assembly. In some embodiments, the window controller is an "in situ" controller; that is, the controller is part of a window assembly, an IGU or a laminate, and may not have to be matched with the electrochromic window, and installed, in the field, e.g., the controller travels with the window as part of the assembly from the factory. The controller may be installed in the window frame of a window assembly, or be part of an IGU or laminate assembly, for example, mounted on or between panes of the IGU or on a pane of a laminate. In cases where a controller is located on the visible portion of an IGU, at least a portion of the controller may be substantially transparent. Further examples of on-glass controllers are provided in U.S. patent application Ser. No. 14/951,410, filed Nov. 14, 2015, and titled "SELF CONTAINED EC IGU," which is herein incorporated by reference in its entirety. In some embodiments, a localized controller may be provided as more than one part, with at least one part (e.g., including a memory component storing information about the associated electrochromic window) being provided as a part of the window assembly and at least one other part being separate and configured to mate with the at least one part that is part of the window assembly, IGU or laminate. In certain embodiments, a controller may be an assembly of interconnected parts that are not in a single housing, but rather spaced apart, e.g., in the secondary seal of an IGU. In other embodiments the controller is a compact unit, e.g., in a single housing or in two or more components that combine, e.g., a dock and housing assembly, that is proximate the glass, not in the viewable area, or mounted on the glass in the viewable area.

In one embodiment, the window controller is incorporated into or onto the IGU and/or the window frame prior to installation of the tintable window, or at least in the same building as the window. In one embodiment, the controller is incorporated into or onto the IGU and/or the window frame prior to leaving the manufacturing facility. In one embodiment, the controller is incorporated into the IGU, substantially within the secondary seal. In another embodiment, the controller is incorporated into or onto the IGU, partially, substantially, or wholly within a perimeter defined by the primary seal between the sealing separator and the substrate.

The controller may be part of an IGU and/or a window assembly, e.g., it may travel with the IGU or window unit. When a controller is part of the IGU assembly, the IGU can possess logic and features of the controller.

In the event that characteristics of the electrochromic device(s) change over time (e.g., through degradation), a characterization function can be used, for example, to update control parameters used to drive tint state transitions. In another example, if already installed in an electrochromic window unit, the logic and features of the controller can be used to calibrate the control parameters to match the intended installation, and for example if already installed, the control parameters can be recalibrated to match the performance characteristics of the electrochromic pane(s).

In other embodiments, a controller is not pre-associated with a window, but rather a dock component, e.g., having parts generic to any electrochromic window, is associated with each window at the factory. After window installation, or otherwise in the field, a second component of the controller is combined with the dock component to complete the electrochromic window controller assembly. The dock component may include a chip which is programmed at the factory with the physical characteristics and parameters of the particular window to which the dock is attached (e.g., on the surface which will face the building's interior after installation, sometimes referred to as surface 4 or "S4"). The second component (sometimes called a "carrier," "casing," "housing," or "controller") is mated with the dock, and when powered, the second component can read the chip and configure itself to power the window according to the particular characteristics and parameters stored on the chip. In this way, the shipped window need only have its associated parameters stored on a chip, which is integral with the window, while the more sophisticated circuitry and components can be combined later (e.g., shipped separately and installed by the window manufacturer after the glazier has installed the windows, followed by commissioning by the window manufacturer). Various embodiments will be described in more detail below. In some embodiments, the chip is included in a wire or wire connector attached to the window controller. Such wires with connectors are sometimes referred to as pigtails.

As discussed, an "IGU" includes two (or more) substantially transparent substrates, for example, two panes of glass, where at least one substrate includes an electrochromic device disposed thereon, and the panes have a separator disposed between them. An IGU is typically hermetically sealed, having an interior region that is isolated from the ambient environment. A "window assembly" may include an IGU or for example a stand-alone laminate, and includes electrical leads for connecting the IGUs or laminates one or more electrochromic devices to a voltage source, switches and the like, and may include a frame that supports the IGU or laminate. A window assembly may include a window controller as described herein, and/or components of a window controller (e.g., a dock).

As used herein, the term outboard means closer to the outside environment, while the term inboard means closer to the interior of a building. For example, in the case of an IGU having two panes, the pane located closer to the outside environment is referred to as the outboard pane or outer pane, while the pane located closer to the inside of the building is referred to as the inboard pane or inner pane. As illustrated with respect to FIGS. 2A and 2B, the different surfaces of the IGU may be referred to as S1, S2, S3, and S4 (assuming a two-pane IGU). S1 refers to the exterior-facing surface of the outboard lite (i.e., the surface that can be physically touched by someone standing outside). S2 refers to the interior-facing surface of the outboard lite. S3 refers to the exterior-facing surface of the inboard lite. S4 refers to the interior-facing surface of the inboard lite (i.e., the surface that can be physically touched by someone standing inside the building). In other words, the surfaces are labeled S1-S4, starting from the outermost surface of the IGU and counting inwards. In cases where an IGU includes three panes, this trend holds (with S6 being the surface that can be physically touched by someone standing inside the building). In certain embodiments employing two panes, the electrochromic device (or other optically switchable device) is disposed on S3. In certain embodiments, one or more of the surfaces has a structure for blocking transmission of electromagnetic radiation. In FIG. 2B, this is illustrated as an "IMI" (a shielding stack of multiple conductive layers) on S3. Additional aspects of shielding stack structures are presented in U.S. patent application Ser. No. 15/709,339, filed Sep. 19, 2017, which is incorporated herein by reference in its entirety.

Further examples of window controllers and their features are presented in U.S. patent application Ser. No. 13/449,248, filed Apr. 17, 2012, and titled "CONTROLLER FOR OPTICALLY-SWITCHABLE WINDOWS"; U.S. patent application Ser. No. 13/449,251, filed Apr. 17, 2012, and titled "CONTROLLER FOR OPTICALLY-SWITCHABLE WINDOWS"; U.S. patent application Ser. No. 15/334,835, filed Oct. 26, 2016, and titled "CONTROLLERS FOR OPTICALLY-SWITCHABLE DEVICES"; and International Patent Application No. PCT/US17/20805, filed Mar. 3, 2017, and titled "METHOD OF COMMISSIONING ELECTROCHROMIC WINDOWS," each of which is herein incorporated by reference in its entirety.

Window Control System

When a building is outfitted with tintable windows, window controllers may be connected to one another and/or other entities via a communications network sometimes referred to as a window control network or a window network. The network and the various devices (e.g., controllers and sensors) that are connected via the network (e.g., wired or wireless power transfer and/or communication) are referred to herein as a window control system. Window control networks may provide tint instructions to window controllers, provide window information to master controllers or other network entities, and the like. Examples of window information include current tint state or other information collected by window controller. In some cases, a window controller has one or more associated sensors including, for example, a photosensor, a temperature sensor, an occupancy sensor, and/or gas sensors that provide sensed information over the network. In some cases, information transmitted over a window communication network need not impact window control. For example, information received at a first window configured to receive a Wi-Fi or LiFi signal may be transmitted over the communication network to a second window configured to wirelessly broadcast the information as, e.g., a Wi-Fi or LiFi signal. A window control network need not be limited to providing information for controlling tintable windows, but may also be able to communicate information for other devices interfacing with the communications network such as HVAC systems, lighting systems, security systems, personal computing devices, and the like.

Figure 3:
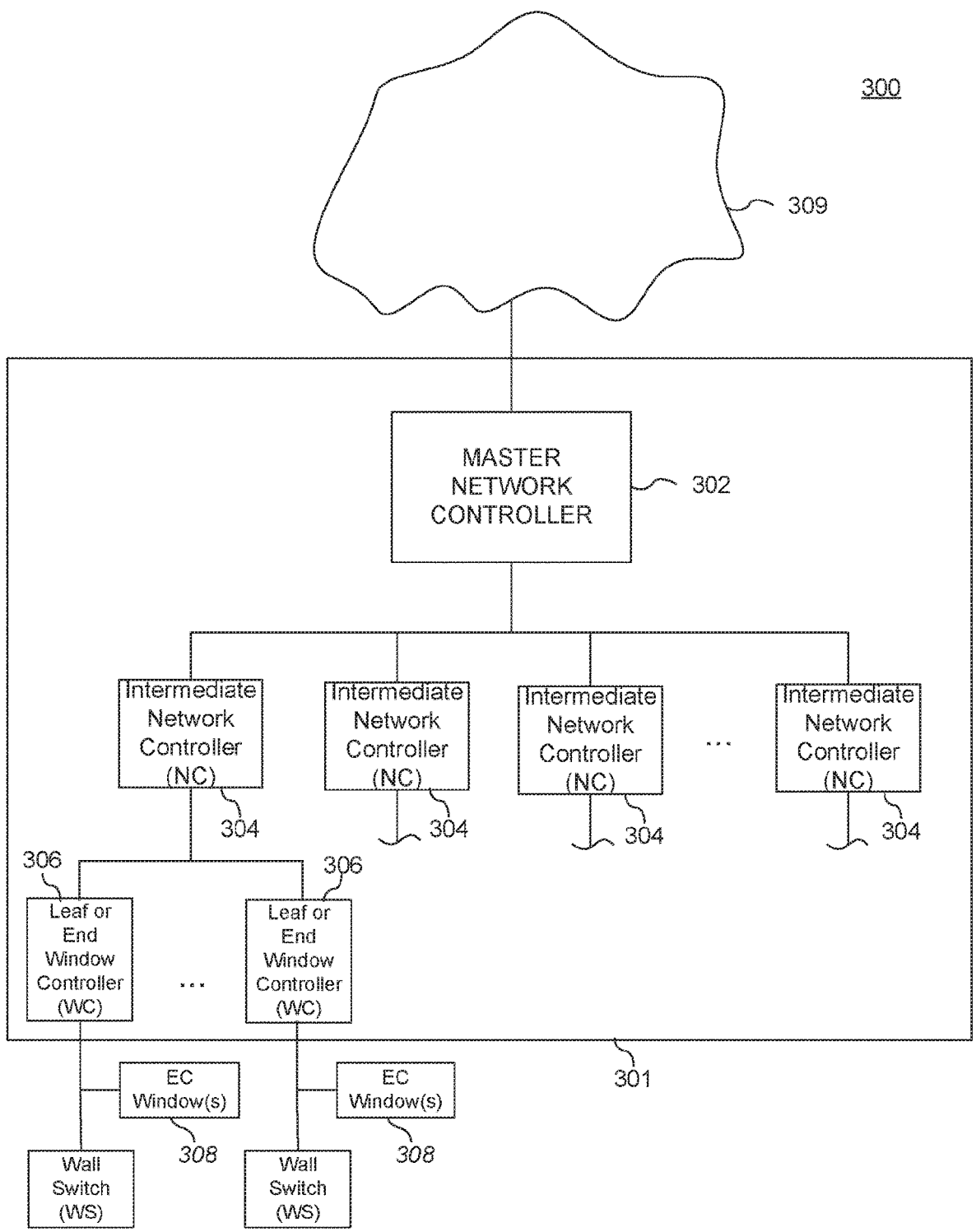
FIG. 3 depicts an example of a window control network of a window control system having one or more tintable windows.

FIG. 3 provides an example of a control network 301 of a window control system 300. The network may distribute both control instructions and feedback, as well as serving as a power distribution network. A master controller 302 communicates and functions in conjunction with multiple network controllers 304, each of which network controllers is capable of addressing a plurality of window controllers 306 (sometimes referred to herein as leaf controllers) that apply a voltage or current to control the tint state of one or more optically switchable windows 308. Communication controllers (304, 306, and 308) may occur via wired (e.g., Ethernet) or via a wireless (e.g., Wi-Fi, CBRS, cellular, or LiFi) connection. In some implementations, the master controller issues the high-level instructions (such as the final tint states of the electrochromic windows) to the network controllers, and the network controllers then communicate the instructions to the corresponding window controllers. Typically a master controller is configured to communicate with one or more outward face networks 309. Window control network 301 can include any suitable number of distributed controllers having various capabilities or functions and need not be arranged in the hierarchical structure depicted in FIG. 3. Network 301 may also be used as a communication network between distributed controllers (e.g., 302, 304, 306) that act as communication nodes to other devices or systems (e.g., 309).

In some embodiments, outward facing network 309 is part of or connected to a building management system (BMS). A BMS is a computer-based control system that can be installed in a building to monitor and control the building's mechanical and electrical equipment. A BMS may be configured to control the operation of HVAC systems, lighting systems, power systems, elevators, fire systems, security systems, and other safety systems. BMSs are frequently used in large buildings where they function to control the environment within the building. For example, a BMS may monitor and control the lighting, temperature, carbon dioxide levels, and humidity within the building. In doing so, a BMS may control the operation of furnaces, air conditioners, blowers, vents, gas lines, water lines, and the like. To control a building's environment, the BMS may turn on and off these various devices according to rules established by, for example, a building administrator. One function of a BMS is to maintain a comfortable environment for the occupants of a building. In some implementations, a BMS can be configured not only to monitor and control building conditions, but also to optimize the synergy between various systems—for example, to conserve energy and lower building operation costs. In some implementations, a BMS can be configured with a disaster response. For example, a BMS may initiate the use of backup generators and turn off water lines and gas lines. In some cases, a BMS has a more focused application—e.g., simply controlling the HVAC system—while parallel systems such as lighting, tintable window, and/or security systems stand alone or interact with the BMS.

In some embodiments, network 309 is a remote network. For example, network 309 may operate in the cloud or on a device remote from the building having the optically switchable windows. In some embodiments, network 309 is a network that provides information or allows control of optically switchable windows via a remote wireless device. In some cases, network 309 includes seismic event detection logic. Further examples of window control systems and their features are presented in U.S. patent application Ser. No. 15/334,832, filed Oct. 26, 2016, and titled "CONTROLLERS FOR OPTICALLY-SWITCHABLE DEVICES" and International Patent Application No. PCT/US17/62634, filed on Nov. 23, 2016, and titled "AUTOMATED COMMISSIONING OF CONTROLLERS IN A WINDOW NETWORK," both of which are herein incorporated by reference in its entirety.

While the depicted embodiment shows windows 308 and a window control network 301, it should be understood that some embodiments do not include EC windows or any other type of optically switchable windows. Further, in certain embodiments, the network includes controllers, but the controllers do not control windows. In some embodiments, the network has a topology similar to that depicted in FIG. 3, but it does not necessarily serve to control windows. Such network may serve various other purposes, and might or might not include providing instructions for controlling tint states of optically switchable windows or other building functions. In some cases, the network is initially deployed without optically switchable windows, but later such windows are installed and attached to the network. With or without the windows attached, the network can provide various functions unrelated to window control. For example, in certain embodiments a building façade (envelope) computing and power distribution system, with or without switchable windows, is described. Such systems can be installed early in a building's construction, and thus supply power and computing power, e.g. an edge computing platform and/or cloud that can be used to complete construction and/or be used by the building occupants when the building construction is complete and the building is occupied. See for example the discussion of PCT Patent Application No. PCT/US19/30467, filed May 2, 2019, which is incorporated herein by reference in its entirety.

It should be understood that the communications infrastructure as disclosed herein may be provided with or without providing optically switchable windows. In the latter case, i.e., without window infrastructure, the network need not be connected electrically switchable windows, contain window controllers, and/or have logic for determining appropriate optical states for windows.

Communications Infrastructure Components

Building network infrastructures typically include various components such as antennas for receiving and/or transmitting wireless signals, high-speed switches or other network devices for coupling information between the antennas and cables, and high-capacity lines for carrying information to or from antennas.

High capacity cables, twisted pair conductors, or other data carrying lines may be employed. In certain embodiments, such lines are configured to carry at least 1 gigabit/second Ethernet communications, or at least 10 gigabit/second Ethernet communications. In certain embodiments, such lines are coaxial cables, coupled to a MoCA circuitry as described in in U.S. Provisional Patent Application No. 62/803,324, filed Feb. 8, 2019, previously incorporated herein by reference in its entirety.

Regarding antennas, some of these may face into a building interior (e.g. the antennas are positioned and oriented to send and/or receive electromagnetic signal in the direction of a room or other internal portion of the building). In some cases, one or more antennas face outward, away from the building interior. Such antennas may be positioned and oriented to send and/or receive electromagnetic signals (e.g., cellular signals) outside the building. Still other antennas may be omnidirectional, or nearly omnidirectional.

The network infrastructure may include one or more radios that work with the antennas. Various radios may be employed for the various communications protocols employed in the building. The radios may include radio frequency (RF) radio chip sets from various vendors. Radios may employ one or more circuits for receiving wireless signals from an antenna and providing electrical signals onto a cable communicating over appropriate format such as MoCA (see, e.g., MoCA transceiver devices from Maxlinear of Carlsbad, Calif.).

The network infrastructure described herein may serve various devices provided by building occupants and the building itself. Generally, the infrastructure may serve any devices that use communications. Examples include mobile phones, tablets, Internet of Things (IoT) devices, sensors, computers, displays, and the like.

In some cases, the building network infrastructure provides controlled transmission by having a receiver antenna on the outside of the building and one or more retransmitter antennas on the inside of the building. However, in cases where the building works in conjunction with a wider geographic cellular communications infrastructure, the building may have one or more transmitter antennas on the outside of the building, as well as receiver antennas on the inside and/or outside of the building. In certain embodiments, an exterior antenna disposed, for example, on the roof of a building is configured to interface with cellular communications such as 4G or 5G communications. Such antenna may be integrated with or otherwise collocated with a sky or ring sensor having one or more air or weather sensors, such as described in U.S. patent application Ser. No. 15/287,646, filed Oct. 6, 2016, and incorporated herein by reference in its entirety. In certain embodiments, a sky or ring sensor includes a plurality of air sensors, environmental sensors such as radiation sensors (e.g., infrared and/or visible spectrum photosensors), or other types of sensors. In some embodiments, one or more of the sensors is oriented or otherwise configured to capture information for determining and/or predicted weather at the building. For example, photosensors and/or infrared sensors may be used to determine cloud conditions (e.g., types, locations, and amounts of cloud cover), temperature, radiant flux, and the like. Any of these parameters may be monitored over time and/or in multiple directions.

In some cases, some radiation sensors are azimuthally distributed around a horizontally or substantially horizontally oriented ring or other planar structure, and facing outward, away from the ring or other structure on which they are mounted. In some embodiments, in addition to the azimuthally distributed sensors, the sky or ring sensor includes one or more additional sensors facing upward, or substantially upward, to detect radiation coming from above. In various embodiments, the sky or ring sensor is mounted on the roof of a building for which the sensed quantities may be used in routines for determining window tint states and/or other building parameter settings. As explained more fully herein, a sky or ring sensor may include one or more antennas configured to send and/or receive cellular communications (e.g., 5G cellular communications). Unless otherwise specified, when this disclosure refers to an antenna mounted on a building's roof, such antenna may be implemented in a sky or ring sensor.

As indicated, the building network infrastructure may employ active coupling and transmission in which electromagnetic signals are received at one location, converted to digital or analog format, and then transmitted as electromagnetic signals at a different location. In some cases, the building network infrastructure includes components that serve as repeaters, coupling electromagnetic signals sent or received at antennas to data transmission on building network infrastructure (wired or unwired).

Building network infrastructure components may be integrated at any of various levels within a building or a building floor. In various embodiments, a building floor or a portion of the floor has a control panel with multiple lines coming off of it for distributing signal to interior antennas. In some cases, network infrastructure is divided based on tenancy, with one or more tenants receiving access to some network resources but not others, while other tenants receive a different suite of network services.

Figure 4A:
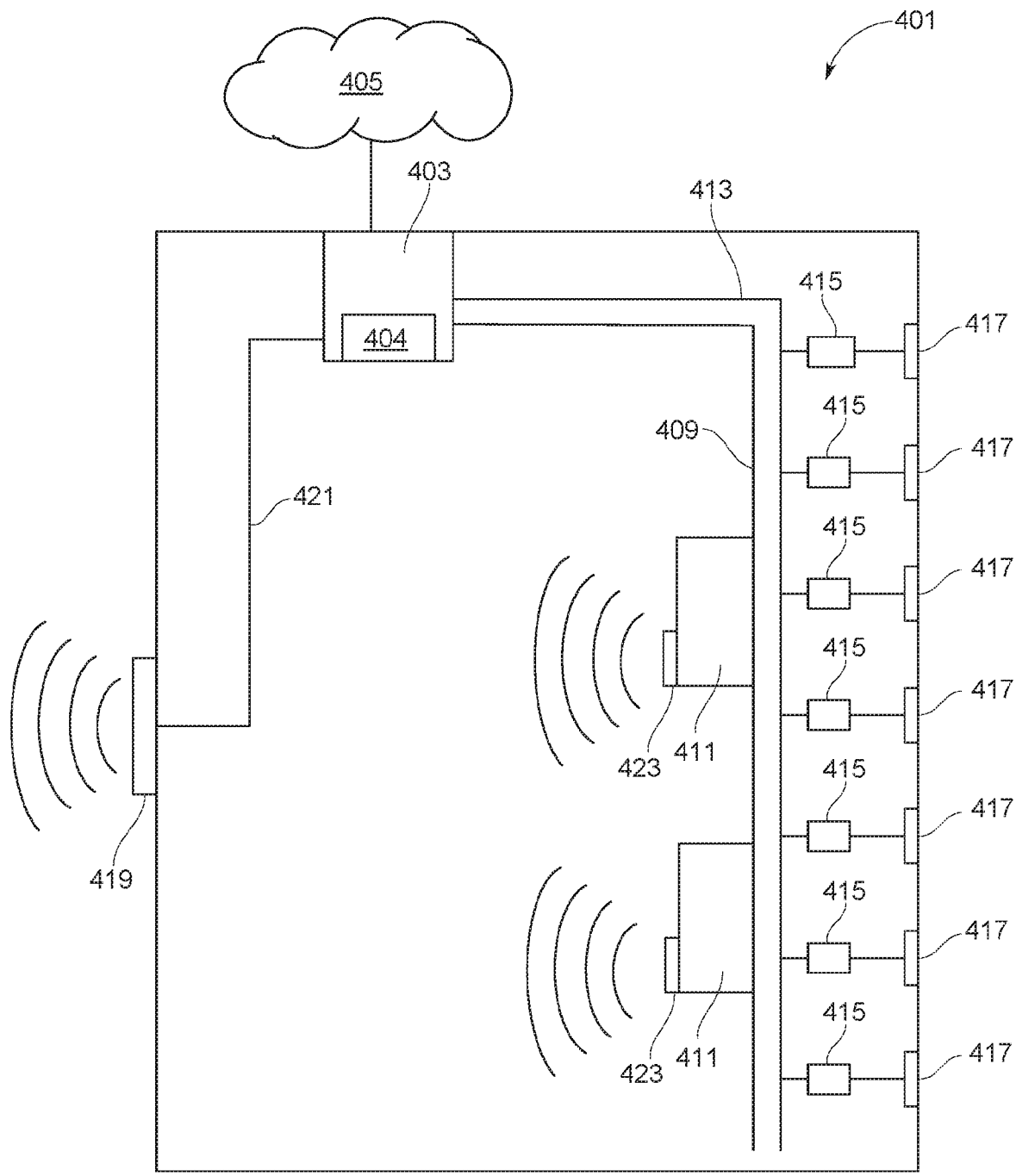
FIG. 4A is a simplified view a building network infrastructure, including a control panel, antennas, and various devices, for a room.

FIG. 4A illustrates an example of a portion of a building communications infrastructure 401 in a room or other portion of a floor of a building. A similar portion of a communications infrastructure may be replicated in other regions of the floor and across multiple floors, if they exist, in the building.

As illustrated in FIG. 4A, a control panel 403 provides an interface between communications devices in the building infrastructure 401 and an external network 405 such as a wide area network, the internet, one or more cloud based storage and/or processing resources, etc. The control panel 403 may include various components for providing communications and power distribution resources to its portion of the building. Examples of communications resources that may be provided in control panel 403 include a master controller and/or a network controller. Examples of power distribution resources that may be included in control panel 403 include transformers and interfaces providing class 1 or class 2 power to window controllers and/or other devices in the network infrastructure. For more information on control panels and master and network controllers see, e.g., U.S. patent application Ser. No. 15/365,685, filed Nov. 30, 2016, and U.S. patent application Ser. No. 15/365,685, filed Oct. 26, 2016, both incorporated herein by reference in their entireties.

The control panel 403 includes one or more devices configured to provide high speed communications on one or more internal networks such as networks having coaxial signal carrying lines. For example, a MoCA device/interface may be employed for this purpose. See for example U.S. Patent Application No. 62/803,324, filed Feb. 8, 2019, previously incorporated herein by reference in its entirety. Control panel 403 may additionally include one or more devices configured to provide data and instructions to window controllers over a separate network such as a controller area network (CAN). As depicted in FIG. 4A, the control panel 403 may include a MoCA transceiver 404.

In the illustrated example, conductive lines 409 (e.g., coaxial cables) are configured to carry high speed communications (e.g., via Ethernet) between the control panel 403 and one or more digital elements such as digital wall interfaces and digital architectural elements 411. Similarly, conductive lines 413 are configured to carry data and communications (e.g., via a CANbus) between control panel 403 and one or more window controllers 415, disposed along a wall of room or portion of building floor housing infrastructure 401. In the illustrated example, each window controller 415 controls an associated electrically switchable window 417. In some cases, a single window controller controls two or more electrically switchable windows.

In the illustrated example, the communications infrastructure 401 includes an externally facing antenna 419 configured to send and/or receive wireless communications signals between locations outside the building (or portion of a building) and the portion of the building housing infrastructure 401. As illustrated, a communications link 421 (wired or wireless) connects antenna 419 to control panel 403. As a result, externally generated communications provided by, e.g., cellular signals, may be coupled to the interior of the building or portion of the building, even if the cellular signals cannot penetrate walls and windows of the building.

In certain embodiments, one or more of digital architectural elements 411 include a respective antenna 423, which may be configured to provide Wi-Fi, cellular (e.g., 5G), Bluetooth, etc. communications with communications devices in the building or portion of the building. Digital architectural elements 411 may have a variety of sensors, user interface devices, computational/processing devices, and/or audio devices. Aspects of digital architectural elements are described in U.S. Patent Application No. 62/803,324, filed Feb. 8, 2019, previously incorporated herein by reference in its entirety.

Various devices may be employed to couple antennas to Ethernet communication such as MoCA protocol Ethernet communication. Such devices may be located in, for example, in a control panel and/or in a digital element such as a digital architectural element 411. In certain implementations, a single chip or transceiver device may be employed to convert analog signals from an antenna to gigabit Ethernet communications provided over a coaxial cable, and vice versa. In other implementations, multiple integrated circuits may be required to perform the translation. In one example, a suitable device has three ports, one for a coaxial cable, e.g., one port suitable for sending and receiving gigabit Ethernet communications according to the MoCA protocol, one port for a Peripheral Component Interconnect (PCI) bus (e.g., a PCI Express (PCIE) bus), and a third port for a conventional gigabit Ethernet communication. In another example, a suitable device also has three ports, but with one for a coaxial cable and MoCA communication, and two other ports for a conventional gigabit Ethernet communication. Examples of suitable devices that provide such capability include the MxL3710 and MxL3712 produced by MaxLinear of Carlsbad, Calif.

The control panel 403 or other element of the building data communications network infrastructure may serve as a head end. In some implementations, a headend is configured to divide transmission bandwidth into time slices, each allocated to a particular customer (e.g., a particular device on a horizontal data plane). Time division multiplexing may be implemented with a particular guaranteed latency. In some implementations, a headend is configured to provide point to multipoint connections. For example, the headend may serve each of a certain number (e.g., thirty-one) downstream clients. Each of these clients may engage in a separate conversation or session. In some implementations, the clients cannot talk to one another. This is based on cable TV model.

A chip or other logic device designed or configured in this way may interface on one side with digital elements in a building network via a coaxial cable and participate in communications using a MoCA protocol, and on the other side using a PCIE or gigabit Ethernet port to interface with another integrated circuit or device that serves as a transceiver for interfacing or translating between the analog antenna signals from an antenna and digital gigabit Ethernet provided over one of the other communication links supported by the other integrated circuit or device, i.e., the circuit or device that converts between gigabit Ethernet over coaxial and gigabit Ethernet over one of the two other ports.

The network backbone components may employ network or data conversion chips and cabling that supports gigabit Ethernet communication over coaxial cable. As mentioned, a MoCA communications protocol may be employed for this purpose.

Figure 4B:
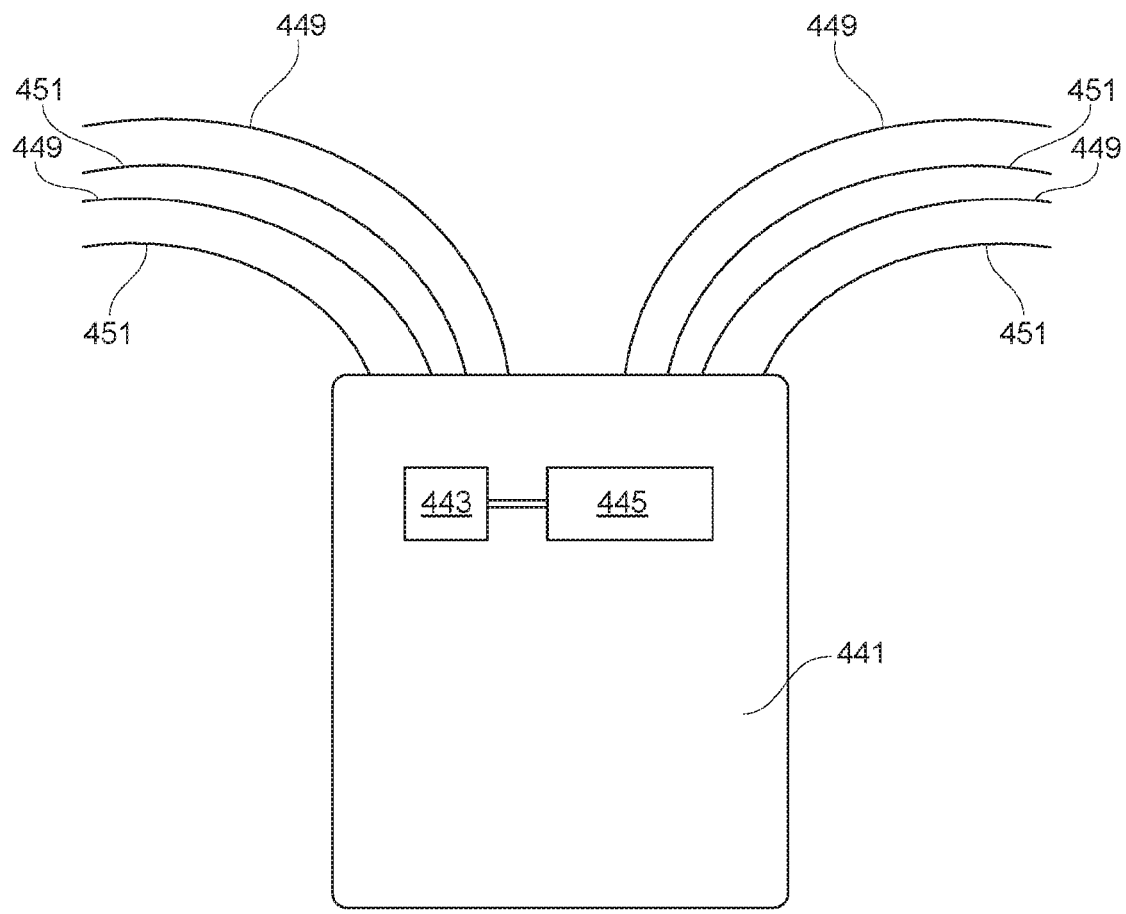
FIG. 4B is a simplified view of a control panel in accordance with certain embodiments of this disclosure.

A simple block diagram of a control panel 441 for a given floor of a building is illustrated in FIG. 4B. The control panel 441 may include a conventional 10-40 Gb/sec Ethernet switch 443. The control panel 441 may also include a device 445 for interfacing with MoCA compatible high bandwidth Ethernet on cables strung throughout a floor of a building (or across multiple floors). For example, InCoax of Gavle, Sweden supplies a transmitter for MoCA that can receive 10 Gb/sec input signal (Ethernet) and transmit four 2.5 Gb/sec output signals (Ethernet).

In the particular example of FIG. 4B, the control panel 441 feeds four MoCA lines 449 at a data rate of, for example 10 Gb/sec over. In other words, the system supports 10 Gb/sec MoCA lines strung throughout, e.g., a single floor. Control panel 441 also feeds four CAN lines 451.

The system may provide separate parallel trunk lines for each cable (e.g., eight trunk lines in this example) or it may provide shared trunk lines so that there would be a total of two or four trunk lines in this example. The Ethernet MoCA cables are coaxial cables, e.g., a low impedance coaxial cable such RG-6 or higher gauge cable used for CATV, etc. The CAN bus connections may be implemented using, e.g., two twisted pair cables and having, e.g., a total of five conductors. In one example, one twisted pair contains high gauge conductors (e.g., 14 gauge) for providing DC power to devices, a second twisted pair contains impedance controlled conductors (e.g., 22 gauge) for CAN bus communications, and a final conductor is for ground. In this example, the control panel may supply two networks (left and right in figure), each with two or more trunk lines. For example, each trunk line may include a MoCA cable and a CAN cable.

In various embodiments, communications capability to fixed nodes such as window controllers or other computational hardware is provided via drops (drop line cables) from trunk lines. In some cases, only a few of the nodes on a floor need a cable drop providing high bandwidth communication capability. For example, some nodes may be adequately served by wireless connectivity, such as provided by one or more of the digital elements, as described elsewhere herein.

Note that the MoCA protocols employ two frequency bands, one at a frequency below 700 MHz, and the other at a frequency above 700 MI-z. In certain networks where the below 700 MHz band is not sending CATV signals or cell phone signals, the network may include a transmitter having a band centered around 500 MHz, sufficient for about 3 gigabit/second Ethernet capability. And the network may employ a different device that operates at frequencies above 700 M-Hz (e.g., up to about 1455 MHz) and also delivers approximately 3 gigabit Ethernet capability. Between these two devices, a network according to some embodiments may address up to about 126 end points (e.g., cell phones and other wireless communications devices).

The MoCA standards use a time domain modulated signal. So if a network has relatively few devices using the network (e.g., about ten to twenty devices) at any instant in time, each might effectively receive full bandwidth (e.g., much more than $\frac{1}{126}$ of 6 gigabit capability).

Any of the MoCA standards may be supported; for example, the system may support MoCA Mesh and MoCA Access (e.g., MoCA Access 2.5 or MoCA Access 3.0). MoCA Mesh is designed to support a mesh network, while MoCA Access is designed to support source to destination routing. Either standard supports 63 devices per network. Together the two MoCA channels can support 126 devices. For comparison, a CAN network can support 128 devices.

It should be understood that not all communications links of the backbone or other building network infrastructure need be wired, some may be wireless. For example, lines 409 and 413 shown in FIG. 4A may be wired or wireless. Various wireless protocols may be employed such as cellular (4G, 5G, etc.), Wi-Fi, and LiFi. Example embodiments integrating LiFi into a building network infrastructure are presented in U.S. Provisional Patent Application No. 62/827,674, filed Apr. 1, 2019, which is incorporated herein by reference in its entirety. It should also be understood that antennas may be disposed at locations other than those depicted in FIG. 4A. Various examples are discussed elsewhere herein. For example, antennas may be disposed directly on windows, on window controller, on window frames, mullions, and/or other structural elements of any type. Examples of antenna types are listed below. Among them are patch antennas, handle antennas, microstrip antennas, slotted coaxial antennas, and trough antennas.

Antennas (Integration in a Building)
Generally

Antennas described herein may be installed at various locations in a building. In some cases, an antenna is installed on a window surface such as any of the surfaces S1-S4 of a dual lite IGU. See FIGS. 2A and 2B, which shows these surfaces. The antennas on glass may be transparent antennas. In some cases, an antenna is installed on a component associated with a window or IGU. Examples include IGU spacers, window frame parts, window controllers mounted to windows or IGU spacers, and the like. See FIG. 2A and the associated description of an IGU and associated components. In some cases, an antenna is installed on a structural element, which is typically a permanent element of a building such as an element provided during construction. Such elements may be permanent, i.e., not easy to remove from a building. Examples include walls, partitions (e.g., office space partitions), doors, beams, stairs, façades, moldings, mullions, and transoms, etc. In various examples, the building structural elements are located on a building or room perimeter. Structural elements are optionally associated with one or more windows (e.g., mullions). In some cases, an antenna is installed on a fixture, which may be a post construction building installation. Examples include some types of lighting, work area structures such as cubicles, ceiling tiles, and the like. In some cases, an antenna is installed on an unfixed element such as an item of furniture. Examples of furniture on which an antenna may be installed includes desks, chairs, cabinets, artwork, and the like.

Examples of window components and associated building structural elements on which an antenna may be installed include: Frames, the frame work that surrounds and supports the entire window system including a head, jambs and a sill, where the head is a horizontal part forming the top of the window frame; jambs are vertical parts forming the sides of a window frame, abutting or forming a part of a fixed part of the building (i.e., generally not contacted by windows on two sides): and the sill being a horizontal part forming the bottom of the frame of a window; jambliners, a strip which goes on the sides of a window frame that provides a snug fit for the window sash; grilles, decorative pieces that visually divide window panels, giving the glass the appearance of multiple glass panes; muttons, thin pieces of wood or other material that subdivide windows (e.g., multiple small windows in a door); and mullions, a major structural vertical or horizontal piece that separates two or more windows while supporting them.

Figure 5:
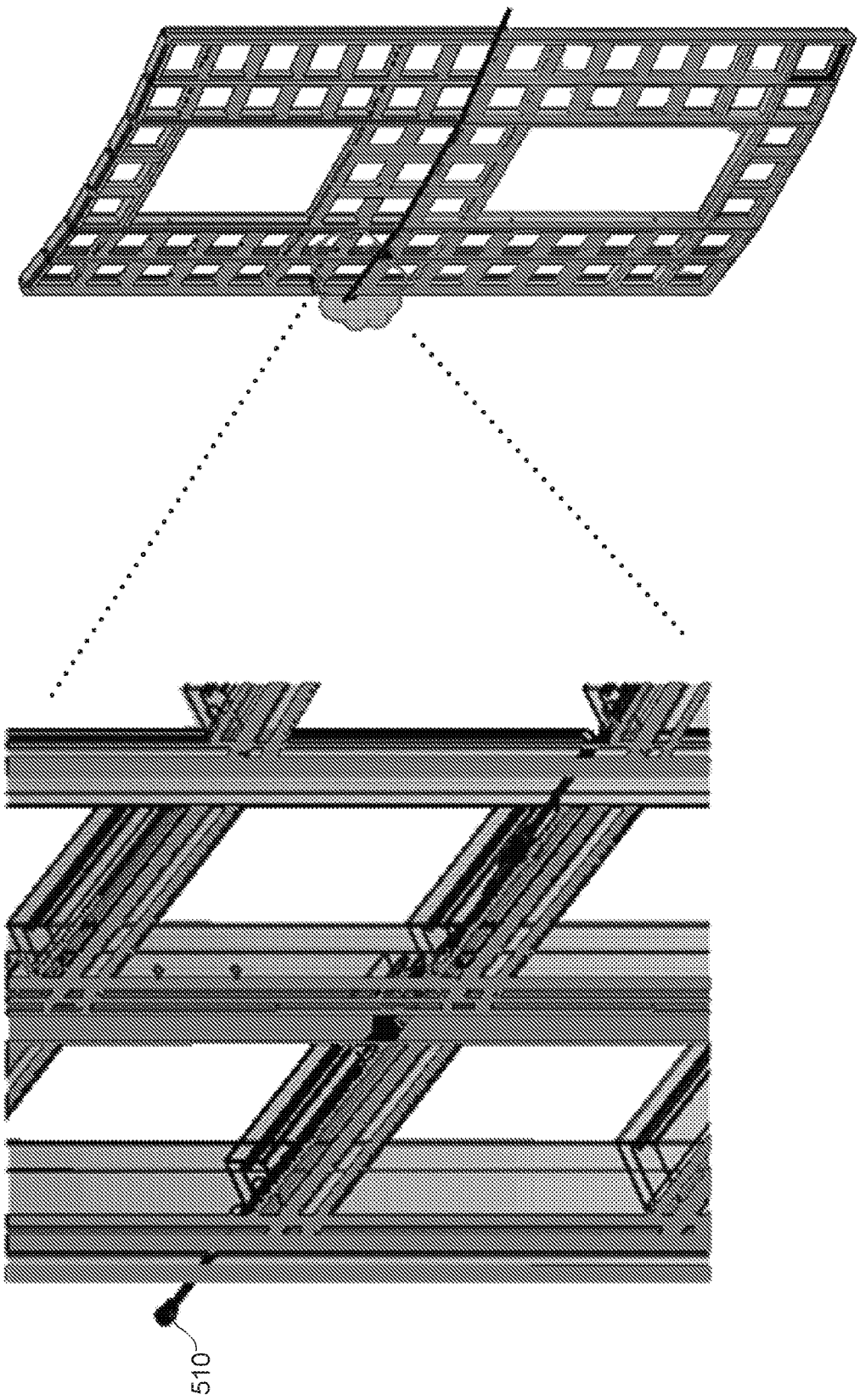
FIG. 5 is a simplified view of a portion of a framing structure providing several mullions to support windows on a façade or other building exterior structure.

Muttons are usually decorative rather than structural and may be oriented either horizontally or vertically. A mullion is a vertical or horizontal element that forms a division between units of a window or screen, and/or is used decoratively. When dividing adjacent window units, a mullion may provide a rigid support to the glazing of the window. It may also provide structural support to an arch or lintel above the window opening. Horizontal elements separating the head of a door from a window above are both a head jamb and horizontal mullion and are sometimes called "transoms." An example of a framing structure providing several mullions to support windows on a façade or other building exterior structure is depicted in FIG. 5. The illustrated network of mullions may provide pathways for electrical and/or light carrying lines and fibers, in the illustrated framing structure, pathway 510, for example. They may also provide attachment points for mounting antennas, radios, controllers, sensors, and the like.

Any of these elements may be painted over or otherwise covered.

In certain embodiments, an antenna may be installed on a digital element such as a digital architectural element or a digital wall fixture. Digital architectural elements are described in U.S. Provisional Patent Application No. 62/803,324, filed Nov. 16, 2018, which is incorporated herein by reference in its entirety. Digital elements in a building may be mounted at various locations such as on mullions.

A digital architectural element may contain various sensors, a processor (e.g., a microcontroller), a network interface, and one or more peripheral interfaces. Examples of sensors for the element include light sensors, optionally including image capture sensors such as cameras (visual or IR images), audio sensors such as voice coils or microphones, air quality sensors (particulates sensors, gas sensors such as carbon dioxide, volatile organics, etc.), and proximity sensors (e.g., certain JR and/or RF sensors). The network interface may be a high bandwidth interface such as a gigabit (or faster) Ethernet interface. Examples of peripherals include video display monitors, add-on speakers, mobile devices, battery chargers, and the like. Examples of peripheral interfaces include standard Bluetooth modules, ports such as USB ports and network ports, etc. In addition or alternatively, ports include any of various proprietary ports for third party devices.

In certain embodiments, the digital architectural element works in conjunction with other hardware and software provided for an optically switchable window system (e.g., a display on window). In certain embodiments, the digital architectural element includes a window controller or other controller such as a master controller, a network controller, etc.

In certain embodiments, a digital architectural element includes one or more signal generating device such as a speaker, a light source (e.g., and LED), a beacon, an antenna (e.g., a Wi-Fi or cellular communications antenna), and the like. In certain embodiments, a digital architectural element includes an energy storage component and/or a power harvesting component. For example, an element may contain one or more batteries or capacitors as energy storage devices. Such element may additionally include a photovoltaic cell. In one example, a digital architectural element has one or more user interface components (e.g., a microphone or a speaker), and one more sensors (e.g., a proximity sensor), as well as a network interface for high bandwidth communications.

In various embodiments, a digital architectural element is designed or configured to attach to or otherwise be collocated with a structural element of building. In some cases, a digital architectural element has an appearance that blends in with the structural element with which it is associated. For example, a digital architectural element may have a shape, size, and color that blends with the associated structural element. In some cases, a digital architectural element is not easily visible to occupants of a building; e.g., the element is fully or partially camouflaged. However, such element may interface with other components that do not blend in such as video display monitors, touch screens, projectors, and the like.

The building structural elements to which digital architectural elements may be attached include any of various building structures. In certain embodiments, building structures to which digital architectural elements attach are structures that are installed during building construction, in some cases early in building construction. In certain embodiments, the building structural elements for digital architectural elements are elements that serve as a building structural function. Such elements may be permanent, i.e., not easy to remove from a building. Examples include walls, partitions (e.g., office space partitions), doors, beams, stairs, façades, moldings, mullions and transoms, etc. In various examples, the building structural elements are located on a building or room perimeter. In some cases, digital architectural elements are provided as separate modular units or boxes that attach to the building structural element. In some cases, digital architectural elements are provided as façades for building structural elements. For example, a digital architectural element may be provided as a cover for a portion of a mullion, transom, or door. In one example, a digital architectural element is disposed in or on a mullion. If it is attached to a mullion, it is bolted on or otherwise attached to the rigid parts of the mullion. In certain embodiments, a digital architectural element can snap onto a building structural element. In certain embodiments, a digital architectural element serves as a molding, e.g., a crown molding. In certain embodiments, a digital architectural element is modular: i.e., it serves as a module for part of a larger system such as a communications network, a power distribution network, and/or computational system that employs an external video display and/or other user interface components.

In some embodiments, the digital architectural element is a digital mullion designed to be deployed on some but not all mullions in a room, floor, or building. In some cases, digital mullions are deployed in a regular or periodic fashion. For example, digital mullions may be deployed on every sixth mullion.

In certain embodiments, in addition to the high bandwidth network connection (port, switch, router, etc.) and a housing, the digital architectural element includes multiple of the following digital and/or analog components:

Camera, which may include a sensor and processing logic for imaging features in the visible, IR (see use of thermal imager below), or other wavelength region; various resolutions are possible including HD and greater.

Proximity or movement sensor—In some cases, this sensor is an infrared sensor, e.g., an IR sensor. In some embodiments, a proximity sensor is a radar or radar-like device that detects distances from and between objects using a ranging function. Radar sensors can also be used to distinguish between closely spaced occupants via detection of their biometric functions, for example, detection of their different breathing movements. When radar or radar-like sensors are used, better operation may be facilitated when disposed unobstructed or behind a plastic case of a digital architectural element.

Occupancy sensor—In one embodiment, an occupancy sensor comprises a multi-pixel thermal imager, which when configured with an appropriate computer implemented algorithm can be used to detect and/or count the number of occupants in a room. In one embodiment, data from a thermal imager or thermal camera is correlated with data from a radar sensor to provide a better level of confidence in a particular determination being made. In embodiments, thermal imager measurements can be used to evaluate other thermal events in a particular location, for example, changes in air flow caused by open windows and doors, the presence of intruders, and/or fires.

Color temperature sensor, which can be used to analyze the spectrum of illumination present in a particular location and provide outputs that can be used to implement changes in the illumination as needed or desired, for example, to improve an occupant's health or mood.

Biometric sensor (fingerprint, retina, facial recognition); any of these may be provided as a stand-alone sensor or be integrated with another sensor such as a camera.

Speaker(s) (these may be relatively small; e.g. approximately one inch across)

Power amplifier for speakers—In some embodiments, the speakers and the amplifier, collectively, are configured as a sound bar; i.e., a bar-shaped device containing multiple speakers. The device may be designed or configured to provide high fidelity sound.

Microphone (sometimes with associated equalizer)—in some embodiments, the logic for processing microphone signals (e.g., an equalizer and/or the primary processor the device) detects sound signals generated by the speakers but reflected off of walls or objects in a room, and the logic automatically adjusts the speaker output to correct for frequency variations, echoes, and other factors that negatively impact user perception of sound. The microphone, logic, and speakers may also be configured to work in concert to cancel ambient or white noise.

Air quality sensor (optionally able to measure one or more of the following air components: volatile organic compounds (VOC), carbon dioxide temperature, humidity, particulates); may be used in conjunction with HVAC control; control air circulation Hub for power and/or data connectivity to sensor(s), speakers, microphone, and the like. The hub may be a USB hub, a Bluetooth hub, etc. The hub may include one or more ports such as USB ports, HDMI ports, etc. Alternatively or in addition, the element may include a connector dock for external sensors, light fixtures, peripherals (e.g., a camera, microphone, speaker(s)), network connectivity, power sources, etc.

Video driver for a display (e.g., a transparent OLED device) on or proximate to an IGU associated with the architectural element. The driver may be wired or optically coupled; e.g., the optical signal is launched into the window by optical transmission; see, e.g., a switchable Bragg grating that includes a display with a light engine and lens that focuses on glass waveguides that transmits through the glass and travels perpendicularly to line of sight.

Wi-Fi Access Point

Antenna(s), which may be part of the Wi-Fi access point or serve a different purpose. In certain embodiments, the architectural element itself or faceplate that covers all or a portion of the architectural element serves as an antenna. Various approaches may be employed to insulate the architectural element and make it transmit or receive directionally. Alternatively, a prefabricated antenna may be employed or a window antenna as described in PCT Patent Application No. PCT/US17/31106, filed May 4, 2017, incorporated herein by reference in its entirety. In certain embodiments, Wi-Fi access points are configured to provide communications via the IEEE 802.11AT standard.

Location Service Via Beacons or Other Mechanism

Power source such as an energy storage device (e.g., a rechargeable battery or a capacitor), and the like. In some implementations, a power harvesting device is included; e.g., a photovoltaic cell or panel of cells. This allows the device to be self-contained or partially self-contained. The light harvesting device may be transparent or opaque, depending on where it is attached. For example, a photovoltaic cell may be attached to, and partially or fully cover, the exterior of a digital mullion, while a transparent photovoltaic cell may be covering a display or user interface (e.g., a dial, button, etc.) on the digital architectural element.

Light source (e.g., LED) configured with the processor to emit light under certain conditions such signaling when the device is active.

Processor configured to provide various embedded or non-embedded applications. The processor may be a microcontroller. In certain embodiments, the processor is low-powered MCU (mobile computing unit) with memory and configured to run a lightweight secure operating system hosting applications and data. In certain embodiments, the processor is an embedded system, system on chip, or an extension.

Ancillary processing device such as a graphical processing unit, or an equalizer or other audio processing device configured to interpret audio signals.

A building feature may have one or more antennas. These may be pre-constructed and attached to or embedded in the element, either on the surface or in the element's interior. Alternatively, or in addition, an antenna may be fabricated such that the structure of a digital architectural element or building structural element serves as an antenna component. For example, a conductive metal piece of a mullion may serve as an antenna element or ground plane. In some embodiments, a portion of a digital architectural element or building structural element is removed (or added) so that the remaining portion serves as a tuned antenna element. For example, a part of a mullion may be punched out to provide a tuned antenna element. By attaching coaxial or other cable to the element and an RF transmitter or receiver, the building structural element and/or an associated digital architectural element may serve as an antenna element. The antenna components may need to be designed with an impedance (e.g., about 50 ohms) that matches that of the RF transmitter, for example.

Depending on construction, the antenna element may serve as a Wi-Fi antenna, a Bluetooth antenna, a cellular communication antenna (4G, 5G, . . . ). etc. The antenna may be a patch antenna, a monopole antenna, a dipole antenna, or other example as presented below. It may be configured to transmit or receive electromagnetic signals in any appropriate wavelength range. Examples of antenna components that may be employed in optically switchable window systems are described in PCT Patent Application No. PCT/US17/31106, filed May 4, 2017, which is incorporated herein by reference in its entirety.

Figure 6A:
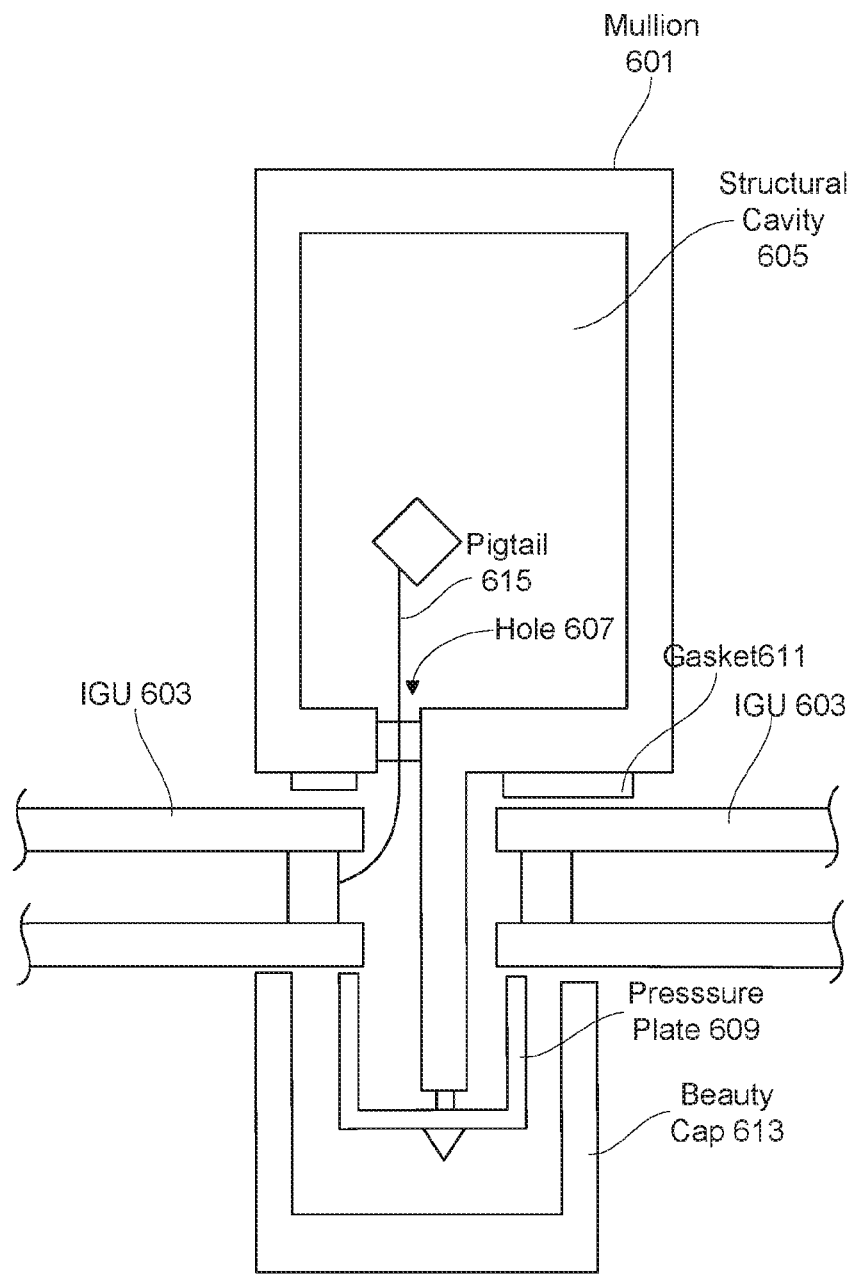
FIGS. 6A-G present various views of a window framing structure including a mullion configured to support one or more antennas.

FIG. 6A presents a cross-sectional view (looking down) of a mullion 601 with adjacent IGUs 603 in a typical configuration that can be outfitted with one or more antennas. As shown, mullion 601 has a structural cavity 605. Mullion 601 is straddled by IGUs 603.

In the depicted embodiment, mullion 601 has a hole 607 where a power and communications line 615 (sometimes referred to as a pigtail) is disposed from an optically switchable window in an IGU 603 to the mullion's structural cavity 605 where it may be connected to a drop line or a trunk line (not illustrated). A sealant may be applied to the hole after the pigtail or other line is fed through the hole.

Figure 6B:
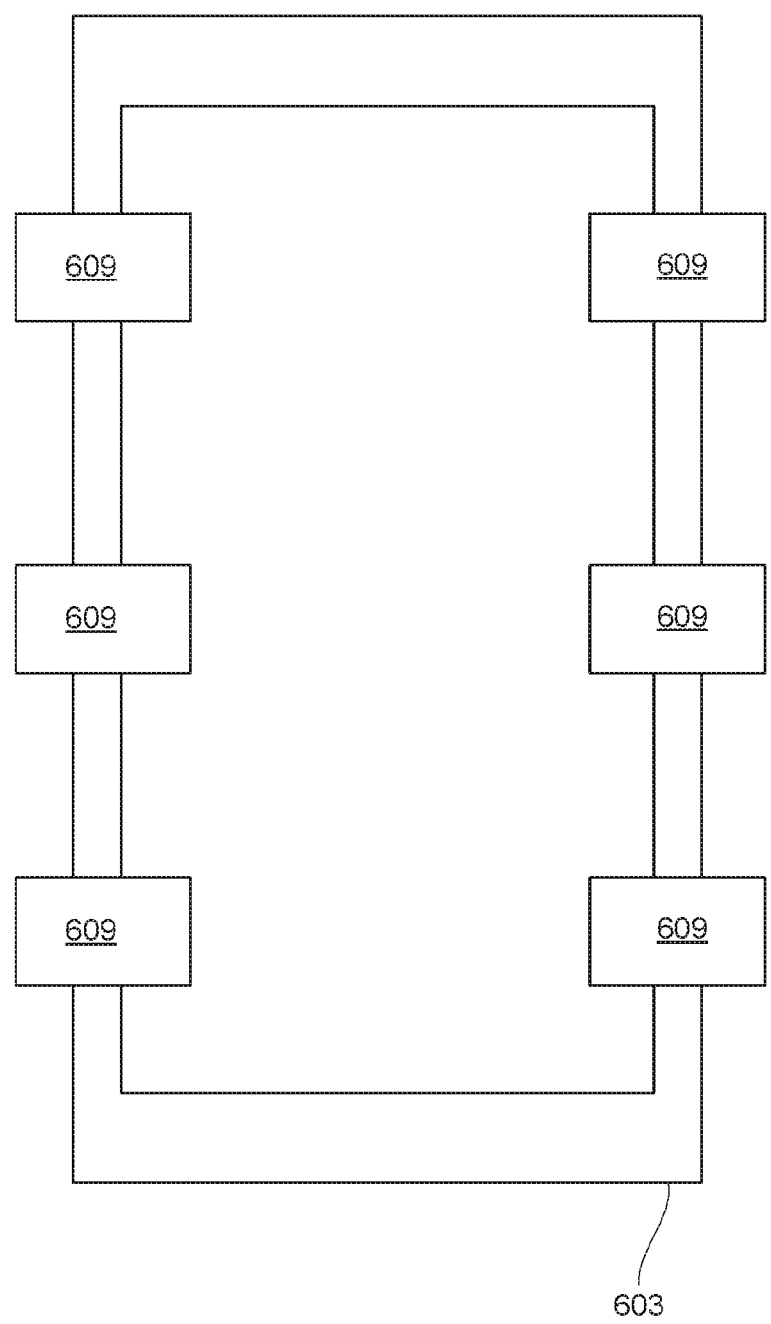

In the illustrated example, a pressure plate 609 is threaded into or otherwise attached to the mullion 601 and pushed against edge points on two adjacent IGUs that straddle the mullion. There may be several pressure plates disposed around the perimeter of an IGU, separated from one another by, e.g., about 2 feet (60 cm). See FIG. 6B for a front view of an IGU with multiple pressure plates disposed around its periphery. A gasket 611 seals points on adjacent IGUs against the mullion 601 when a pressure plate 609 is engaged with the mullion.

The pressure plates would be visible from outside the building without a covering. A beauty cap 613 serves to cover the individual pressure plates on mullion 601 between the two IGUs 603. A single beauty cap may hide multiple pressure plates. The beauty cap 613 hides the pressure plates 609 in a way to make the region between IGUs appear continuous. Beauty caps may be affixed in various ways such as by snapping on. Depending on the size of a window, a beauty cap may be relatively long, e.g., up to about 20 feet long. An antenna, such as a trough antenna or a handle antenna (described below), may be mounted on the beauty cap 613. In one example, a trough antenna, for example, serves as the beauty cap 613 itself.

Figure 6C:
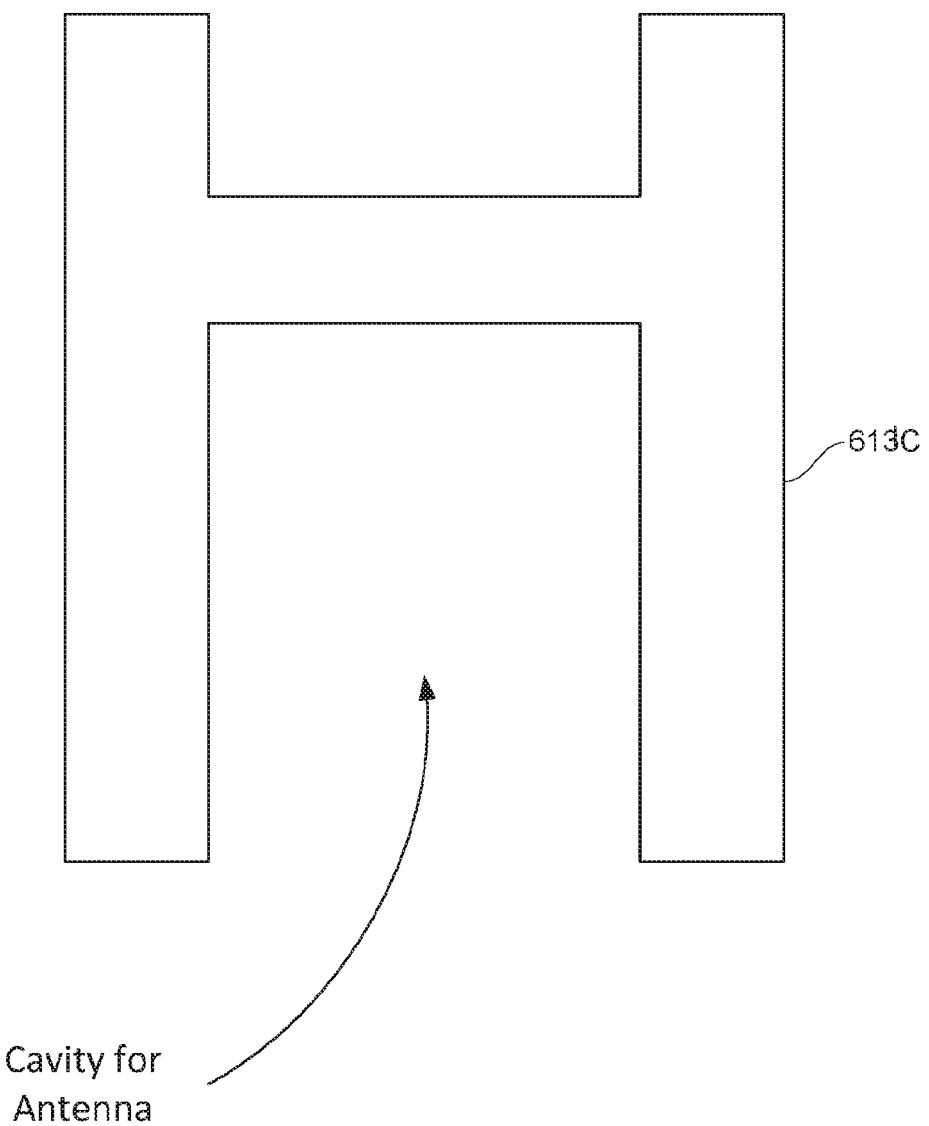

FIG. 6C illustrates an example of an H-shaped beauty cap 613C that is configured to both cover the pressure plates installed on a mullion and to provide an outward facing trough antenna or other antenna.

Figure 6D:
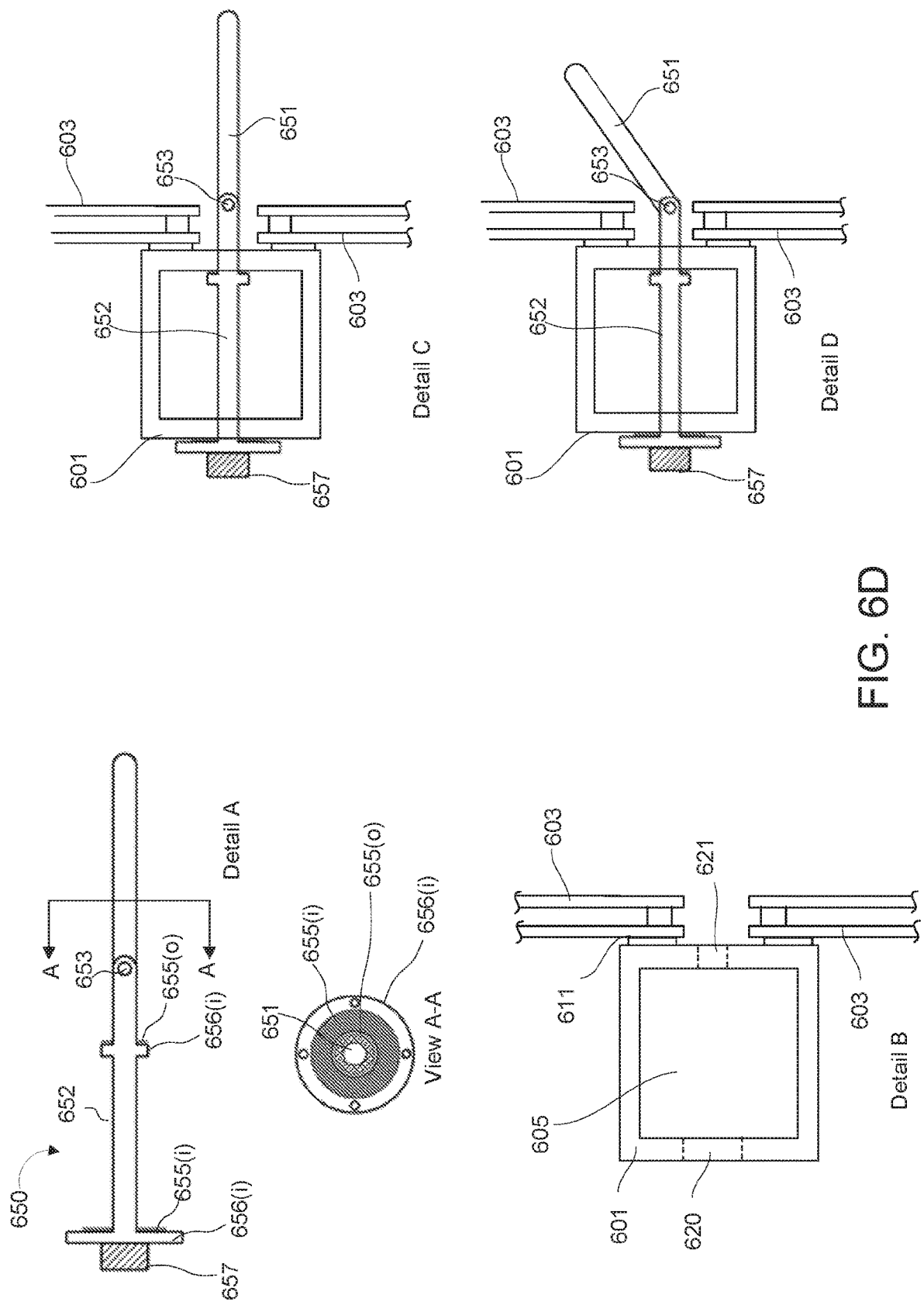

It will be appreciated that exterior facing antenna radiating elements may need to be electrically coupled with internal electrical feeds. It will also be appreciated that in certain contexts it may be advantageous to install, upgrade, and/or maintain exterior facing antennas from within a building's interior. In some embodiments, the feeds may be configured to pass through the mullion and/or beauty cap. Thus, a pass-through arrangement may be contemplated that includes a weather-tight seal between the building exterior and interior. FIG. 6D illustrates a simplified example of an antenna assembly 650 including such a pass-through arrangement. Referring first to Detail A, in the illustrated example, the antenna assembly is configured to include, on an exterior portion, a radiating element 651. An interior portion of the radiating element 651 is coupled with a pass-through portion 652 by way of an articulable link 653. The articulable link 653 may provide one or two axes of rotation about which the radiating element 651 may be articulated, either manually or with an actuation device (not illustrated). The pass-through arrangement 652 is configured with flanges 656(i) and 656(o), each flange having an associated sealing member (e.g. an O-ring) 655(i) and 655(o). An interior end of the coupling arrangement is coupled with an electrical connector 657, that may be electrically coupled with the radiating element 651 and with an electrical feed (not illustrated) from the network building infrastructure. The electrical connector 657 may be a coaxial connector, in some embodiments.

The antenna assembly 650 may be configured for installation with a mullion 601, similar to that depicted in FIG. 6A. Referring to Detail B, it may be observed that the mullion 601 coupled with and between IGU's 603 by way of gaskets 611 includes a structural cavity 605 and configured with access holes 620 and 621. Detail C illustrates an example of an installation of the antenna assembly 650 onto the mullion 601, such that radiating element 651 protrudes out to an exterior of the building while the electrical connector is readily accessible on the interior of the building. The sealing members 655(*i*) and 655(*o*), together with gaskets 611 may be configured to provide a weather-tight seal between the building exterior and interior. In Detail C, the radiating element 651 is depicted as having a long axis generally aligned with the pass-through arrangement. In Detail D, the radiating element 651 is depicted as having been articulated about articulable link 653, such that the radiating element is at an acute angle to the horizontal.

In the example illustrated by FIG. 6D, a beauty cap (e.g. beauty cap 613 of FIG. 6A) has been omitted for clarity, but it will be appreciated that a beauty cap may be contemplated. In some implementations some or all of the radiating element 651 protrudes outside of the beauty cap. In some implementations the radiating element 651 may not protrude outside of the beauty cap. In such implementations, the beauty cap may be configured to avoid substantial attenuation of an RF signal in at least some directions, by choice of cap material and/or geometry. In some implementations a generally metallic beauty cap may include low-attenuation gaps, holes, or sections, that may be covered by "patches" of non-metallic material at locations proximal to the radiating element.

In some implementations, the radiating element 651 may be quite small relative to the typical width of a mullion, for example. For example, an array of 5G compatible multiple-input and multiple-output (MIMO) antennas may be conveniently housed on the interior or exterior surface of a typically sized beauty cap. In such implementations, pass-through arrangement 652 may be configured to accommodate a number of electrical feeds from, for example a 4×4 or 8×8 array of MIMO antennas. In some implementations the radiating element may have a form factor such that it mounts in a framing system in a similar manner to a conventional glass laminate. In other implementations, the radiating element may be laminated onto a glass of an IGU lite. In yet other implementations, the radiating element may be configured to have a form factor similar to standard mullions and/or beauty caps.

Figure 6E:
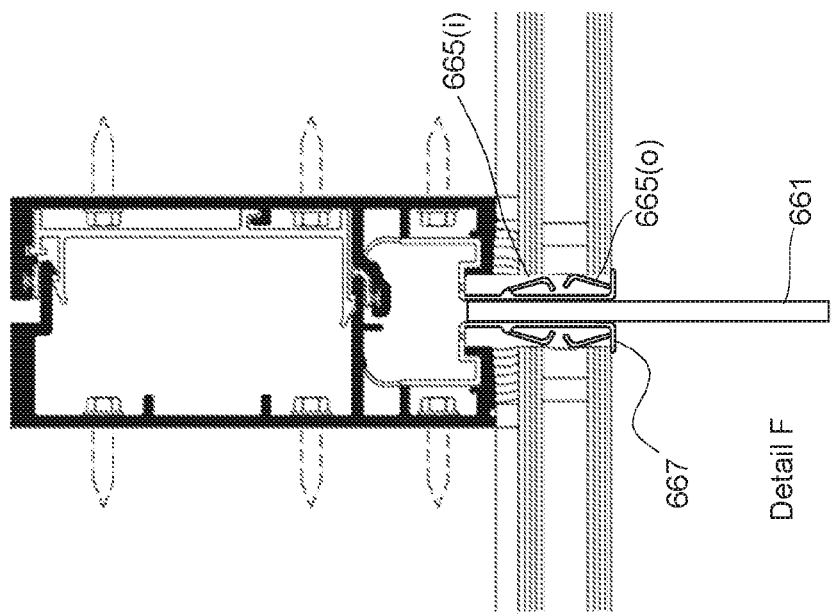
Figure 6E:
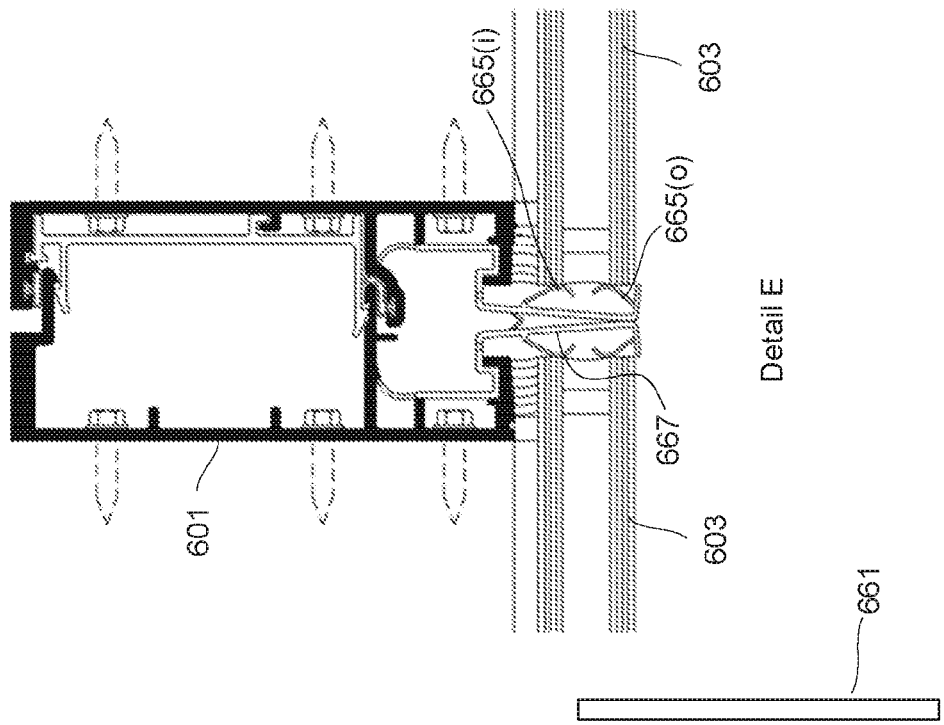

FIG. 6E illustrates a further example of a weather tight pass-through contemplated by the present disclosure that provides for an electrical pass-through from an interior portion of a mullion to an exterior side of the IGU without compromising the integrity of the building's glazing system. In the example contemplated by FIG. 6E, mullion 601, straddled by IGU's 603, is coupled with a flexible sealing element 667. As shown in Detail E, prior to installation of antenna structure 661 (and/or after removal of antenna structure 661), spring-like elements 665(*i*) and 665(*o*) may compress the sealing element 667 toward a closed position. As shown in Detail F, when the antenna structure 651 is installed (advantageously, from inside the building) the sealing element 667 expands to fit the antenna structure and pushes spring-like elements 665(*i*) and 665(*o*) radially outward. The sealing element 667 may provide a weather tight seal that prevents moisture intrusion into the mullion 601, for example. Although omitted for clarity of illustration, the antenna structure 661 may include one or more articulable links, similar to articulable link 653 of FIG. 6D to enable a radiating element of the antenna structure 601 to be at a desired angle with respect to the IGUs 603. Thus, an antenna radiating element may be disposed, when installed, outside the building yet the installation is affected from inside the building only.

Figure 6G:
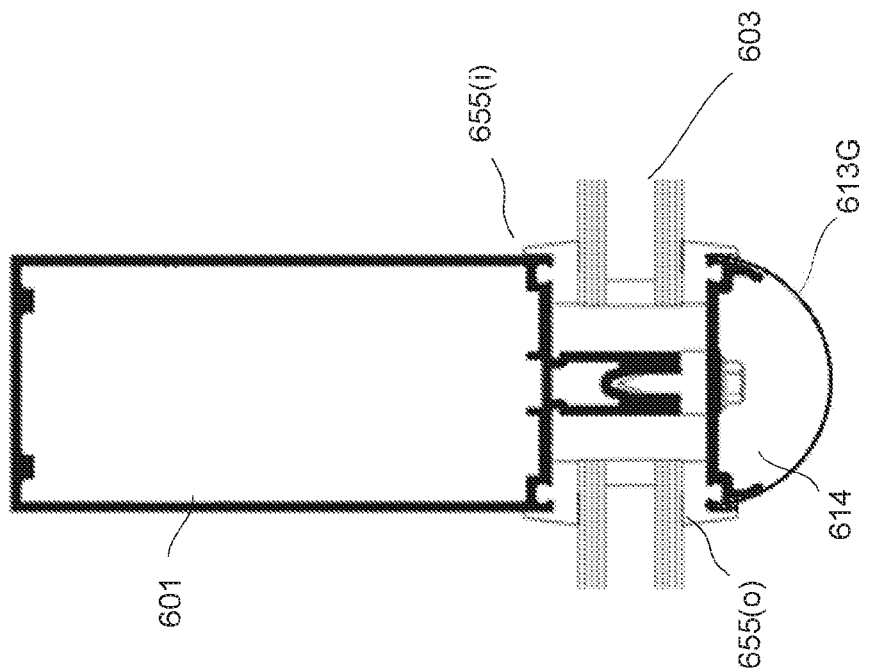
Figure 6F:
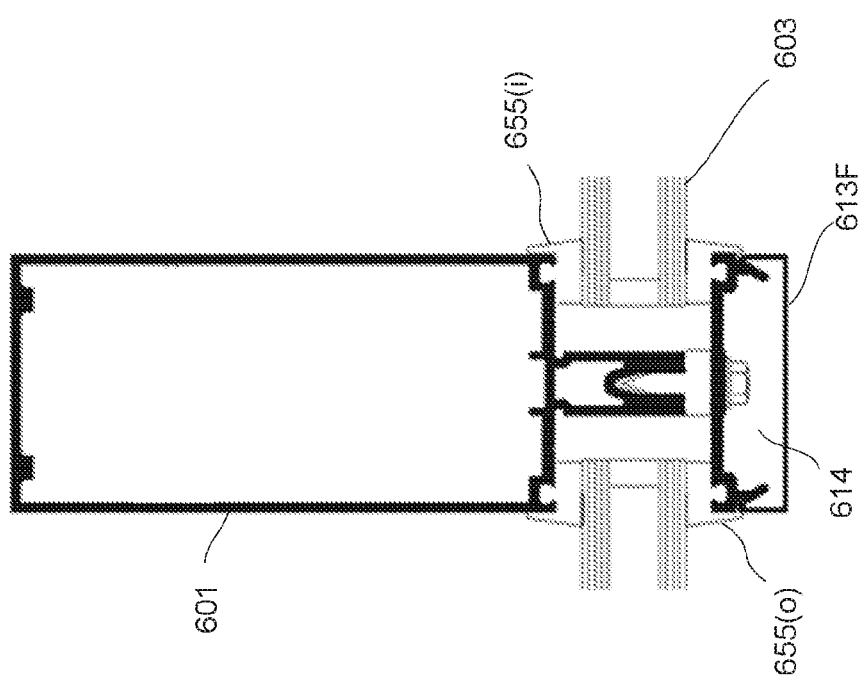

Alternatively, or in addition, a mullion may accommodate an array of antenna radiating elements, e.g. a MIMO array, or a spaced series of discrete radiating elements aligned along a horizontally, vertically or diagonally oriented mullion. Referring to FIGS. 6F and 6G, in some examples, a beauty cap may be configured to enclose a volume 614. Radiating elements (not illustrated) may be disposed on an external or interior surface of the beauty cap or within the volume 614. Such radiating elements may be hidden from view of observers outside the building, for example. In FIG. 6F a flat portion of beauty cap 613F may provide mounting space for any number of radiating elements disposed on an interior or exterior of the flat portion. In an alternative embodiment, FIG. 6G illustrates that a beauty cap 613G may be configured with a curved aspect (in the illustrated example, approximately hemispherical) such that radiating elements disposed thereon have diverse orientations with respect to the IGUs 603. Advantageously, such an arrangement may increase effective antenna coverage relative to an arrangement where each radiating element is oriented to face a common direction.

Alternatively, or in addition, radiating elements may be disposed flush with or minimally protruding from an exterior surface of the beauty cap 613 so as minimize impact to the architectural aesthetic of the building.

In certain embodiments, a mullion is outfitted with multiple exterior facing antennas such as two or more or three or more such antennas. In some implementations, two or more exterior facing antennas are vertically separated from one another along a vertical mullion. In some implementations, two or more exterior facing antennas are horizontally separated from one another along a horizontal mullion. In certain embodiments, the two or more exterior facing antennas are configured to provide redundancy in case one of them fails, which might otherwise necessitate an expensive and/or complicated replacement. In some cases, the two or more exterior facing antennas are configured to provide complementary service such as complementary frequency ranges and/or complementary coverage volumes.

In some embodiments, the mullion or a cavity therein that houses a radio or other electronic instrumentation associated with the antenna radiating element serves as a heat sink for the electronics. In some implementations, a radio or other associated electronic instrumentation is maintained in close proximity to the antenna radiating element. For example, the electronic instrumentation may be disposed within about one meter or less of the radiating element or within about 0.5 meters or less.

Antennas nay be oriented horizontally, vertically, or diagonally in a building. These directions may refer to not only the physical orientation of an antenna along its primary axis but additionally or alternatively to the orientation of a signal intensity or polarization (transmitted or received by an antenna). In certain embodiments, an antenna is mounted to a building structural element or other building feature that is vertically oriented. For example, an antenna may be mounted to a vertically oriented digital architectural element that extends up to the ceiling. Such antenna may extend vertically along the length of the digital architectural element (e.g., an axis of the antenna's longest dimension is substantially parallel to the vertical direction), and, upon encountering the ceiling, change direction to extend horizontally (e.g., the antenna element has a T or L shape). In certain embodiments, an antenna is mounted horizontally and provides a horizontally directed radiation pattern that extends into a room where building occupants commonly work and/or interact.

Cellular Use Cases (Examples)

Because 5G is a high frequency protocol, 5G signals cannot travel far and cannot penetrate many materials.

Therefore 5G communications sometimes need a clear line of site between the transmitting and receiving antennas. Not surprisingly, then, cellular infrastructure and service providers face challenges getting 5G communications into buildings. In certain embodiments herein, one or more antennas are provided on the roof of a building, and such antenna(s) serve as a gateway for cellular communications to a building. In some implementations, a roof-located antenna may be the sole or a primary point of cellular service to a building. The roof location may provide various advantages. For example, in some implementations, a roof antenna is accessible from 360 degrees (compare a façade installed antenna which sees only 90 degrees). Further, a building's roof often has relatively few signal attenuating obstructions such as trees. Still further, roofs typically have significant space available to accommodate antennas and they provide an acceptable aesthetic compromise.

A roof antenna configured as a gateway for cellular communications (e.g., 5G communications) to and/or from a building may open various communications pathways. For example, a roof antenna may be configured to receive cellular signals and rebroadcast to the building for indoor coverage. This may be accomplished using a wired or wireless connection with other communications nodes (e.g., digital architectural elements) in the building. In some cases, a roof cellular antenna is configured to transmit cellular communications to one or more other antennas in or on the same building where the roof antenna is installed. For example, a roof antenna may be configured to rebroadcast cellular communications to a roof-mounted sensor, which houses a different cellular antenna. In another example, a roof antenna is configured for retransmission of signals between (from and/or to) antennas mounted on a building façade. In some cases, a roof antenna is configured for cellular communications with one or more external communications nodes such as a standalone cell tower or the cell tower of a nearby building.

In certain embodiments, one or more roof antennas may be included in a structure having one or more sensors. Examples of such sensors are described in U.S. patent application Ser. No. 15/287,646, filed Oct. 6, 2016, previously incorporated herein by reference in its entirety. In some cases, a roof antenna is provided in a roof-mounted antenna tower, which may be separate from a sensor assembly. In some cases, an antenna tower has a relatively significant height (e.g., about 5 meters or higher above the roof) and its construction is optimized for sending and receiving cellular communications.

A single roof antenna or multiple roof antennas may be deployed and configured for transmitting and/or receiving cellular signals. Roof antenna deployment may account for size, location, redundancy, etc. When the roof antenna is part of a roof sensor, the deployment may be chosen to optimize a combination of cellular signal reception and sensing capability (for determining sky conditions and approaching weather conditions that will affect window tint decisions). In some implementations, a cellular roof antenna supports cellular services from multiple carriers, each of which may have its own transceiver.

Figure 7:
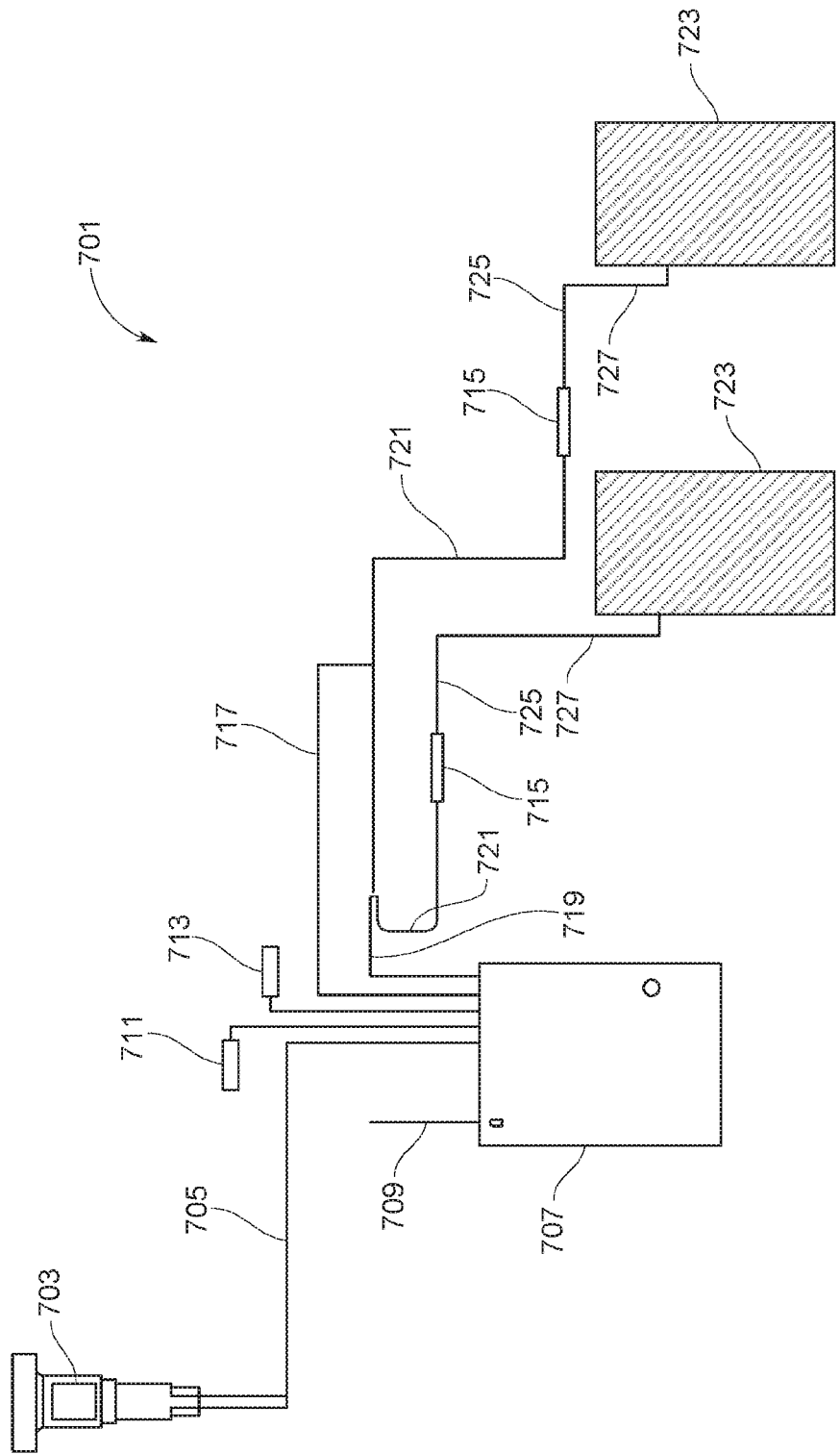
FIG. 7 shows features of a network building infrastructure including a roof-mounted antenna to receive and/or transmit wireless signals.

FIG. 7 shows features of a network building infrastructure 701 that employs a roof-mounted antenna 703 to receive and/or transmit wireless signals. Antenna 703 may serve as a bridge or gateway between network building infrastructure 701 and external cellular communications nodes such as cell towers. In the depicted embodiment, antenna 703 couples to the remainder of network building infrastructure 701 via a conductive line 705. In alternative embodiments, antenna 703 couples to the remainder of network building infrastructure 701 via one or more wireless links. As illustrated, line 705 electrically connects the antenna 703 to a control panel 707. A transceiver may be provided in antenna 703 or control panel 707. Control panel 707 includes an input power line 709 and one or more communications connections to external networks or an internal backbone such as, in the illustrated example, fiber optic connection 711 and Ethernet connection 713.

Control panel 707 may be configured to provide power and data to window controllers 715 via a power insert line 717, a trunk line 719, and drop lines 721. Various connectors and terminators may be employed as shown. Window controllers 715 provide power to control the tint states of electrically switchable devices in IGUs 723. Window controllers 715 are connected to IGUs 723 via IGU connection lines 725 and IGU pigtails 727.

Figure 8A:
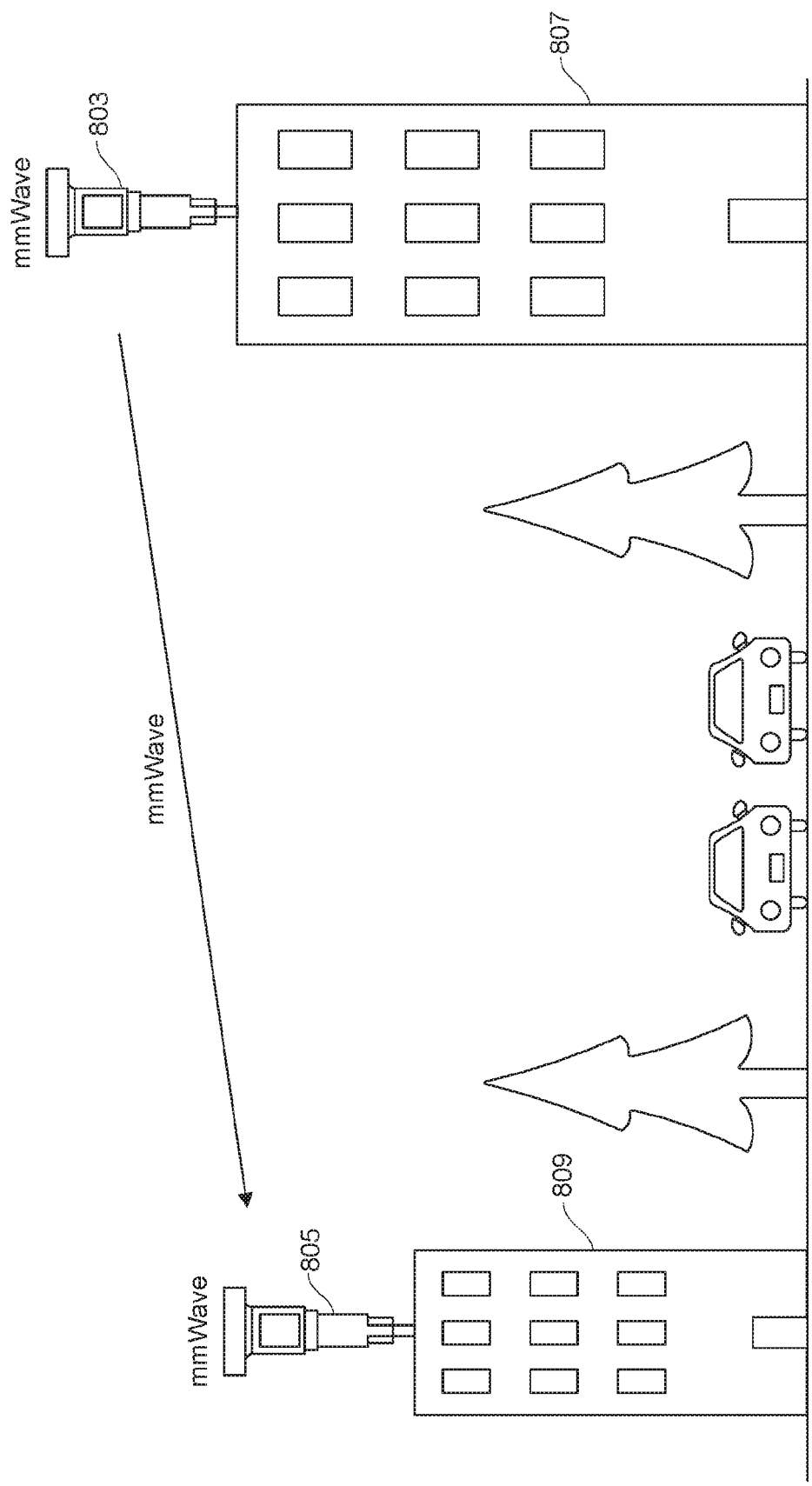
FIGS. 8A-C present three examples of use cases for building exterior antennas.
Figure 8B:
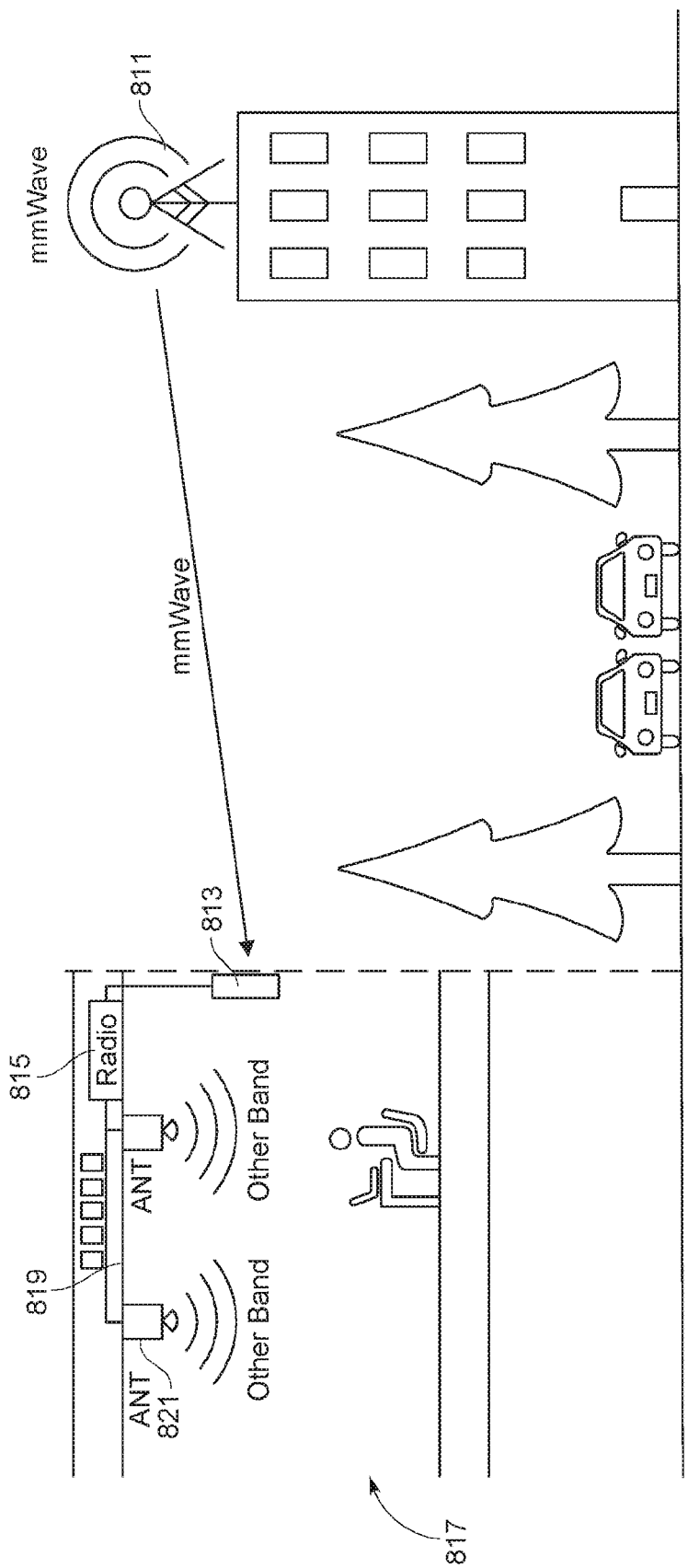
Figure 8C:
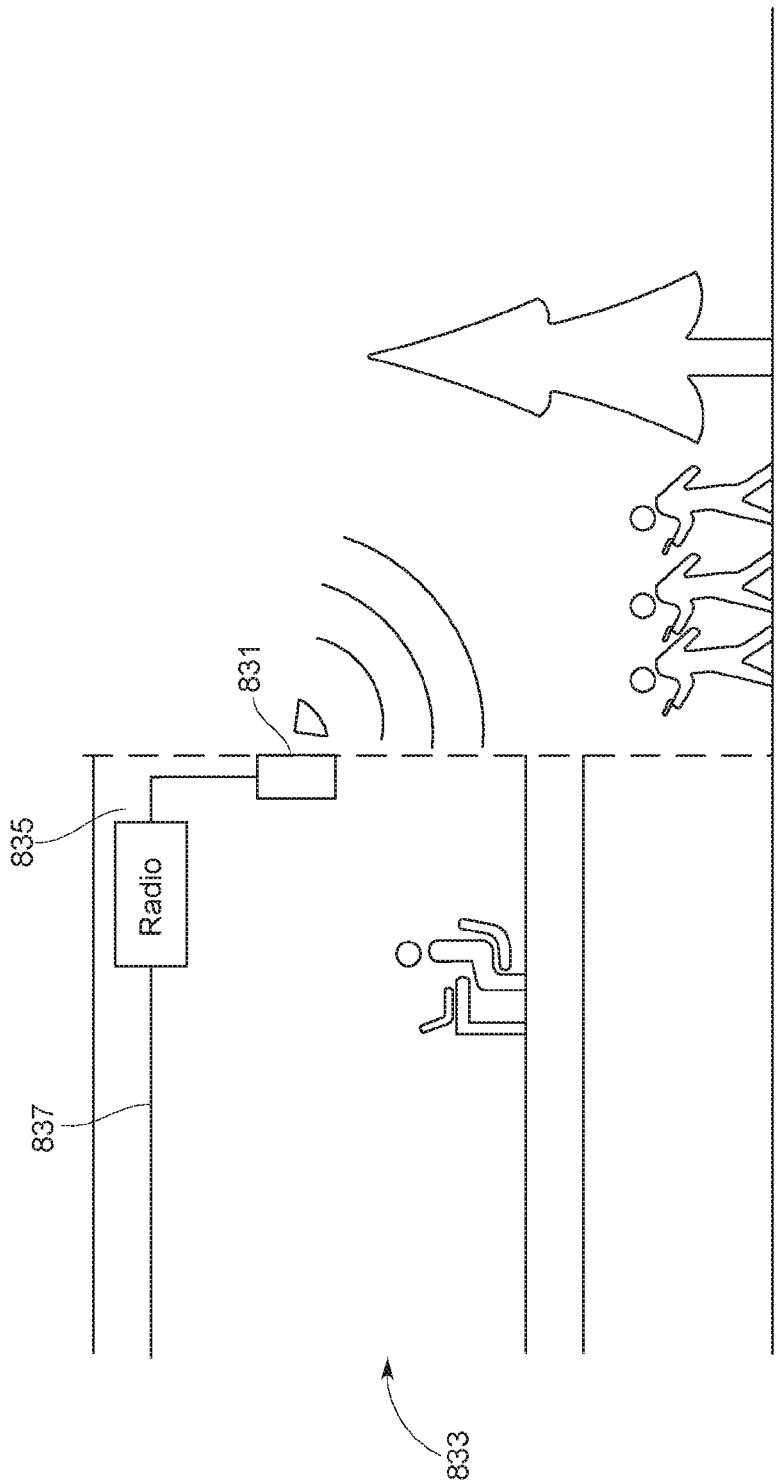

Three example use cases for building exterior antennas are depicted in FIGS. 8A-C. In FIG. 8A, two roof-mounted antennas 803 and 805 are within a line of site of each other. Either or both of them may serve as (a) a cellular tower for a particular carrier (e.g., Sprint 5G), and/or (b) a gateway for cellular services in an associated building (e.g., buildings 807 or 809, on which the roof antenna is mounted). Buildings 807 and 809 may be located in reasonable proximity to each other, e.g., within a neighborhood or within a single city block.

In FIG. 8B, a roof-mounted antenna 811 is within a line of site of an antenna 813 on or near a façade of a different building 817. Antenna 813 has an associated radio 815 configured to receive cellular communications (e.g., 50 communications) and convert them to digital (or analog) communications for delivery on the building's network infrastructure, including, e.g., a high bandwidth line 819 and antennas 821, which are optionally configured to transmit and/or receive Wi-Fi or 5G cellular communications. Details of the network infrastructure such as a control panel and Wi-Fi transceivers are omitted for clarity. Note that the frequency band or bands employed by antennas 821 need not be the same as that employed by roof-mounted antenna 811.

Yet another use case is depicted in FIG. 8C, which provides cellular coverage outside a building 833. The pertinent cellular infrastructure includes an antenna 831 mounted in or on an outer wall of building 833 and configured to transmit and receive cellular signals (e.g., 5G signals) outside building 833. Antenna 831 may be configured to utilize certain network infrastructure of building 833 including a radio 835 connected to a high speed communications backbone including a cable 837. Antenna 831 may be employed as a component of a cellular carrier's infrastructure and provide cellular service outside of building 833.

In some senses, a building network infrastructure as described herein may be viewed as a platform having multiple sockets, each of which can receive components that may be configured for wireless communications protocols. Examples of such protocols include Wi-Fi, CBRS radio, small cell (e.g., microcell or femtocell), carrier specific protocols, carrier agnostic cellular services such as vRAN (virtual radio access network), and the like. The platform is the network infrastructure that includes, for example, data transmission cables (coaxial, UTP, optical fiber, etc.) of sufficient gauge, high speed switches, routers, and/or other network devices that can work with one or more network protocols (e.g., Ethernet, Fibre Channel, MoCA, etc.), antennas, radios, etc.

Figure 9:
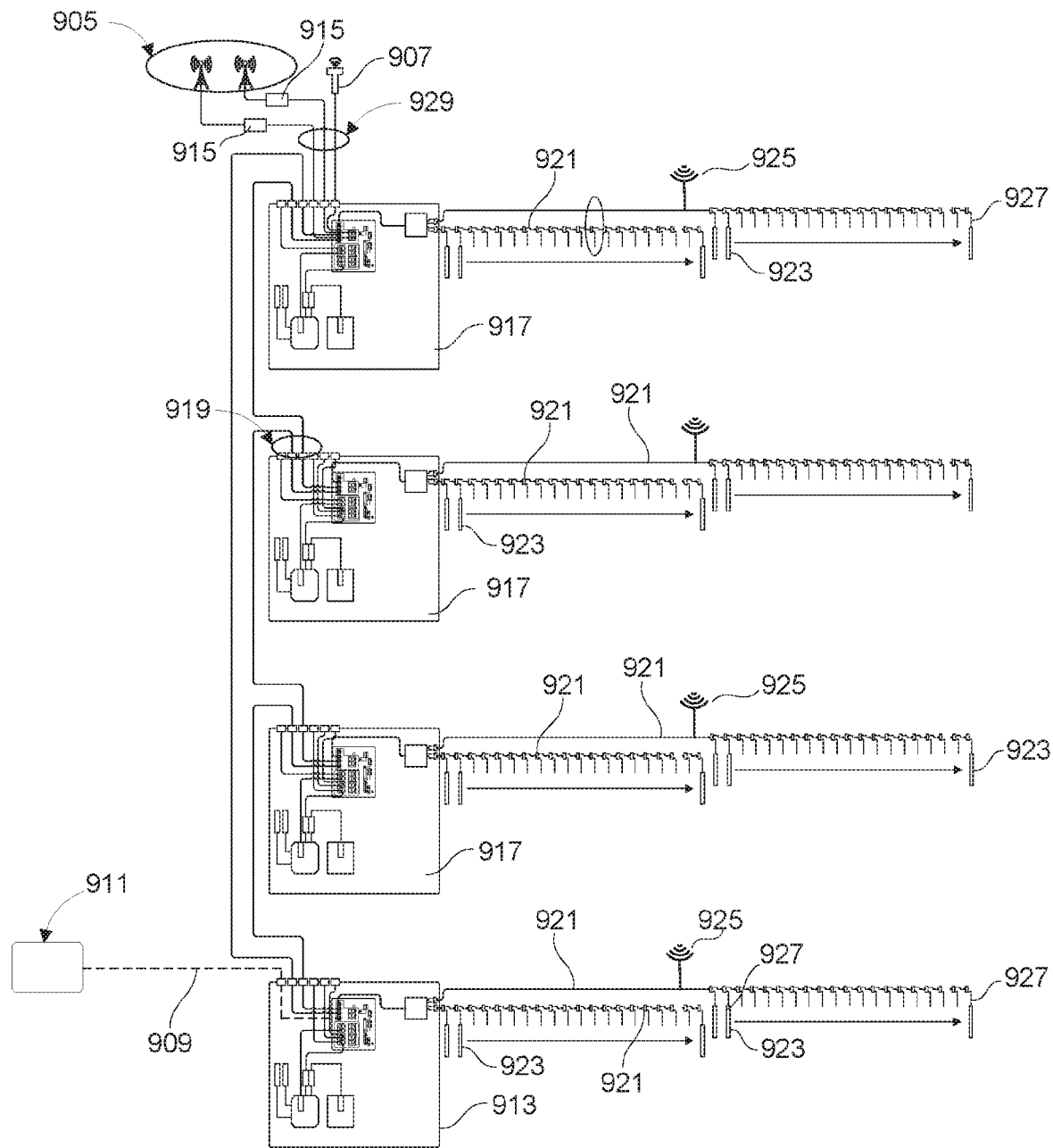
FIGS. 9, 9A. 9B, and 9C illustrate components of a wired high speed building data communications network, including components that interface with one or more communications service provider systems.
Figure 9A:
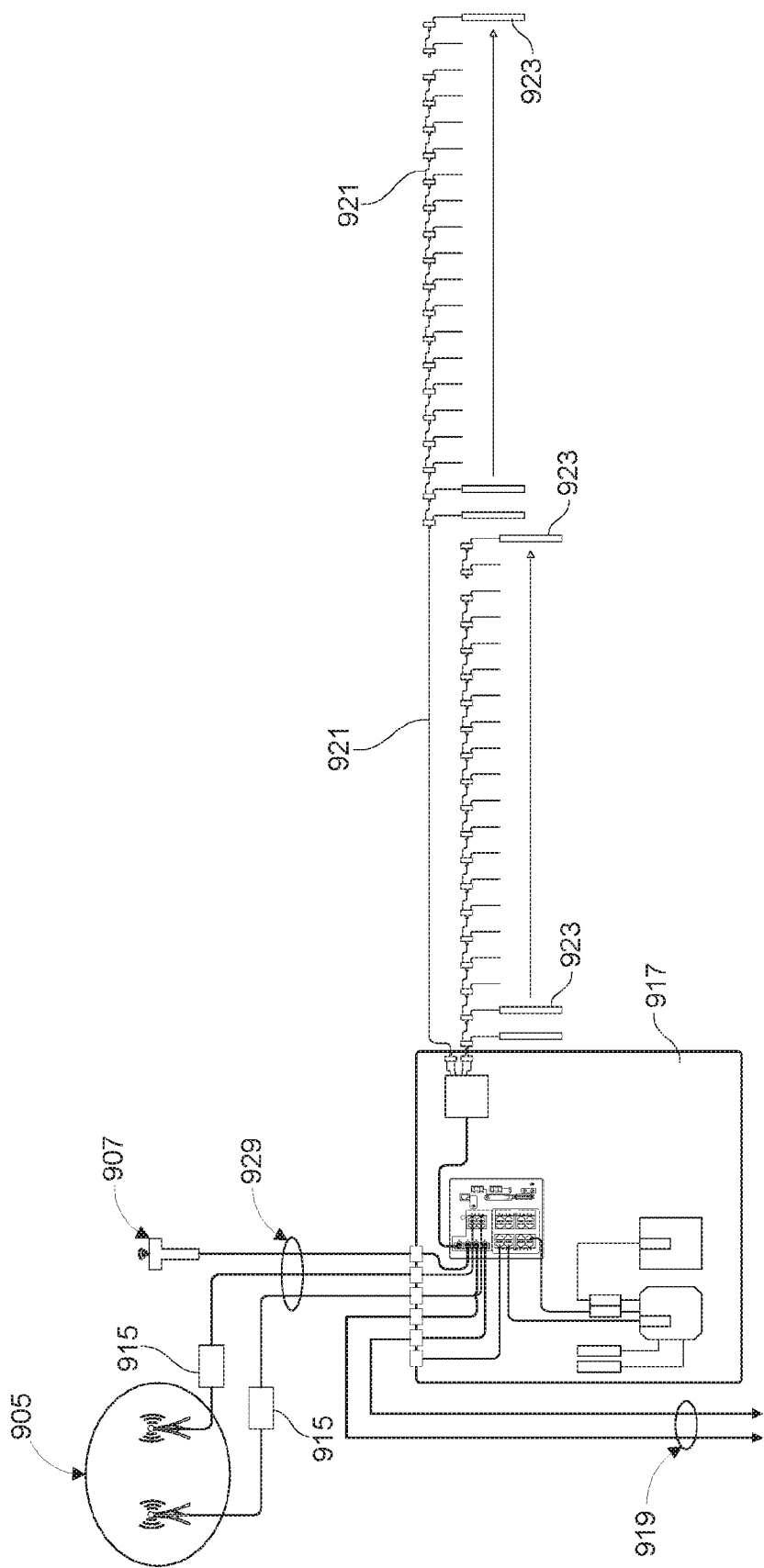
Figure 9B:
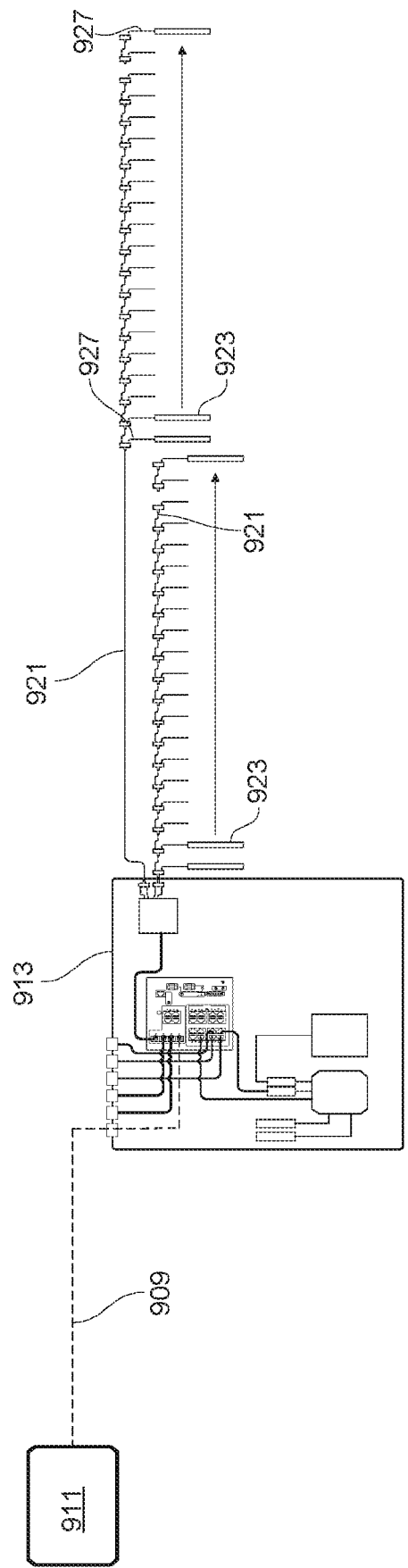
Figure 9C:
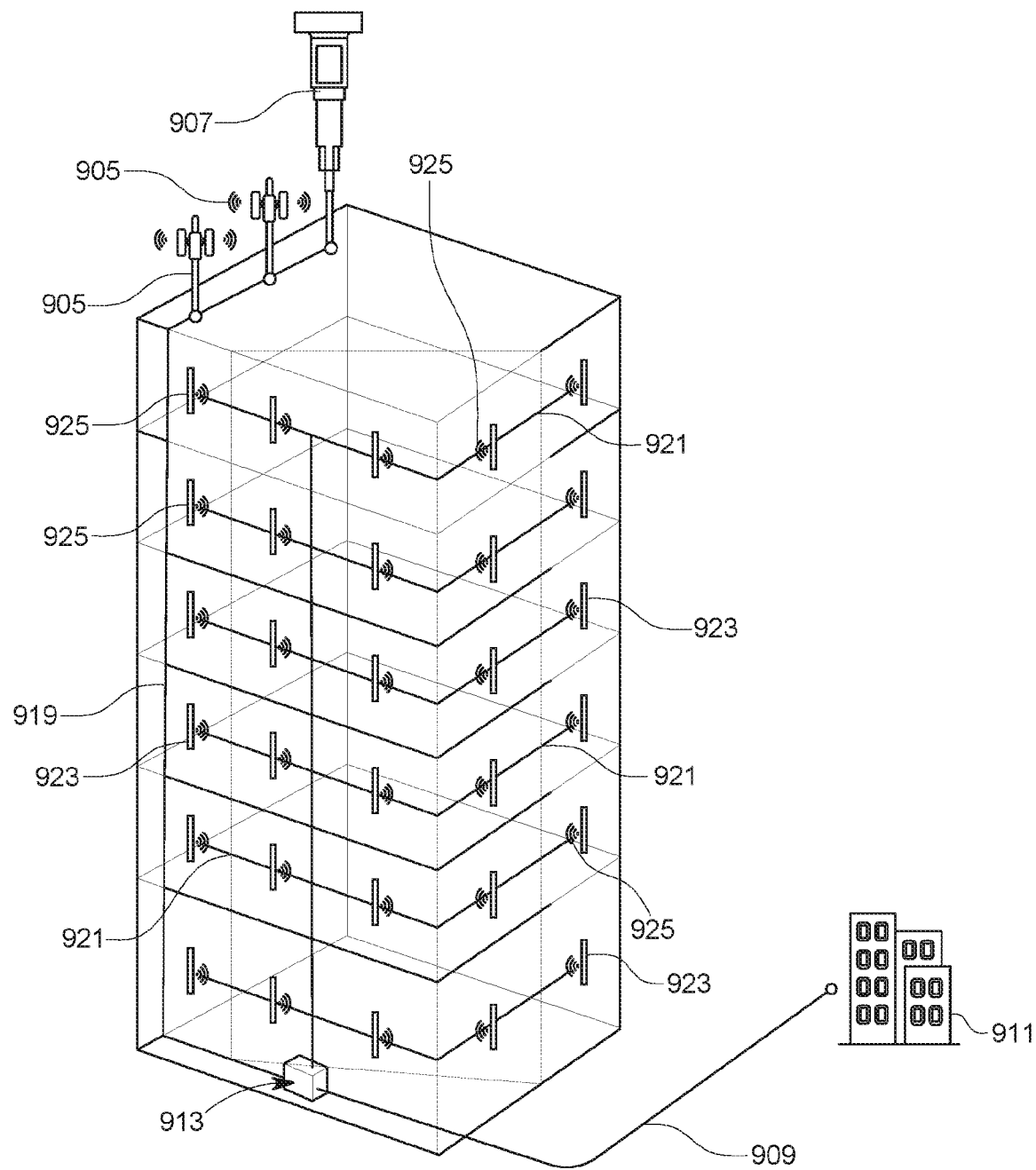

FIGS. 9, 9A, 9B, and 9C illustrate components of a high-speed building data communications network, including a distributed antenna system and components that interface with one or more communications service provider systems. In certain embodiments, a building network infrastructure has a vertical data plane (between building floors) and a horizontal data plane (all within a single floor or multiple contiguous floors). In some cases, the horizontal and vertical data planes have the same or similar data carrying capabilities and components. In other cases, these two data planes have different data carrying capabilities. For example, the vertical data plane may contain components for faster data transmission rates and/or bandwidths. In one example, the vertical data plane contains components that support 10 gigabit/second or faster Ethernet transmissions (e.g., using UTP wires and/or fiber optic cables), while the horizontal data plane contains components that support 1 gigabit/second or somewhat faster gigabit Ethernet transmissions via coaxial cable. In some cases, the horizontal data plane supports data transmission via the MoCA 2.5 standard or the MoCA 3.0 standard. In certain embodiments, connections between floors on the vertical data plane employ control panels with high speed Ethernet switches. These same control panels communicate with nodes on a given floor via a MoCA interface and associated coaxial cables on the horizontal data plane. Horizontal and vertical data planes in a single building structure are depicted in FIGS. 9 and 9C.

Data transmission, and in some embodiments voice services, may be provided in a building via wireless communications to and/or from the building's occupants. However, even with relatively low frequency protocols such as 3G or 4G cellular, this becomes problematic due in part to attenuation by building structures such as walls, floors, ceilings, and windows. The attenuation becomes more severe with higher frequency protocols such as 5G. To address this challenge, a building is sometimes outfitted with components that serve as gateways or ports to cellular signals. Such gateways couple to infrastructure in the interior of the building that provide wireless service via interior antennas and other infrastructure implementing Wi-Fi, small cell service (e.g., via microcell or femtocell devices), CBRS, etc. The gateways or points of entry for such services may include high speed cable (typically underground) from a carrier's central office and/or a wireless signal received at an antenna strategically located on the building exterior (e.g., a donor antenna or sky sensor on the building's roof). The high speed cable to the building is sometimes referred to as "backhaul."

FIGS. 9 and 9C illustrate different views of components of a distributed antenna system in a building. FIG. 9C illustrates the skin of the building and various antennas that participate in communications outside the building and/or facilitate communications inside the building. FIG. 9 emphasizes control panels or similar interior network portions that facilitate wired signal distribution on a floor-by-floor basis. Some functions of control panels were described above with reference to FIGS. 4A and 4B.

FIGS. 9 and 9C show components that allow a building services network to wirelessly interface with one or more communications service provider systems. As points of connection, in the illustrated example, the building includes multiple rooftop donor antennas 905 as well as a sky sensor 907 for sending and receiving wireless signals. The building also has at least one control panel 913 configured to connect to a provider's central office 911 via a physical line 909 (e.g., an optical fiber such as a single mode optical fiber). The control panel 913 may include hardware and/or software configured to provide functions of, for example, a signal source carrier head end, a fiber distribution headend, and a bi-directional amplifier or repeater. Collectively, the rooftop donor antennas 905, the sky sensor 907, and the control panel 913 allow building occupants and/or devices to access a communications service provider's wireless system. Each of these interface elements may provide access to the same service provider's system, different service providers' systems, or some variation such as two interface elements providing access to one provider's system and a different interface element providing access to a second provider's system.

As illustrated in FIG. 9, a vertical data plane may include multiple control panels 917 and high capacity data carrying line 919 such as single mode optical fiber or UTP copper lines of sufficient gauge. In some embodiments, a separate control panel 917 is provided on each floor. In some embodiments, one high capacity line directly connects a control panel 917 in the top floor with control panel 913 in the bottom floor. Note that control panel 917 directly connects to rooftop antennas 905 and/or sky sensor 909, while control panel 913 directly connects to the service provider central office 911.

As illustrated, referring still to FIG. 9, a horizontal data plane may include one of the control panels 917 (or 913 on the ground floor) and data carrying lines, which include trunk lines 921. In certain embodiments, the trunk lines are made from coaxial cable. The control panels may be configured to provide data on the trunk lines 921 via a protocol such as MoCA. Each horizontal data plane may provide high speed network access to one or more digital elements 923 (e.g., digital architectural elements as described elsewhere herein) and/or antennas 925, some or all of which are optionally integrated with digital elements 923. Antennas 925 (and associated radios, not shown) may be configured to provide wireless access by any of various protocols, including, e.g., cellular (e.g., one or more frequency bands at or proximate 28 GHz), Wi-Fi (e.g., one or more frequency bands at 2.4, 5, and 60 GHz), CBRS, and the like. Drop lines (e.g., drop line 927) may connect digital elements 923 to trunk lines 921. In some embodiments, a horizontal data plane is deployed on a single floor of a building.

As illustrated in FIGS. 9 and 9A, one or more donor antennas 905 may connect to a control panel 917 via high speed lines (e.g., single mode optical fiber or copper) 929. In the depicted example, the control panel may be located in an upper floor of the building. Also as depicted, the connection to the donor antenna(s) 905 may be via one or more vRAN radios 915 and coaxial cable.

As illustrated in FIGS. 9 and 9B, the communications service provider central office 911 connects to ground floor control panel 913 via a high speed line 909 (e.g., an optical fiber serving as part of a backhaul). This entry point of the service provider to the building is sometimes referred to as a Main Point of Entry (MPOE), and it may be configured to permit the building to distribute both voice and data traffic.

As indicated, in certain embodiments, the one or more cellular service gateways employ a vRAN. vRAN technology virtualizes baseband functions on, e.g., server hardware. A component of a vRAN is a radio that can support multiple different carrier communication protocols, although typically only one at a time. For example, an antenna and associated vRAN may be configured to send and receive data for one carrier (e.g., ATT) at one time and be reconfigured to send and receive data for a different carrier (e.g., T-Mobile) at a different time. Among the carrier-specific parameters that may be set in a vRAN radio are carrier frequency (e.g., allocated carrier-specific spectra around 800 MHz and 1.2 GHz), mode of modulation, data packing (e.g., CDMA v. GSM), encryption protocol, quality of service, and the like. Radios configured to implement vRAN may contain configurable logic (programming, firm ware, etc.) to permit easy conversion from a first parameter set for one carrier to a second parameter set for a different carrier. To scale with increases in total cellular traffic at a building, additional antennas and vRAN radios may be deployed on a building. If one carrier's fraction of the total traffic increase or decreases, vRAN radios may be reconfigured to rebalance the total cellular carrier-dedicated infrastructure in the building. As depicted in FIGS. 9 and 9A, each of multiple rooftop antennas 905 may have its vRAN radio 915 that can be configured to carry a particular carrier's wireless traffic. Donor antennas and/or sky sensor antennas may communicate via vRANs.

In various implementations, the vRAN radio relies on a set of commands that manage the radio. Separate management may be provided for each cellular carrier supported by the antennas and vRAN radios. The management communications may be provided in a dedicated or shared line to the vRAN radio.

The rooftop antennas 905 and/or antennas in sky sensor 907 may be configured to serve as donor antennas. Donor antennas are typically used to provide point-to-point wireless connection for a cellular carrier's service in a particular geographic locale. They may communicate with one another and/or with a dedicated cell tower for a given cellular carrier. They can extend the reach of a cellular carrier's service from a particular tower without requiring the carrier to build a new tower. They may also address changing conditions that impact wireless cellular communications such as shadows cast by new buildings, trees, etc. They may address such challenges by providing new paths between a dedicated tower and handsets or other consumers of wireless services. In some cases, donor antennas may also provide downlinks into a building by connecting via a wire cable link to a cellular carrier's central office and/or to internal antennas within the building to provide wireless service to occupants and/or interior devices. In the former case, the donor antenna may simply use the building's vertical data plane; in the latter case the donor antenna may use the building's vertical and horizontal data planes.

In cases where a building is located in a region without physical lines to the building from carrier central office, cellular service to the building may need to rely on one or more donor antenna on buildings in the vicinity, and on one or more on the building itself. The donor antenna may service as a gateway for cellular service to the building itself.

In some embodiments, all nodes (e.g., antennas and associated radios) in a building are set to the same service. For example, a single carrier supplies services to the whole building. The central office and the donor antenna provide cellular service to the whole building, possibly via several interior antennas on multiple floors of the building. This may be fine so long as the building is comfortably using the single carrier s service. But if the building management decides to transition to a different carrier's cellular service, the new carrier installs its own carrier-specific hardware in the building. Options include using multiple small cell systems in the same building and using vRAN technology to allow communications via multiple carriers.

Historically, small cell carrier service (e.g., microcell and femtocell) relied on a line connecting small devices via a backhaul connection. Such service provided wireless access to handsets that otherwise had limited access due to, for example, remote locations or building attenuation. The service carried data via a wire using a network communications protocol such as TCP/IP. A given small cell service is typically limited to a single carrier.

In some cases, a small cell system is made available to a building, at least in part, via one or more antennas in a sky sensor. See disposed on or associated with a sky-facing multi-sensor device. Such sky-facing multi-sensor devices are described, e.g., U.S. patent application Ser. No. 15/287, 646, filed Oct. 6, 2016, and previously incorporated herein by reference in its entirety, and may be referred to herein as a "sky sensor". Use of a sky sensor may provide other advantages such as facilitating cellular coverage to an increased area (geographically), similar to the mode described above for donor antennas. In some cases, a small cell system is made available to a building, at least in part, via one or more donor antennas.

In large cities where high capacity, high speed optical fiber is widely deployed (e.g., via a utility), the need for donor antennas decreases, at least insofar as the fiber serves as links for wireless service between buildings. In the evolution of cellular service to a geographic region, service may be provided first by a RAN in which case a single carrier provides service and all data is transmitted wirelessly. Next in the evolution, local service in the geographic region may be provided by vRAN services. This occurs when additional carriers enter the market but there is still not high speed fiber available to transmit the data. The next stage in the evolution may occur when high speed fiber is available in the geographic region. At this point, the cellular service may be made available via small cell services, where a separate small cell infrastructure is provided for each carrier in a building. Antennas in one or more sky sensors and/or donor antennas may facilitate this service.

In some building communications systems, data or voice information is sent and received from a building in one protocol but delivered to occupants of the building or made available to occupants of the building in a different protocol. Such systems may be employed, when, for example, a particular cellular protocol such as 5G is not deployed within but is used by the building to send and receive communications with carriers or other wireless communications systems outside of the building. As explained elsewhere herein, exterior antennas may be deployed on, for example, the roof of a building via one or more roof antennas and/or sky sensors.

In certain embodiments, wireless communications between the building and one or more other communications structures outside the building (e.g., cell towers or other buildings with roof antennas) is conducted using a first protocol that operates at one frequency, while communications within the building take place at one or more section protocols that operate at one or more other frequencies. In some embodiments, the frequency of the protocol used by the building to communicate outside the building is conducted at a higher frequency than communications within the building that are made available to occupants of the building. For example, a 5G cellular protocol may be used for communications between the building and external communications structures (e.g., cell towers), while 4G, Wi-Fi (including the 2.4, 5, and 60 GHz standards), CBRS, or other protocol is used for communications within the building. In some cases, the communications within the building are delivered at least in part over a wired infrastructure such as coaxial cables using a MoCA protocol or unshielded twisted-pair cables using conventional Ethernet. In addition, multi-protocol systems, as described, may employ repeater or other similar structure having a first transceiver for sending and receiving 5G (or other first protocol) wireless communications outside a building and a second transceiver for sending and receiving Wi-Fi, CBRS, or other second protocol wireless communications inside the building.

Such approaches may be used to avoid bringing communications delivered via very high frequency signals (e.g., 5G) into a building and rebroadcasting them at the same frequency at potentially thousands of locations in the building. In certain embodiments, communications signals outside a building (but including the building) are made via 5G at wavelengths in or near 30-300 GHz, but these signals are rebroadcast within a building as 3.5 GHz CBRS signals. As noted at the World Wide Web site fiercewireless.com/wireless/next-release-cbrs-specs-will-support-5G, CBRS can be made compatible with 5G. Thus, a building supporting or relying on a 5G protocol does not have to provide 30-300 GHz signals in the building interior.

Dual protocol approaches described above may be particularly appropriate when windows, walls, and/or other building structures block or strongly attenuate 5G signals and effectively prevent 5G communication from directly entering into buildings.

In some cases, windows and other building structures can be modified or manufactured in a way that blocks substantially all electromagnetic radiation, at least within certain frequency ranges; so that a room, a region of the building, or the whole building is effectively contained in a Faraday cage of sorts. For a description of examples of structures that substantially block certain electromagnetic radiation, see U.S. patent application Ser. No. 15/709,339, filed Sep. 19, 2017, which is incorporated herein by reference in its entirety. In certain embodiments, such structures are designed or tuned to block frequencies of one protocol (e.g., 5G) while allowing frequencies of other protocols to penetrate, and such structures are deployed on windows or other building structures to support multi-protocol systems.

Thus, in certain embodiments, the roof antenna(s) or other exterior antennas interface with 5G cellular from outside the building, while wires and/or interior antennas interface with building occupants via a non-5G protocol. And if interior antennas and radios are used (not wiring), the antennas/radios may communicate at frequencies below those of 5G. e.g., below about 10 GHz. In such cases, examples of suitable internal communications include 40 and 3G cellular, Wi-Fi, CBRS, etc. In some cases, the interior communication is made, at least in part, via wires and/or via LiFi. Example implementations of systems for LiFi communications with a building are described in U.S. Patent Application No. 62/827,674, filed Apr. 1, 2019, which is incorporated herein by reference in its entirety.

In certain embodiments, a building communication system contain infrastructure for providing wireless communications inside the building via licensed bands (licensed by communications agencies such as the US Federal Communications Commission, for example) for multiple cellular carriers (e.g., Verizon, Sprint, etc.) and use their bands inside the building, alone or optionally in combination with an unlicensed band such as a CBRS band. In certain embodiments, a building communication infrastructure can act as a gateway that cellular carriers may license or lease in order to facilitate cellular communication to the building interior via their FCC licensed bands. As explained elsewhere, the cellular carriers can use the building communications system infrastructure supplement their existing systems.

Antennas (Transmission and Reception Properties)
Radiation Pattern

A transmitted or received radiation pattern for a given antenna may be shaped and sized to cover a particular region of a building such as a floor, a lobby, or a room within a floor. The horizontal and vertical coverage may be controlled by the design of the antenna and its location in a building. In certain embodiments, an antenna's radiation pattern has a generally hemispherical shape. In some cases, such pattern is appropriate for covering an entire side or multiple floors of a building. However, some buildings have metal structures (e.g., corrugated metal plates) between floors, and such structures may strongly attenuate any radiation signal passing vertically between floors. With this or other considerations in mind, an antenna's radiation pattern may be flat or fan shaped in the horizontal direction. Such patterns may be effective for covering a single floor or a portion of a floor. Such patterns waste relatively little power on signal directed vertically that might otherwise be attenuated by building structures in the floors or ceilings. In certain embodiments, an antenna is designed so that the horizontal shape or angular spread of its radiation pattern is limited (e.g., 90 degrees versus 180 degrees). In certain embodiments, an antenna produces a cardioid-shaped radiation pattern.

In certain embodiments, the shape of a radiation pattern is controlled using two or more antennas separated from one another (e.g., placed on opposite walls of a room or floor). Two separated antennas, for example, may provide a power distribution that is greatest to the front and rear of a virtual line connecting the two antennas.

Various features of the antenna design impact the shape of the radiation pattern. Examples include (i) the overall shape of an antenna element conductor (straight linear, lobed, wave shaped, handle shaped, strip shaped, etc.), (ii) any slots or holes in the interior of the conductor, (iii) whether a ground plane is used, and the like.

In some implementations, building antennas are provided with transceivers that can produce signals of only a limited range; e.g., the signal effectively propagates only a limited distance such as about ten meters or shorter. Such limited range transceivers and associated antennas may have the benefit of operating outside a domain that is subject to certain regulatory restrictions such as US Federal Communications Commission restrictions. Such antennas may be particularly useful for transmitting and receiving signals in the interior regions of a building.

Polarization:

Radio waves emitted by an antenna often have a specific polarization. Similarly, receiving antennas may be predominately sensitive to radio waves of a specific polarization. Radiation emitted by or received from a building antenna may have a preferential polarization such as linearly polarization or circularly polarization. Linear polarized signal may be, e.g., horizontally polarized or vertically polarized. Ionosphere noise on earth is generally vertically oriented. Therefore many conventional outdoor antennas send and receive primarily horizontally polarized signal. In a building, however, the effect of ionosphere noise is not as significant. Hence non-horizontally polarized signal may be acceptable.

Frequency:

Building antennas may send or receive signal at a single frequency or over multiple frequencies; e.g., any one or more of the Wi-Fi, 4G cellular, 50 cellular, and millimeter wave frequency bands. Certain antenna implementations require transmission or reception at multiple frequency bands, in which case the system includes either a single antenna that can send and/or receive signals over the multiple required frequencies or it may include multiple single frequency band antennas, each configured to send and/or receive signals at one of the required frequencies. In the latter case, the system may employ a group of antennas such as an array of closely spaced antennas, where each antenna is configured to send/receive at its own distinct frequency. Each such antenna also requires its own connector and cable—which may run in parallel with one another—and in some cases each such antenna requires its own transceiver. Another application that may employ multiple antennas operating under control of different transceivers is the multiple-input and multiple-output (MIMO) configuration employed by certain cellular protocols. MIMO antenna designs are sometimes used to support a high bandwidth. By providing multiple channels or frequencies for input and output, in antenna and associated hardware increases the likelihood that it will have a good connection to a surrounding wireless communication signal, e.g., a 3G, 4G, 5G cellular signal or a Wi-Fi signal.

In cases using a multi-frequency antenna, the antenna and its transceiver require only a single cable, thereby reducing the number of cables or lines that must be installed and maintained. In one example, a multi-frequency antenna sends/receives signals at various frequencies, e.g., at 2-5 frequency bands, over a wide range, e.g., about 700 MHz to about 60 GHz.

Antennas (Examples of Types)
General

Antennas used in buildings and providing the network or service functions described herein may have any of various designs. A few examples are provided below. Others are presented in the following patent applications incorporated herein by reference in their entireties: PCT Patent Application No. PCT/US17/31106, filed May 4, 2017 (PCT Patent Application Publication No. 2017192881); U.S. patent application Ser. No. 15/287,646, filed Oct. 6, 2016 (US Patent Application Publication No. 20170122802); and PCT Patent Application No. PCT/US18/29460, filed May 25, 2018 (PCT Patent Application Publication No. 2018200740)

Patch Antennas

Patch antennas may be implemented a surface of a lite. They may be provided as a flat patch of conductive material on the surface of a window and oriented substantially parallel to the surface of the window. See, e.g., the examples provided in FIGS. 10A to 10D. Such antennas can be provided on interior or exterior facing sides of a window. In a dual pane IGU, for example, such antennas may be disposed on any of the four lite surfaces. In certain embodiments, a patch antenna is disposed on surface 3 or 4 of an IGU. In certain embodiments, a ground plane (not shown in the figures) is provided. In some implementations, the ground plane is provided as conductive surface such as a layer of a transparent conductive material (e.g., an indium tin oxide) or a mesh of very fine (imperceptible to human vision) of conductive lines or curves on a surface parallel to the patch antenna (e.g., on a lite surface of the IGU containing the patch antenna). Various examples of patch antennas for windows are described in Patent Application No. PCT/US17/31106, filed May 4, 2017 (PCT Patent Application Publication No. 2017192881), which is hereby incorporate by reference in its entirety.

Figure 10A:
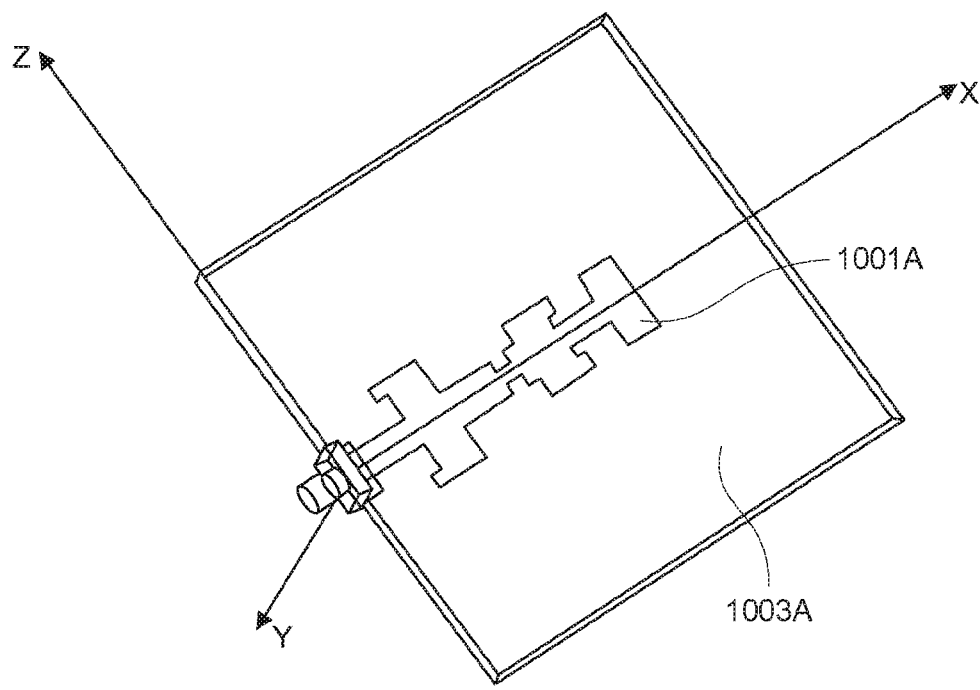
FIGS. 10A to 10D present examples of patch antennas having conductive material disposed on, e.g., the surface of a window and oriented substantially parallel to the surface of the window.
Figure 10A:
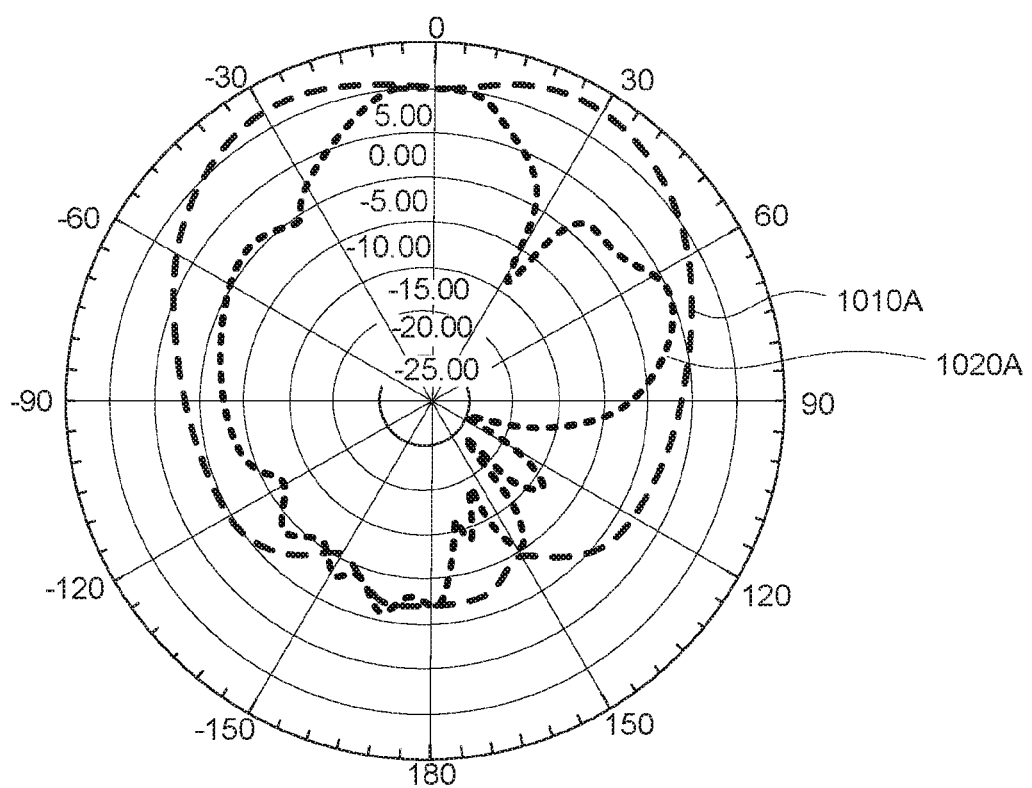

FIG. 10A presents in the upper panel the layout of a patch antenna element 1001A on a glass or other window substrate 1003A. The shape of the patch-note the rectangular and wing-shaped features connected on the patch and having a defined spacing-influences various properties of the radiation emitted from the patch antenna. Examples of such properties include the number and location of frequency bands, the widths of such bands, the polarization, and the intensity distribution of the radiation emitted and/or received by the antenna. For example, the spacing of the rectangles may correspond to the wavelength of emitted or received radiation. An electrical connector is shown in the lower left side of the antenna. The lower panel of FIG. 10A shows a radiation intensity profile of patch antenna 1001A element. A first curve 1010A represents the antenna's radiation intensity distribution in the y-z plane, and a second curve 1020A represents the antenna's radiation intensity distribution in the x-y plane, in both cases with 0 degrees corresponding to the direction of the y axis. In the illustrated example, the curves are generated assuming that the sheet resistance of the patch is about 1 ohm/sq. In certain embodiments, the depicted patch antenna transmits and/or receives radiation centered on a frequency of about 5 GHz.

Figure 10B:
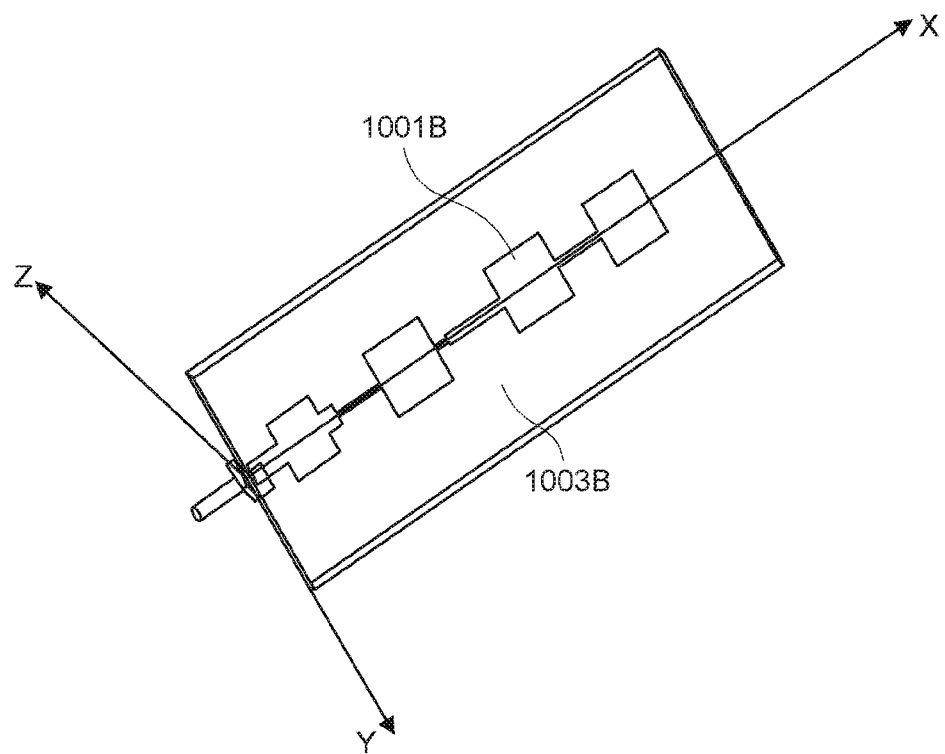
Figure 10B:
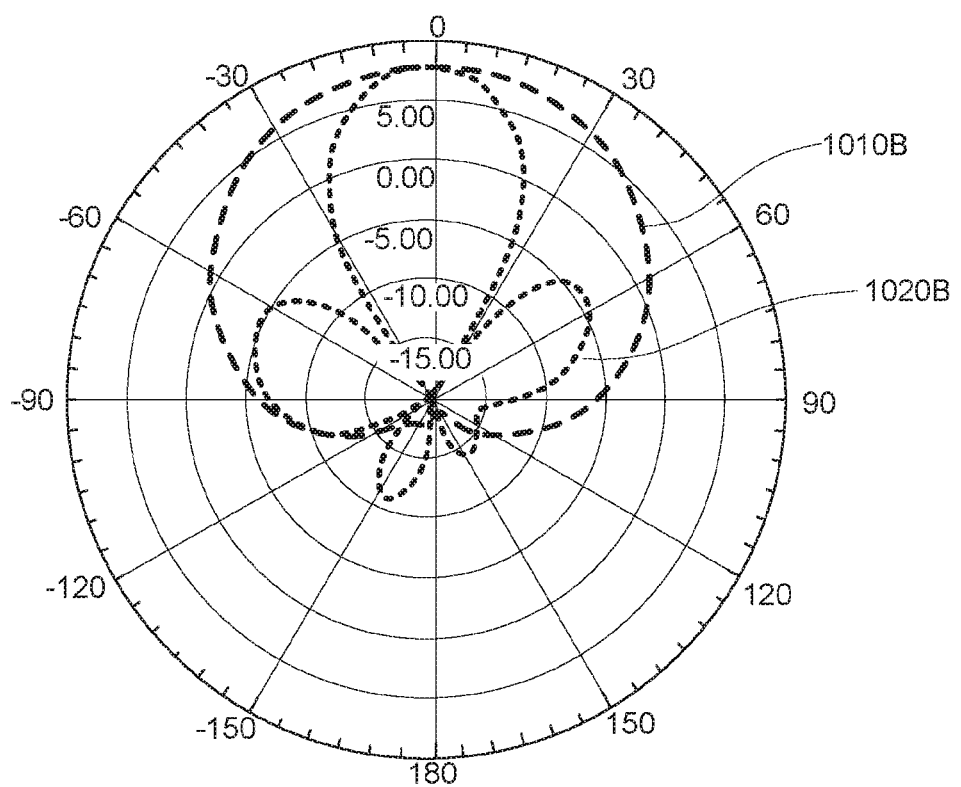

FIG. 10B presents in the upper panel the layout of a patch antenna element 1001B on a glass or other window substrate 1003B. As with the patch design of antenna element 1001A, the shape of antenna element 1001B—note its multiple, separated rectangular features connected on the patch and having defined spacing-influences various properties of the radiation emitted from the patch antenna. Examples of such properties include the number and location of frequency bands, the widths of such bands, the polarization, and the intensity distribution of the radiation emitted and/or received by the antenna. For example, the spacing of the rectangular features may correspond to the wavelength of emitted or received radiation. Antenna element 1001B may be provided with or without a ground plane. In electrical connector is shown in the lower left side of the antenna. The lower panel of FIG. 10B shows the radiation characteristics of patch antenna 1001B element. A first curve 1010B represents the antenna's radiation intensity distribution in the y-z plane, and a second curve 1020B represents the antenna's radiation intensity distribution in the x-y plane, in both cases with 0 degrees corresponding to the direction of the v axis. As in the previous example, the curves are generated assuming that the sheet resistance of the patch is about 1 ohm/sq. In certain embodiments, the depicted patch antenna transmits and/or receives radiation centered on a frequency of about 2.4 GHz.

Figure 10C:
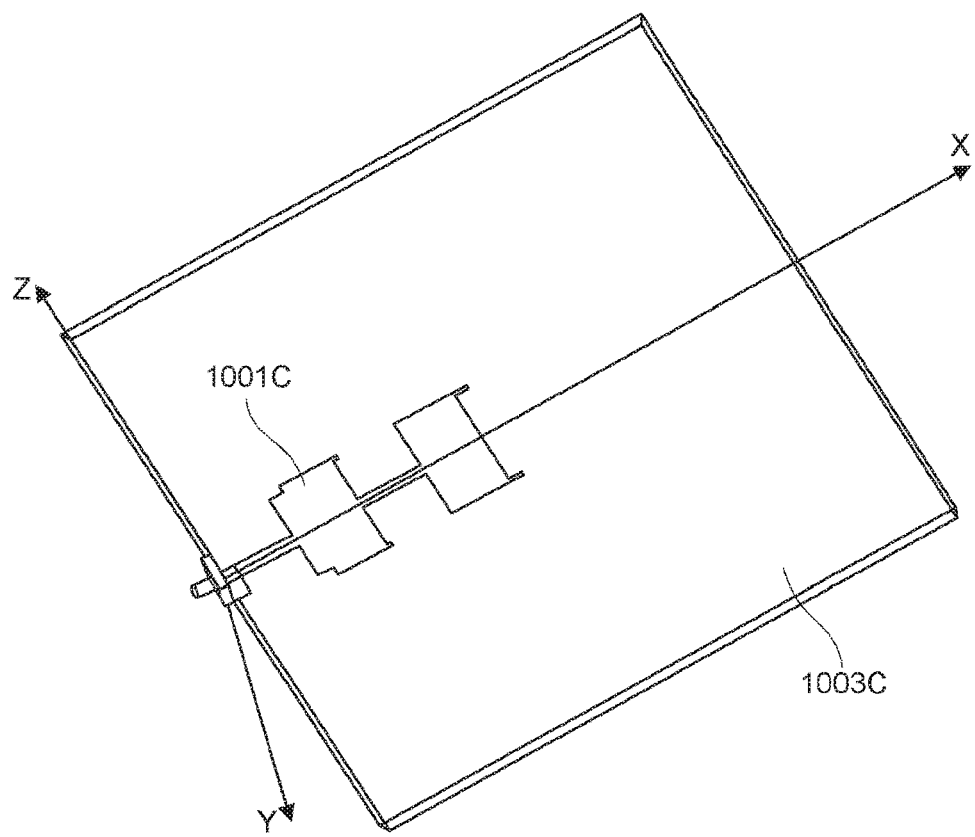
Figure 10C:
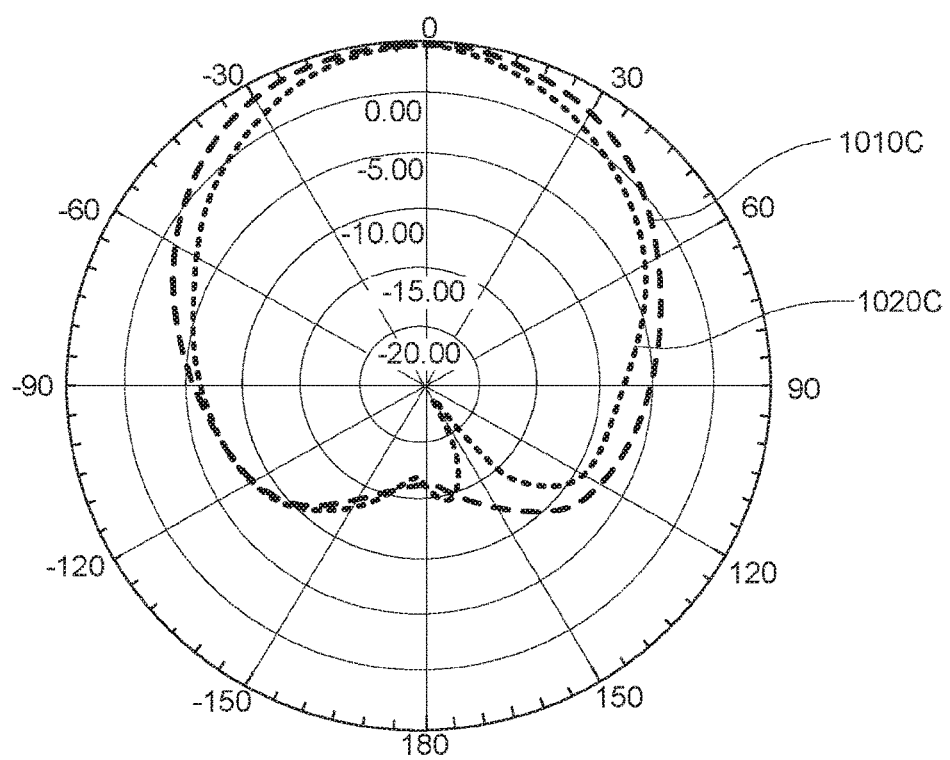

FIG. 10C presents in the upper panel the layout of a patch antenna element 1001C on a glass or other window substrate 1003C. As with the patch design of antenna elements 1001B and 1001A, the shape of antenna element 1001C—note its two slightly differently shaped, generally rectangular features connected on the patch and having a defined separation-influences various properties of the radiation emitted from the patch antenna. Examples of such properties include the number and location of frequency bands, the widths of such bands, the polarization, and the intensity distribution of the radiation emitted and/or received by the antenna. For example, the spacing of the rectangular features may correspond to the wavelength of emitted or received radiation. Antenna element 1001C may be provided with or without a ground plane. An electrical connector is shown in the lower left side of the antenna. The lower panel of FIG. 10C shows the radiation characteristics of patch antenna 1001C element. A first curve 1010C represents the antenna's radiation intensity distribution in the y-z plane and a second curve 1020C represents the antenna's radiation intensity distribution in the x-y plane, in both cases with 0 degrees corresponding to the y axis. As in the previous examples, the curves are generated assuming that the sheet resistance of the patch is about 1 ohm/sq. In certain embodiments, the depicted patch antenna transmits and/or receives radiation centered on a frequency of about 2.4 GHz.

Figure 10D:
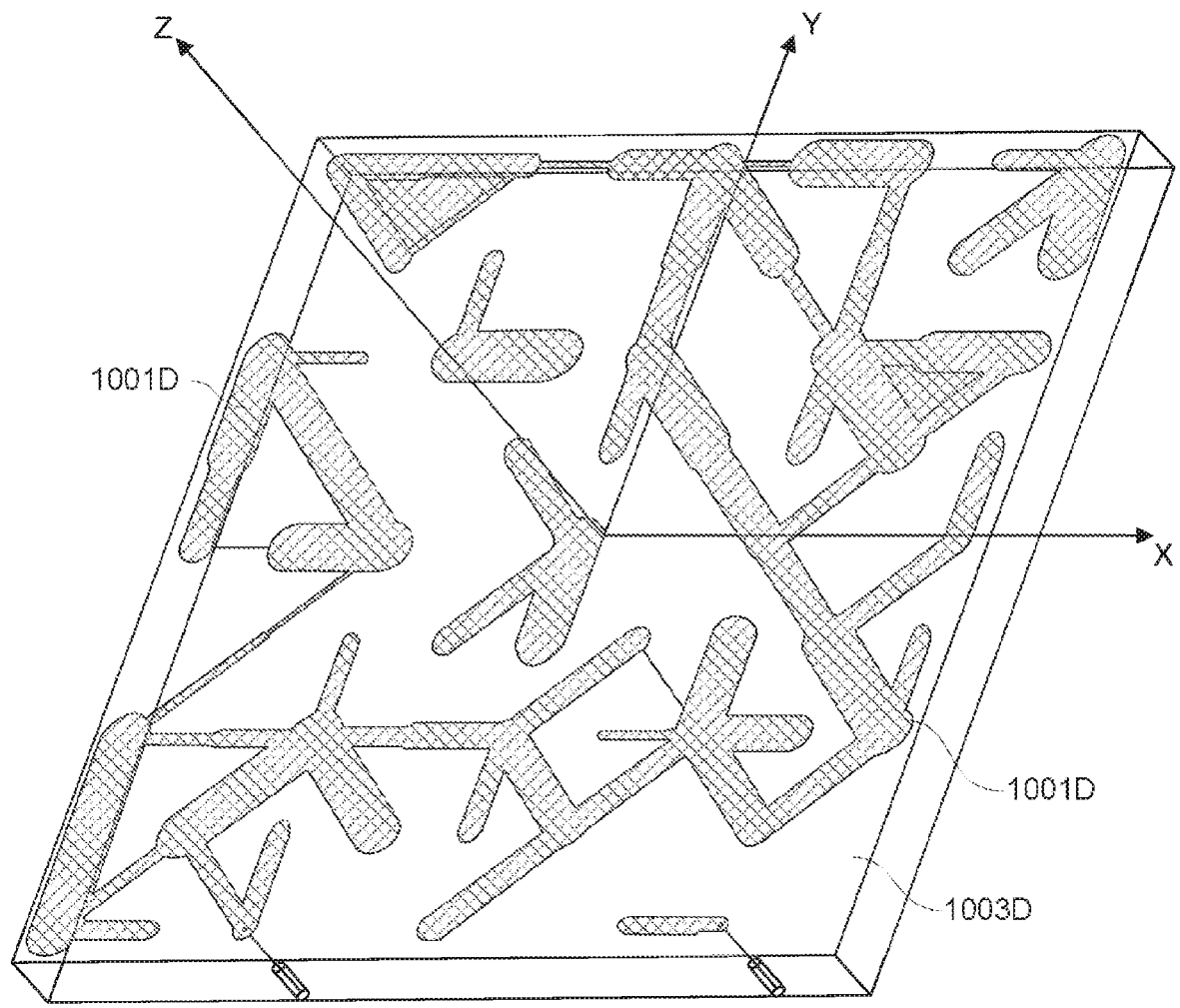

FIG. 10D presents a layout of an antenna element 1001D on a glass or other window substrate 1003D. Note antenna element 1001D's complex grid structure having over ten segments of different widths and angles with respect to one another. This grid structure influences various properties of the radiation emitted from the patch antenna. Examples of such properties include the number and location of frequency bands, the width of such bands, the polarization, and the intensity distribution of the radiation emitted and/or received by the antenna. Antenna element 10011) may be provided with or without a ground plane. In certain embodiments, the depicted patch antenna transmits and/or receives radiation at multiple frequencies. In certain embodiments, this is accomplished having different transceivers connected to different electrically isolated elements of the grid (e.g., the individual antenna elements that do not electrically contact one another on the plane of the dielectric substrate).

Figure 11:
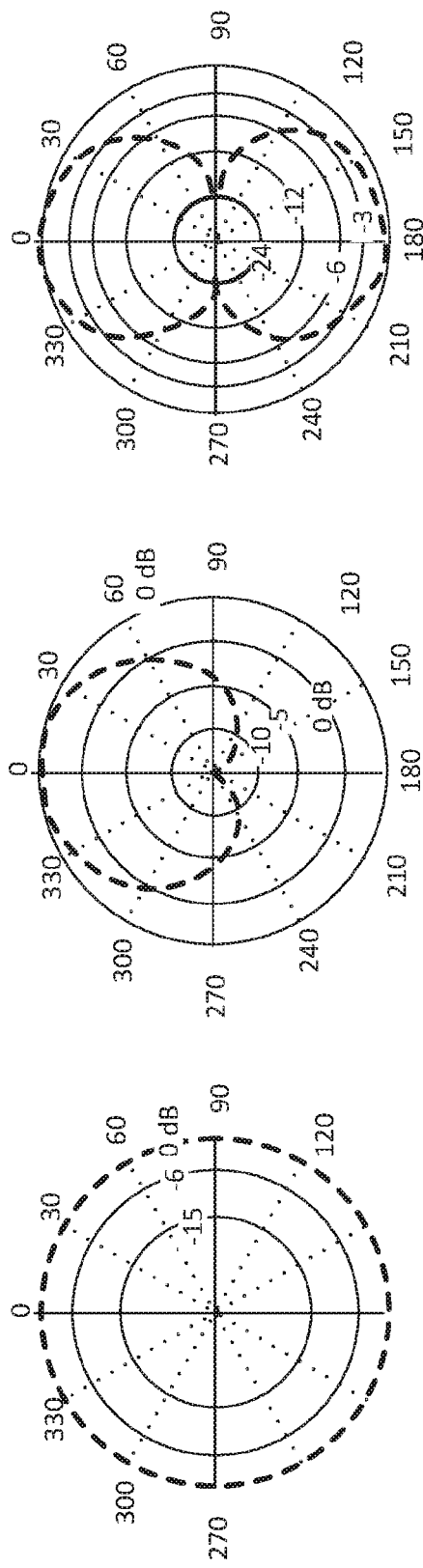
FIG. 11 presents radiation patterns for example monopole antennas formed on identified surfaces of a two-lite IGU.

FIG. 11 presents radiation patterns for example monopole antennas formed on identified surfaces of a two-lite IGU. EC represents "electrochromic," "Ant" represents "antenna," "GP" represents "ground plane," and "TCO" represents "transparent conductive oxide" (e.g., indium tin oxide). All of these may be provided as layers or partial layers on the identified lite surface of the IGU.

Trough Antenna

Figure 12A:
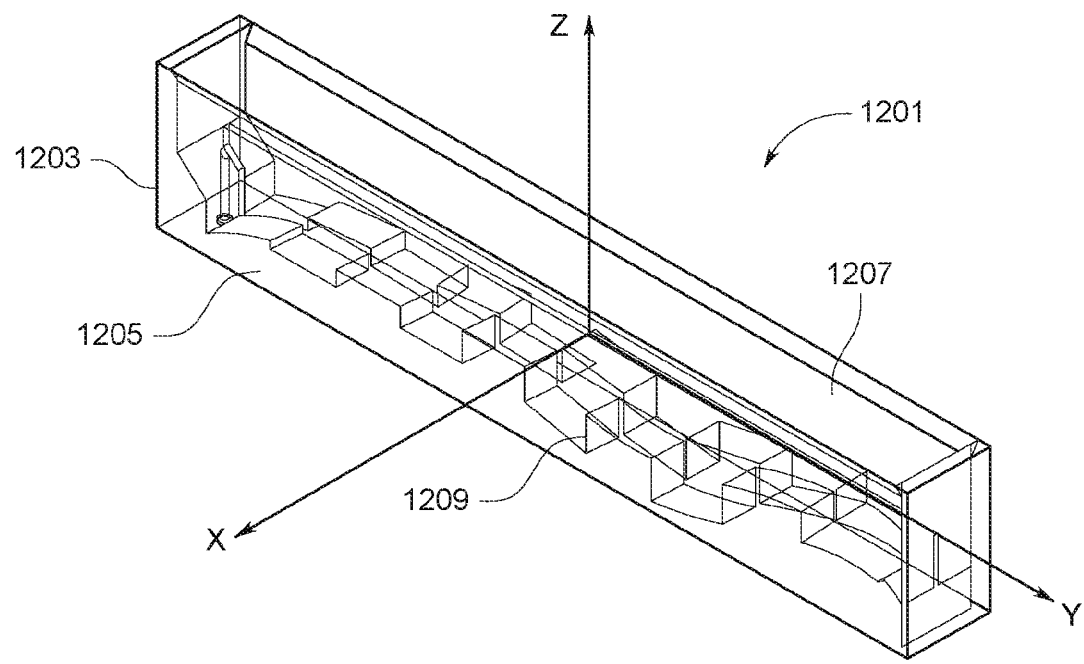
FIGS. 12A-C show an example of a trough antenna having two principal structural components: a serpentine-shaped conductive antenna element and an outer case.
Figures 12B, 12C:
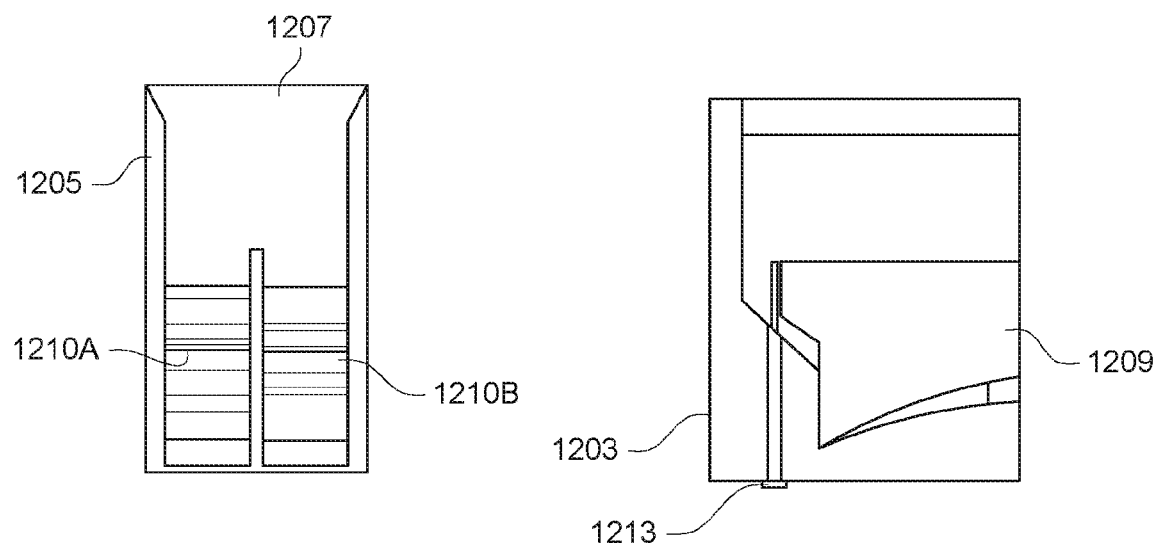

FIGS. 12A-C show an example trough antenna 1201 having two principal components: a serpentine-shaped conductive antenna element 1209 and an outer case 1203. FIG. 12A provides a perspective view of the entire antenna with the walls of outer case 1203 being transparent. FIG. 12B provides a cross-sectional view of the antenna in the x-z plane. Finally, FIG. 12C provides a cross-sectional view in the y-z plane at an end of the antenna, where a conductor (for electrical coupling with a transmitter and/or receiver) connects to antenna element 1209.

Outer case 1203 of the antenna is provided in two portions. A first portion 1205 is a partially enclosing structure (e.g., a generally bathtub shaped part) that is conductive and serves as a ground plane. A second portion 1207 covers the opening of the first portion and is made from a material that is more transparent (compared to the first portion) to electromagnetic radiation at the frequencies of the antenna. Second portion 1207 may be optional.

Inside the trough outer case 1203 is the generally serpentine shaped conductor 1209, sometimes referred to herein as an antenna element. In certain embodiments, the antenna element 1209 has a generally undulating or wave shape, with one or more peaks and one or troughs. In some cases, antenna element 1209 has at least two peaks and at least two troughs. In various embodiments, the peak(s) and/or trough (s) have a generally square or rectangular shape; for example, collectively they may have a generally square wave shape. Other embodiments may employ curved, triangular, or other polygonal shaped peaks and/or troughs. During transmission or reception, signal propagates through this conductor.

A conductive ridge or septum 1211 runs lengthwise through the trough and divides the conductor 1209 into two pieces or portions, 1210A and 1210B. The shape, size, and relative orientations of the conductor elements, particularly septum 1211 and portions 1210A and 1210B, determines the frequency band, polarization, and/or intensity distribution of the emitted and/or received radiation. For example, the shape of portions 1210A and 1210B determines particular patterns of constructive and destructive interference that produce the characteristic shape and frequency of electromagnetic radiation propagated into the adjacent space. Depending on the conductor shape, the radiation intensity pattern may be fan-shaped, hemispherical-shaped, cardioid-shaped, cylinder-shaped, and the like. The conductor shape and size also dictate the frequency distribution(s) and polarization at which the antenna sends/receives signals. The remainder of the trough outer case 1203 (the portion not occupied by the serpentine conductor) is optionally filled with a dielectric material.

In some implementations, peaks and troughs of portion 1210A are separated from one another by about the wavelength of the emitted or received radiation. Similarly, the peaks and troughs of portion 1210B may be separated by about the wavelength of the emitted or received radiation, but in this case oriented about 180 degrees out of phase with the peaks and troughs of 1210A. The signal transmitted or received on portions 1210A and 1210B may correspondingly be about 180 degrees out of phase. The resulting structure may produce a generally flat or fan-shaped radiation intensity profile propagating generally in the z-direction. Shifting the wavelength of the driving or receiving radiation source slightly lower or higher than the wavelength defined by portions 1210A and 1210B shifts the radiation intensity profile slightly in the x-direction, positive or negative depending on the direction of wavelength offset. In certain embodiments, trough antenna 1201 emits radiation having polarization generally in the x direction.

Trough antenna 1201 includes a feed point 1213 located at one of the bottom ends of the trough outer case 1203 for attachment of the conductive antenna element 1209 to a conductive line running to a transceiver. Another line connects the trough first portion 1205 to ground. In certain embodiments, a single coaxial cable is employed with the outer conductor of the cable (grounded) connected to first portion 1205 and the center conductor connected to the generally serpentine-shaped conductor 1209.

In various embodiments, antenna element 1209 is made from metal or other highly conductive material. Examples include aluminum, copper, brass, and the like. In various embodiments, the first portion 1205 of the outer case 1203 is made from a conductive material such as aluminum, copper, brass, etc. In various embodiments, the second portion 1207 of the outer case 1203 is made from a dielectric material. Examples include glass, polymer, and ceramic. The trough antennas can be constructed to be durable in the face of sunlight exposure, wind, precipitation, temperature extremes and large variations, and other environmental challenges such as vibrations and/or dust and other particles.

A trough antenna may be positioned at various locations in or on a building. In general, it may be installed at any of the antenna locations described above. In some embodiments, it is positioned on the exterior of a building. In some embodiments, it is installed on an architectural element such as a mullion, sill, or ceiling, or it may be installed on an IGU or window. In the case of a mullion, a trough antenna may be installed in a slot in a mullion or other architectural element of a building.

In certain embodiments, a trough antenna is about 5-50 cm, or about 10-40 cm in the longest dimension. In some such embodiments, the remaining dimensions may be between about 2 and 20 cm.

A transmitted signal emanates from the opening in the partially enclosing structure 1205 of a trough antenna. Alternatively, if a trough antenna is configured to receive signals, signal is received through the opening. In certain embodiments, the emitted (or received) signal from this opening has a flat, fan-like shape, having a generally planar shape that is generally parallel to the long axis of the antenna. Depending on the orientation of the antenna as mounted, the fan shaped signal may be horizontally oriented. However the size and shape of the serpentine conductor allows for alternative shapes of the signal such as cardioid patterns, partial hemispheres, cylinders, etc. In certain embodiments, the emitted signal is polarized in the direction of the antenna's long axis; e.g., the antenna may emit horizontally polarized radiation.

In various embodiments, a trough antenna may be configured to operate at only a single frequency band. Thus, in certain implementations of the trough antenna shown in FIGS. 12A-C, conductive antenna element 1209 is configured to send and/or receive signals at only a single frequency band. If a system is to support multiple protocols (e.g., 4G and 5G cellular protocols), the system may employ multiple trough antennas, one for each frequency of interest, in a room or other service area. In certain embodiments, a trough antenna is designed or configured to transmit or receive radiation in the frequency range of about 700 MHz to 60 GHz. In certain embodiments, a trough antenna is designed or configured to transmit or receive radiation in the frequency range of about 700 MHz to 6 GHz. In certain embodiments, a trough antenna is designed or configured to transmit or receive radiation in the frequency range of about 6 GI-z to 30 GHz.

Handle Antenna

Figure 13A:
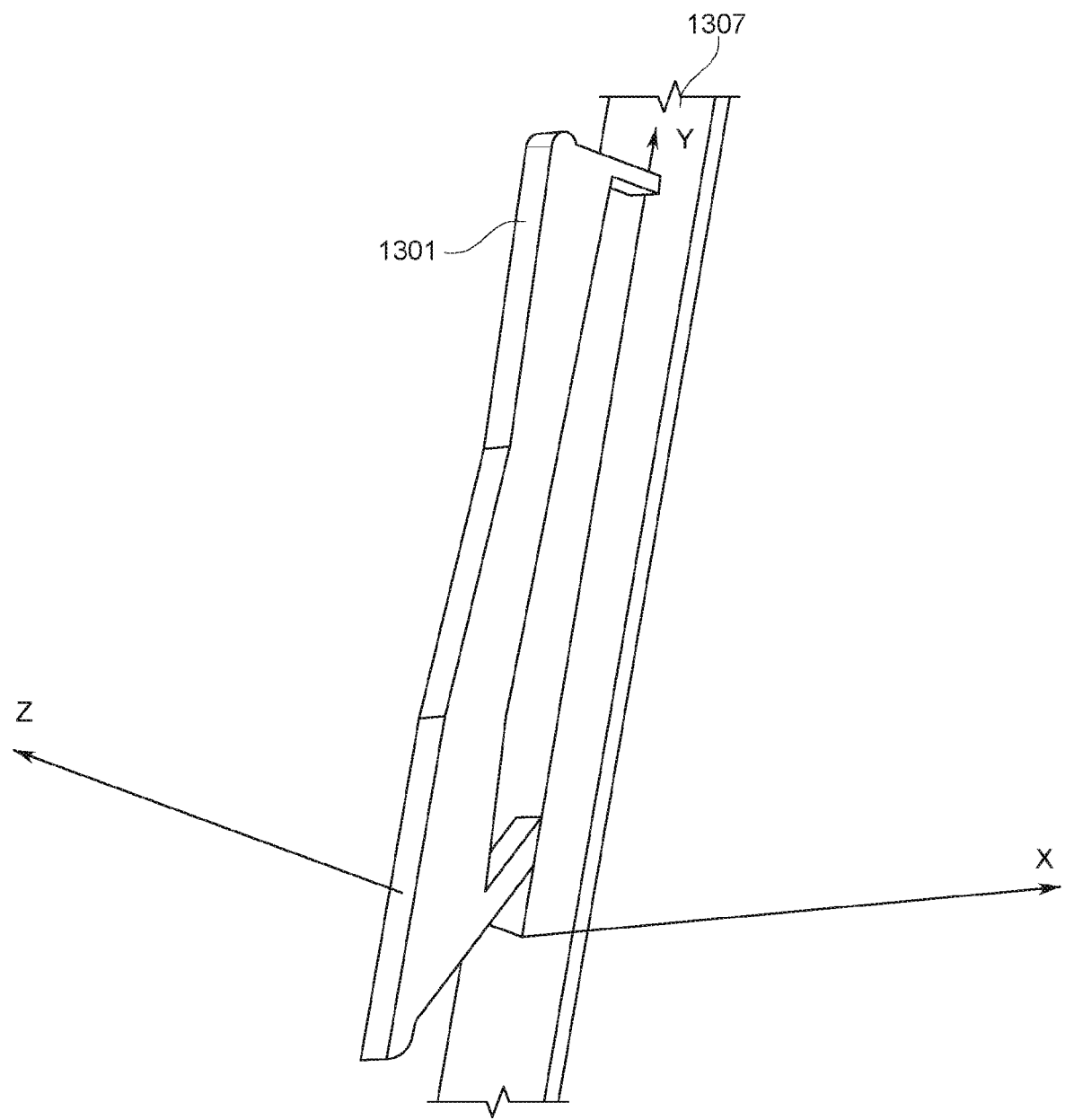
FIGS. 13A and 13B depict an example of a handle antenna that includes a handle-shaped antenna element.
Figure 13B:
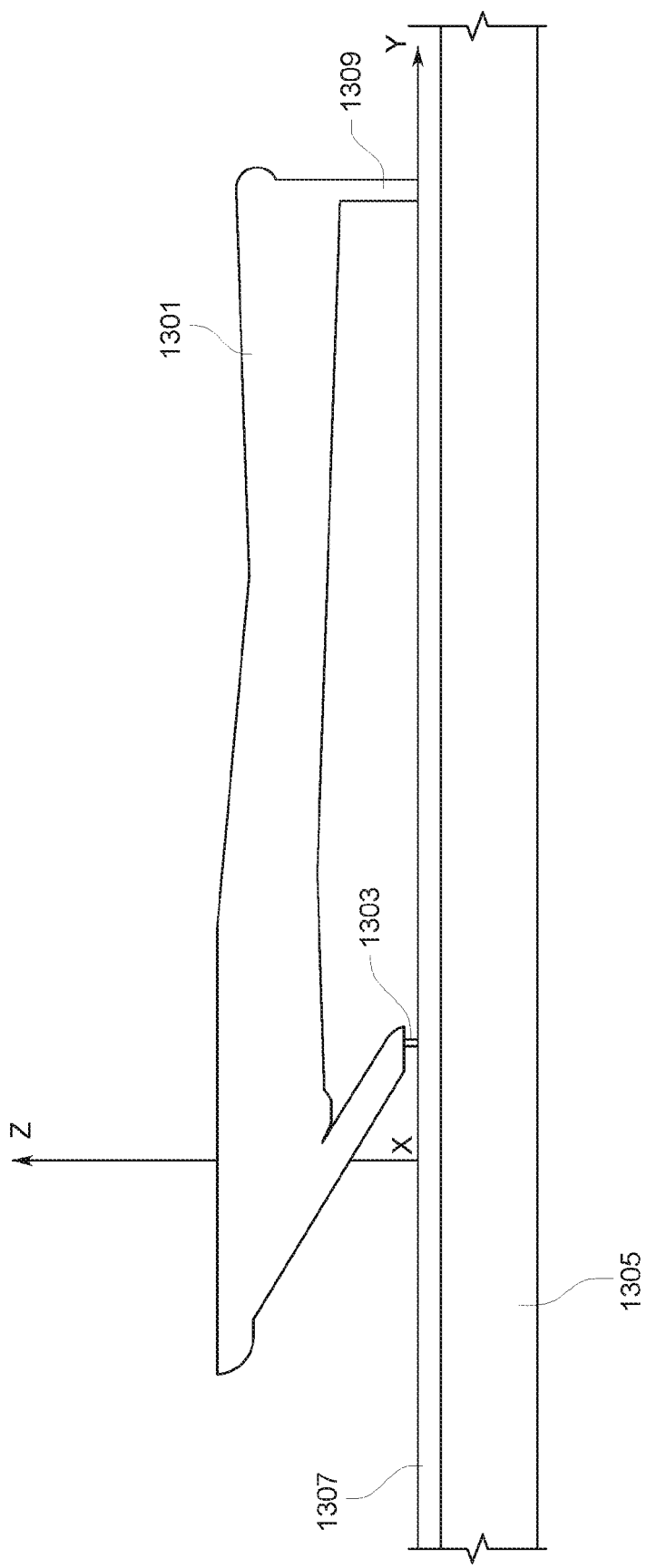

As depicted in FIGS. 13A and 13B, a handle antenna includes a handle-shaped antenna element 1301. FIG. 13A provides a perspective view of a handle antenna including the antenna element and a ground plane 1307 to which the antenna element is attached. FIG. 13B presents a side view in the y-z plane, showing an example profile of a handle-shaped antenna element 1301, along with the ground plane 1307 and a support substrate 1305. The handle-shaped antenna element 1301 may be mechanically mounted on any of various substrates such as various building structures such as architectural elements. In certain embodiments, a handle antenna has an electrically conductive connector for feeding RF signal to the handle-shaped antenna element (e.g., through center conductor of a coaxial cable). See connector 1303 on the bottom left side of the handle antenna element 1301 in FIG. 13B. The electrical energy in antenna element 1301 may travel in a loop or a portion of a loop.

In some implementations, the antenna element (the handle) 1301 sits in front of the ground plane 1307. The ground plane may be, for example, a separate layer that is provided with the antenna element or it may be a conductive part of an architectural element such as a mullion, a beauty cap, or other conductive structure to which the antenna element is mounted. Such ground plane may be connected to a second conductor, which connects to an electrical ground, such as the outer conductor of a coaxial cable. In certain embodiments, the antenna element 1301 connects to ground at one end of the element, e.g., at a connection point 1309.

In some cases, one or more inverted-F antennas are used in the manner of a handle antenna described herein. In fact, in various embodiments, a handle antenna is a form of inverted-F antenna. An inverted-F antenna may have a monopole antenna element oriented substantially parallel to a ground plane. One end of the antenna element is connected to ground, and an intermediate point of the antenna element, located a distance from the grounded end, is fed with an electrical signal. In certain embodiments, the inverted-F antenna is a planar inverted-F antenna. In some cases, the inverted-F antenna is a planar patch inverted-F antenna.

The shape, dimensions, and thickness of handle-shaped antenna element 1301 determine, at least in part, the frequency or frequencies at which the antenna transmits and/or receives electromagnetic radiation, as well as characteristics of the antenna's radiation pattern. Generally, the handle-shaped antenna element 1301 is substantially flat (y-z plane in FIGS. 13A and 13B) and has a non-straight (e.g., wave-like) profile.

In certain embodiments, handle-shaped antenna element 1301 has slots, holes, or other regions of no material (not shown) in the antenna element interior when viewed in the y-z plane of FIG. 13B. These regions, in combination with the outer shape or profile of the handle, may influence antenna parameters such as number and location of frequency bands, widths of such bands, polarization, and intensity distribution (radiation pattern) of the antenna.

The antenna element may be attached to substrate 1305 at one or more additional locations besides connection points 1303 and 1309 depicted in FIG. 13B as desired to ensure that the antenna is securely and robustly mounted to the substrate.

In some implementations, an antenna structure includes multiple handles, each with its own handle profile (and optionally inner hole(s)). Collectively, the handles in such structure provide a multi-frequency antenna. In some cases, the frequency span of a multi-handle antenna is quite large; e.g., about 700 MHz to 30 GHz. As an example, one or more handle antennas may resonate at one or more frequency bands including about 700 MHz, about 900 MHz, about 2.1 GHz, and at one more bands between about 2.4 GHz and 5 GHz.

A handle antenna may be positioned at various locations in or on a building, such as on the building interior or exterior. Given the robust structure of a handle antenna, it may be appropriately affixed on the exterior of a building. In certain embodiments, a handle antenna is disposed on an architectural element; e.g., the antenna is bolted or screwed into an architectural element. In some implementations, a hole is drilled through a mullion to feed a pigtail or other wire/cable from an optically switchable window to a window network. The same hole or a similar hole may be used to affix a handle antenna to a mullion. In fact, such hole in a mullion or other architectural element may be employed to affix any of the antennas described herein to the architectural element. As described above in relation to FIG. 6C, a mullion may have an H-shaped beauty cap having a cavity which can house an antenna. In one example, a handle antenna is in the cavity. To protect and conceal the antenna, the cavity may be filled with a plastic resin or other material that hides the antenna but is transparent to signals received and transmitted by the antenna. Thus the frame or mullion looks like any other, with little or no indication that it houses an antenna.

A handle antenna may be relatively smaller than a trough antenna discussed above. In certain embodiments, a handle antenna is between about 50 and 500 mm (e.g., about 100-300 mm) in its longest dimensions (e.g., the x-direction). In certain embodiments, a handle antenna has a height (z-direction dimension) of about 10 to 400 mm (e.g., about 40-100 mm).

A single handle antenna may be designed to emit or receive one or more frequency bands. To the extent that an antenna structure contains multiple handle-shaped antenna elements of different shapes and/or sizes, the antenna structure may send and/or receive signals at multiple frequencies. In such cases, a handle antenna may support multiple protocols (e.g., 4G and 5G), and a single one of these antenna structures may be used in a room or other service area. As an example, one or more handle antennas may resonate at one or more frequency bands including those centered at about 700 MHz, at about 900 MHz, at about 2.1 GI-z, and at one more bands between about 2.4 GHz and 5 GHz.

In certain embodiments, each of multiple frequency bands is provided by a separate one of the handle-shaped antenna elements. This approach may be appropriate when a single handle antenna is unable to cover frequencies over a sufficiently large range or when different frequency bands are associated with different communications protocols, each of which requires its own transceiver. It may also be appropriate for communications protocols that employ multiple antenna formats such as multiple-input and multiple-output (MIMO) formats used in some cellular communications protocols (e.g., 5G MIMO).

Each of multiple antenna elements may be fabricated from a separate wafer or other substrate, and the thin, flat substrates may be stacked side-by-side. However, the individual handles may have unique profiles and/or sizes and be tuned for different frequencies. In one example, an antenna has at least four different flat handle antenna elements, each of a unique shape and each having a respective frequency band, but each relatively thin (e.g., between about 0.1 and about 2 centimeters thick). Each of these separate elements may be provided side-by-side. Each of the handles may be bonded together so that collectively the handles operate as a monolithic structure.

Slotted Coaxial Antenna

Figure 14A:
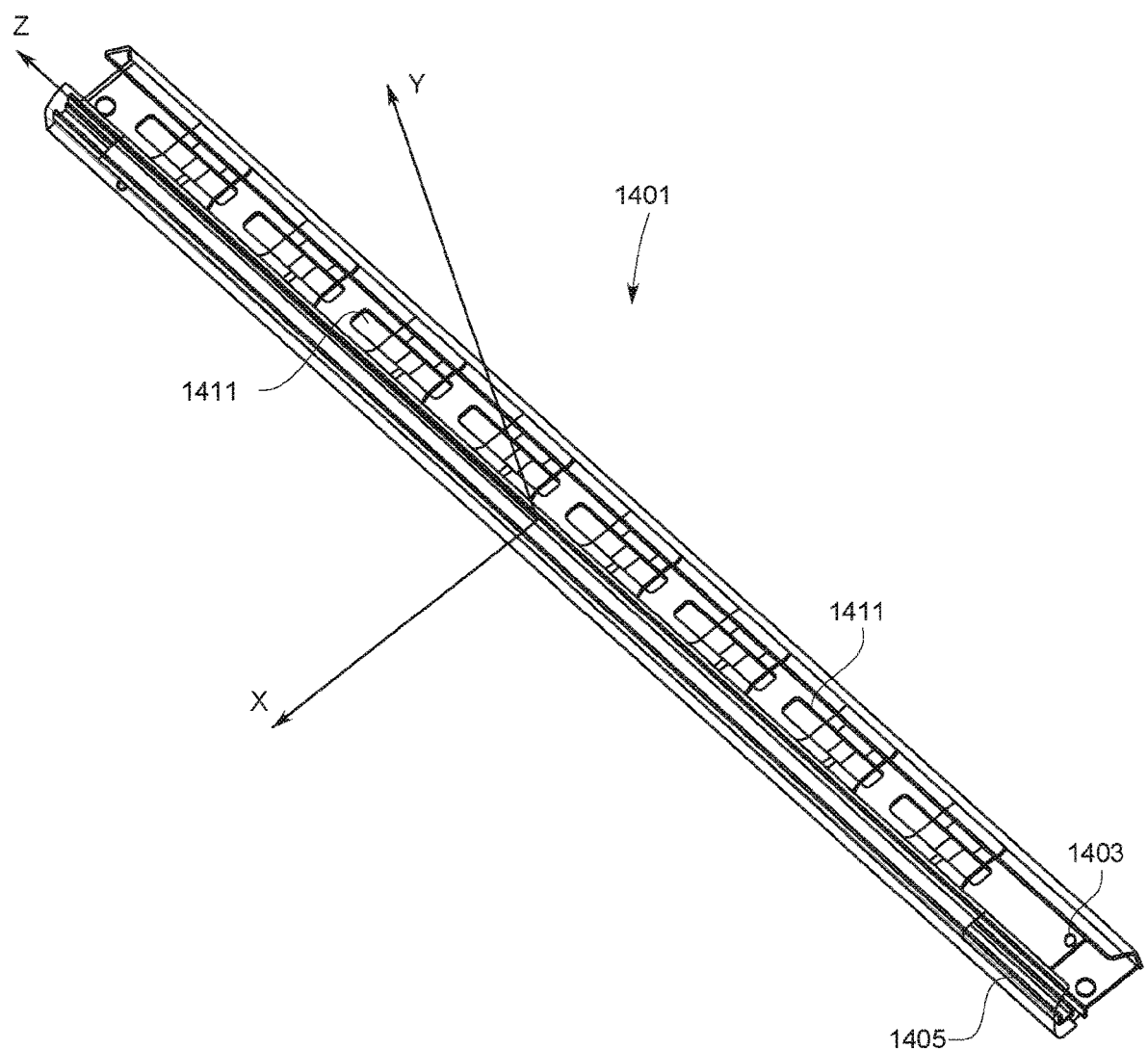
FIGS. 14A and 14B depict an example of a slotted coaxial antenna that includes a printed circuit board or similar substantially planar structure and a shell made from or including a conductive material.
Figure 14B:
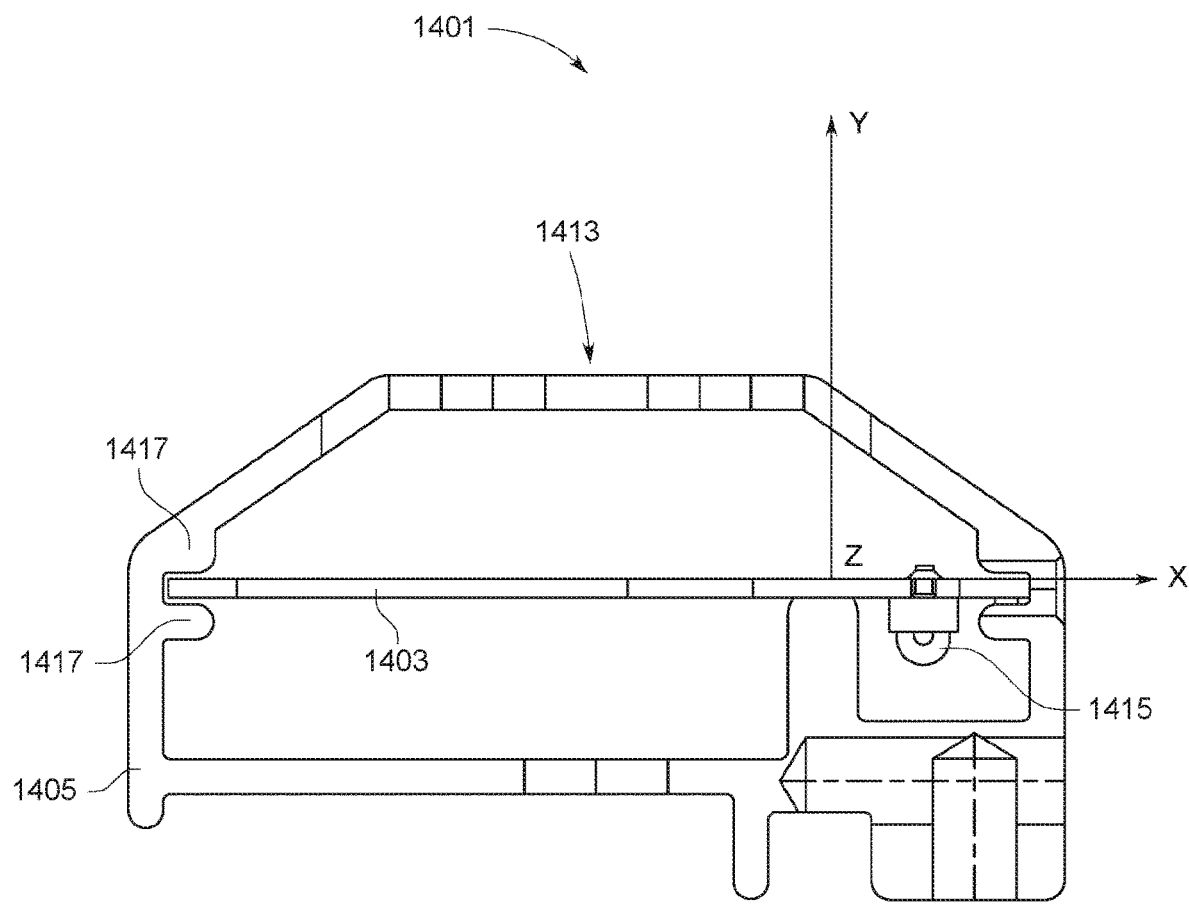

As depicted in FIGS. 14A and 14B, a slotted coaxial antenna 1401 includes a printed circuit board or similar substantially planar structure 1403 and a shell 1405 made from or including a conductive material. FIG. 14A provides a perspective view of a slotted coaxial antenna including the structure 1403 and the shell 1405. FIG. 14B presents a side view in the x-y plane, also showing the planar structurer 1403 and the shell 1405. In certain embodiments, a slotted coaxial antenna 1401 has an electrically conductive connector 1415 for feeding RF signal to the planar structure 1403 (e.g., through center conductor of a coaxial cable).

As mentioned, element 1403 may be implemented as a printed circuit board or other substantially planar structure. It may include a single conductive layer or two conductive lavers separated by a dielectric layer. The combination of the planar structure 1403 and the surrounding shell 1405 may effectively form a waveguide; in some ways the planar structure 1403 and the shell 1405 may serve the functions of the inner and outer conductors of a coaxial cable. In various embodiments, planar element 1403 has various slots that serve to tune the properties of radiation emitted from the element.

In certain embodiments, the element 1403 contains two substantially planar conductive layers. The separation of the conductive layers and the cross-sections of those layers can be adjusted to provide specific impedances. Both of these layers may be patterned. However, typically there is a single electrical feed to element 1403. The feed may be divided and provided to, e.g., conductive elements associated with each of the slots in element 1403.

As shown, the circuit board 1403 has slots 1411 that serve to tune the power distribution. Different locations and sizes and shapes of the slots tune the frequency distribution, polarization, and shape of the power distribution in the emitted radiation. For example, the individual feeds and emitted power from the regions adjacent slots 1411 may combine in phase to produce the desired shape of the emitted radiation. In certain embodiments, the slots 1411 are separated from one another by a distance corresponding to a wavelength (or a half wavelength) of the emitted or received radiation.

As shown in FIGS. 14A and 14B, the shell at least partially encircles the substantially planar structure 1403 and has openings or slots 1413 that emit or receive radiation outward from the antenna during operation. Further, as shown, the shell 1405 may also have ridges 1417 (defining a groove) for holding the substantially planar structure 1403.

In certain embodiments, the emitted (or received) signal from a slotted coaxial antenna has a fan shape. However, the actual radiation pattern produced by any given slotted coaxial antenna is controlled by the slot design and the separation of the slots in the conductor in the printed circuit board and the shell. Depending on the orientation of the antenna as mounted, the signal may be horizontally or vertically oriented.

A slotted coaxial antenna may be relatively smaller than a trough antenna discussed above. In certain embodiments, a slotted coaxial antenna is between about 100 and 1000 mm (e.g., about 300-800 mm) in its longest dimensions.

Slotted coaxial antennas may be positioned at various locations inside and/or outside of a building. In one example, a slotted coaxial antenna is disposed on a horizontal mullion, a sill, on the top or bottom of window. In some cases, a slotted coaxial antenna is disposed on a structurer not associated with a window. For example, the antenna may be installed on ceiling tiles, cubicle walls, and the like. In certain embodiments, a slotted coaxial antenna is provided in a horizontal orientation at a relatively high elevation in a room (e.g., about two meters or higher above a floor) but rotated to have a down-focused beam pattern. This focuses the wireless signals in a region where building occupants can make use of them. In certain implementations, a horizontally oriented, down-focused slotted coaxial antenna is part of or installed in a digital architectural element such as a horizontal digital mullion. When oriented horizontally, a slotted coaxial cable may be configured to produce a horizontally polarized signal.

In certain embodiments, the shell 1405 serves as all or part of a building architectural element such as a mullion, a transom, a digital architectural element casing, etc. For example, a portion of the hollow conductive structure of a mullion may serve as the shell.

Given the potentially compact size of this antenna, many of them may be disposed at locations throughout a room or other region of a building, where they each provide short range coverage, but collectively they blanket a wide area. In some implementations, slotted coaxial antennas are provided with transceivers that produce signals of a limited range; e.g., the signal effectively propagates only a limited distance such as about ten meters or shorter. Such limited range transceivers have the benefit of not being subject to certain regulatory requirements such as those promulgated by the US Federal Communications Commission.

In one embodiment, multiple slotted coaxial antennas are disposed on cubicle walls or other work area structures in an office space. The collective effect of the antennas is to blanket the work area with coverage but With insufficient range that the signals radiate out of the building or, in some instances, even out of a room.

In some cases, the mounted slotted coaxial antennas are oriented horizontally but angled up or down by a small amount (e.g., about +/−10 degrees). This may help produce fan-shaped radiation pattern that blankets areas where occupants are expected to reside. For example, if the antennas are mounted at an elevation that is greater than the height of most humans, the antennas may be oriented to direct the radiation downward by a few degrees from the horizontal.

In certain embodiments, a slotted coaxial antenna is configured to transmit and/or receive a single frequency band or a broadband signal.

Microstrip Patch Antenna

Figure 15A:
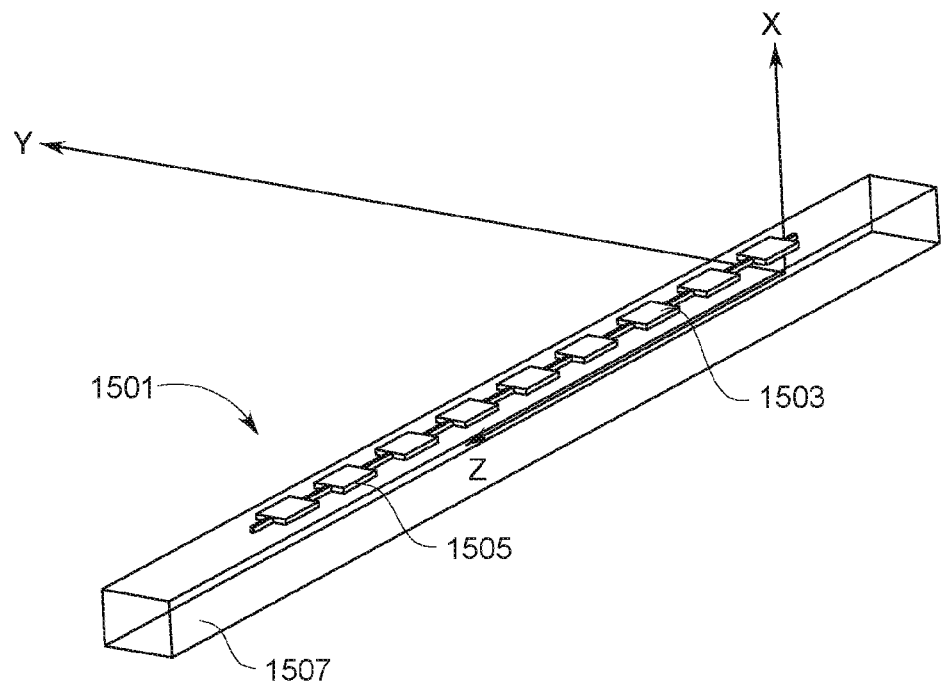
FIGS. 15A and 15B depict an example of a microstrip patch antenna that may be employed in buildings.
Figure 15B:
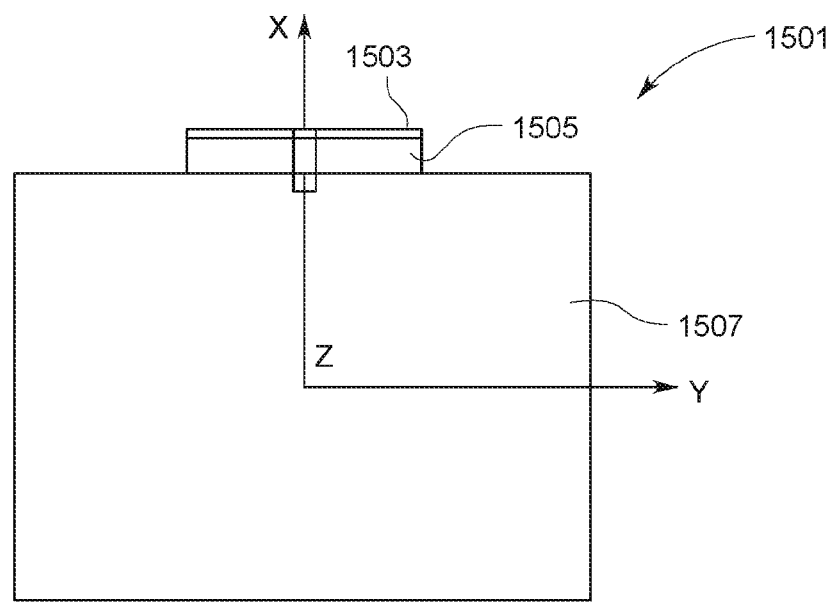

A microstrip patch antenna may be employed in some buildings. An example of such antenna is depicted in FIGS. 15A and 15B. The antenna element of a microstrip patch antenna may be a thin metal such as a foil (e.g., about 2 mm thick or thinner) on a dielectric substrate such as a thin plastic substrate. This structure does not necessarily include a ground plane. However, when the dielectric substrate is adhered to or otherwise affixed to a conductive and grounded structure such as a mullion or a beauty plate, it can serve as an antenna.

The antenna element conductive structure may have various configurations such monopole, dipole, and various patch antenna configurations such as those described in PCT Published Patent Application PCT/US17/31106, filed May 4, 2017 (Publication No. 2017192881), incorporated herein by reference in its entirety.

In certain embodiments, the dielectric on which the antenna element of the microstrip antenna is mounted is relatively resistant to UV radiation and other weathering effects. In certain embodiments, the metal strip placed on top of the dielectric is relatively thick (e.g., 1 mm or greater) so that it does not easily wear away when exposed to UV and other ambient conditions for long periods of time. In some cases, the dielectric material is cut away in some or all regions outside the metal used in the antenna element.

As shown in FIGS. 15A and 15B, a microstrip patch antenna 1501 may include a substantially flat, conductive antenna element 1503 and a dielectric substrate 1505. FIG. 15A is perspective illustration and FIG. 15B is a cross-sectional illustration in the x-y plane of microstrip patch antenna 1501 mounted on a structural element or installation 1507. In certain embodiments, element 1507 is a conductive structure such as a beauty cap that is connected to ground, and thereby may serve as a ground plane for antenna element 1503. In certain embodiments, antenna element 1503 is a stamped piece of metal. The antenna element 1503 may be an appropriate conductive material such as copper, aluminum, steel, etc. In certain embodiments, the rectangles or other relatively larger connected portions of the antenna element are separated from one another by approximately the wavelength or half wavelength of the radiation to be emitted or received.

A microstrip patch antenna may be relatively smaller than a trough antenna discussed above. In certain embodiments, a microstrip patch antenna is between about 100 and 1000 mm (e.g., about 300-800 mm) in its longest dimensions.

In some cases, a microstrip patch antenna is configured to stick on or otherwise adhere to a building element such as the surface of a mullion, a beauty cap, or digital architectural element. Because, a microstrip patch antenna can simply adhere to a conductive structure, there may be no need to drill a hole or otherwise modify the building element to which the antenna adheres. The microstrip patch antenna may also be sufficiently small and/or inconspicuous such that it need not be hidden when applied to a structural element or installation. In some embodiments, a microstrip patch antenna is embedded in a trough, which is either designed for the antenna or forms part of a building installation or structural element such as a beauty cap. In some cases, a microstrip patch antenna is vertically oriented on a building structural element or installation such as an IGU or a cubicle. In such cases, the antenna may be configured to emit and/or receive vertically polarized electromagnetic radiation. In some cases, a microstrip patch antenna is mounted facing outward, away from a building, as is the case when it is mounted on a beauty cap. In some cases, a microstrip patch antenna is mounted facing inward, toward a building interior, as may be the case when it is mounted a mullion.

As with some other relatively small antennas, some microstrip patch antennas may produce signals of a limited range; e.g., the signal effectively propagates only a limited distance such as about ten meters or shorter.

In certain embodiments, a microstrip patch antenna is mounted in a substantially horizontal orientation (e.g., the y-direction is substantially vertical). In such cases, the antenna may be configured to emit and/or receive vertically polarized radiation.

As with the slotted coaxial antenna, the relatively compact size of the microstrip patch antenna allows many of them to be disposed at locations throughout a room or other region of a building. Although each antenna may provide short range coverage, collectively the antennas may blanket a wide area. For example, a microstrip patch antenna may be provided with transceivers that produce signals of a limited range; e.g., the signal effectively propagates only a limited distance such as about ten meters or shorter, and as such avoid being subject to certain regulatory requirements such as those promulgated by the US Federal Communications Commission.

In some cases, multiple microstrip patch antennas are disposed on cubicle walls or other work area structures in an office space. The collective effect of the antennas is to blanket the work area with coverage but with insufficient range that the signals radiate out of the building or, in some instances, even out of a room.

In some cases, the mounted antennas are oriented horizontally, as described, but angled up or down by a small amount (e.g., about +/−10 degrees).

Self-Organizing Antenna Structures (Configuring and Reconfiguring Antennas and Transceivers)

In certain embodiments, one or more antennas and their associated radios are installed without first assigning a particular protocol, or in some cases, even a frequency band. In some cases, the protocols and/or frequency bands are assigned before, at, or slightly after installation, but the operating power is not yet assigned. During or after installation, the power, and optionally the protocol and/or frequency are set by appropriate programming. A goal of this process may be to test interference and reachability among the individual antennas, and, as appropriate, set power levels to each radio.

In some implementations, a configuring or commissioning system determines the functions and/or operating parameters that particular antennas and associated radios will serve only after they are installed. At that point, the radios are configured to incorporate the desired functions and/or parameters. The functions/parameters are then fixed unless or until some change is required, in which case the radios may be reconfigured.

In certain embodiments, the process takes place in two stages. The initial stage is performed during or after installation, optionally after a discovery phase to determine which of the newly installed antennas have particular reachability based on surrounding communications infrastructure and user loads. Thereafter, during normal operation, as the environment or situations change, the antennas and transceivers may be reconfigured to adapt to changing demands or requirements. For example, if a tree or other feature appears in front of an antenna, the antenna's transceiver power may need to be increased and/or the antenna's role in the network infrastructure reduced or otherwise altered. Still further, if wireless traffic patterns change, even for a short duration, the radio/antenna parameters may be adjusted, albeit temporarily, to accommodate such change.

Logic for performing this self-organization of antennas and their associated radios may be located (and executed) within the building or outside the building. In either case, the logic may be centralized, or may be distributed among multiple processing nodes. In some cases, the logic responsible for self-organizing of antennas/radios is distributed between processing capacity dedicated to one function such as an initial setup or configuration of the antennas and radios and other logic is dedicated for the adjustment or adaptation of the radios for addressing changing circumstances. In certain embodiments, a local (in the building) logic device such as a master network controller is used for this purpose. In other embodiments, a remote (outside the building) logic device or collection of devices is used (e.g., cloud-based resources).

Among the parameters that may be adjusted or set in this process are the frequency of the antenna signal, the power of transmitted antenna signals, and the communications protocol employed. These may be adjusted or set by modifying settings in transmitters and/or receivers employed by the various antennas.

Figure 16:
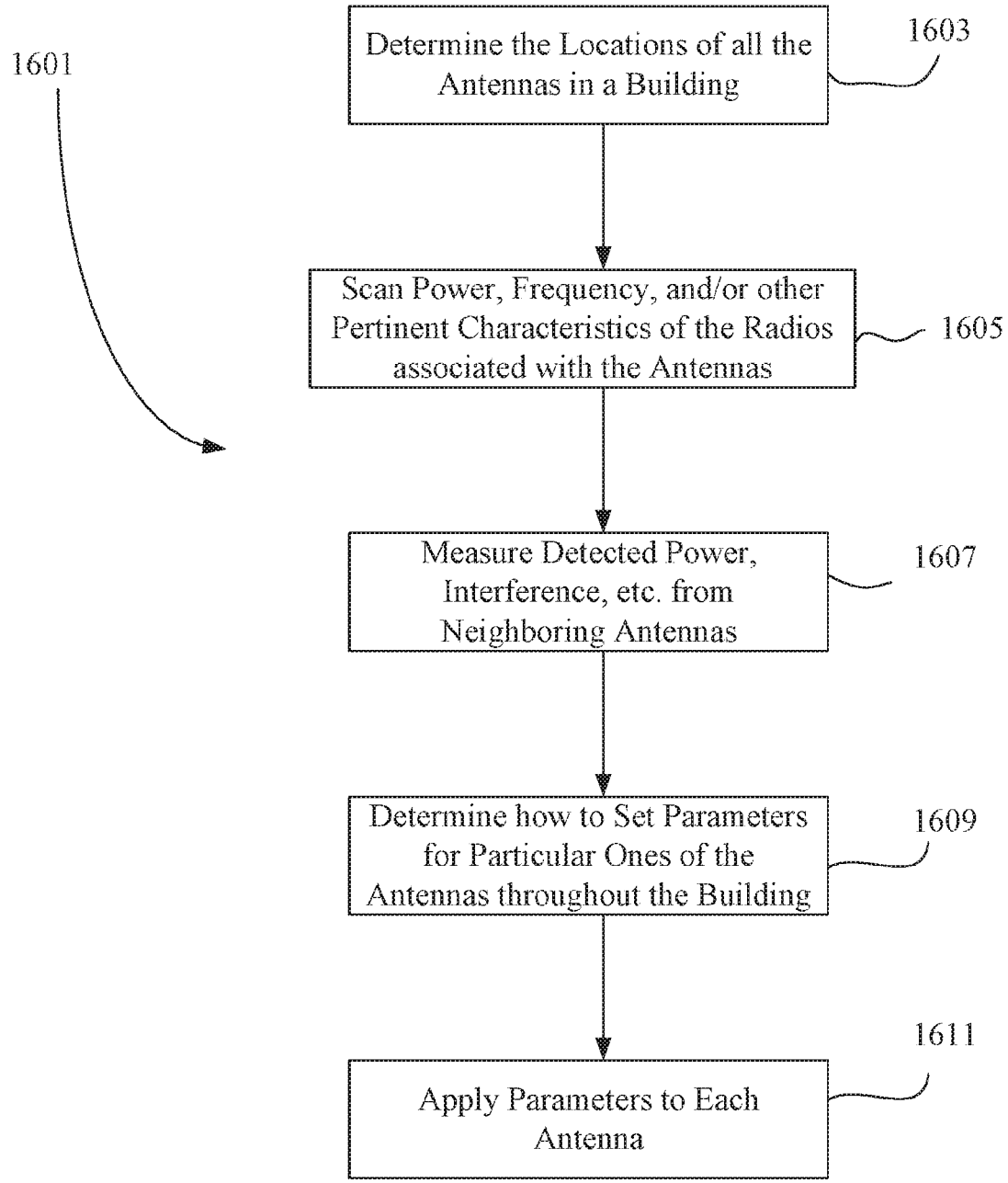
FIG. 16 presents of a flow chart of an antenna configuration process that determines operating parameters for multiple antennas in a building.

In one example, as depicted in the flow chart of FIG. 16, an antenna configuration process 1601 begins with determining the locations of all the antennas in the building and the relevant properties of the antennas in those locations. See block 1603. This is because certain location information may assist in the decision of how to configure the individual antennas. For example, if antennas are on lower floors, they might be more appropriate for communicating with or providing service to cell phone users on a street or plaza outside of and adjacent to the building. By contrast, antennas on the upper floors of billing may be more appropriate for providing service associate with that of a cell tower and for communicating with other distant communication nodes on a cellular network. In certain embodiments, locating antennas is performed in a manner similar to window or window controller commissioning such as is described in U.S. patent application Ser. No. 15/727,258, filed Oct. 6, 2017, and incorporated herein by reference in its entirety. In some implementations, the exact location of some or all of the antennas need not be known or determined.

As a next step, antennas are powered on and scanned across frequencies that are available to them in order to determine which other cellular or other wireless nodes on the network they can communicate with. See blocks 1605 and 1607. The scanning is optionally conducted on an antenna-by-antenna basis. For example, each antenna/radio is scanned sequentially (block 1605), and the neighboring antennas/radios report on the interference of their transmitted and/or received signals as a function of power (or other parameter adjustment in neighboring antennas) (block 1607).

With information about locations and the abilities of the individual antennas to handle particular cellular or other wireless network requirements, the system determines how to set parameters for particular ones of the individual radios throughout the building. See block 1609. With this in mind, the system may now be configured to decide which radios should be given which parameters, e.g., which radios should transmit and receive at which frequencies, and at what power levels. With the appropriate parameters determined, the configuring system applies those parameters. See block 1611.

Optionally, during operation of the network/communications infrastructure, the system listens or monitors operation of the network, administrative decisions, and/or usage patterns that merit reconfiguring the antenna for a particular application such as providing additional capacity or coverage for certain users. For example, if many users suddenly appear on a street corner near the building such as during a protest or celebration, the system can deploy additional capacity to handle the new demands on the cellular or other wireless infrastructure. The changing conditions may be detected in various ways such as by a newsfeed, rescanning of the antennas periodically to see where they can connect to, detecting power or other performance degradation, and the like.

In some cases, a schedule is employed for rescanning or otherwise checking the characteristics of the antennas. As example, such schedule may check characteristics every day, week, month, year, etc. If any conditions are detected that suggest a different setting, the system may adjust parameters of one or more antennas. Note that the scanning and resetting operations might be performed initially using one type of computational infrastructure while later operations are performed using a different computational infrastructure.

In certain embodiments, a radio/antenna self-organizing process is employed in a building having at least about ten installed radios/antennas to configure. In certain embodiments, such process is employed in a building having at least about fifty or at least about one hundred installed radios/antennas to configure.

For example, a typical floor of a typical high rise building may have approximately 200 windows and approximately 100 mullions, many or all of which may have a mounted antenna with an associated radio. With this many antennas and concomitant potential for interference, the radios may be tuned to ensure effective transfer of wireless connection (e.g., cell phone or Wi-Fi signral) as users move through the building. A self-organizing network is designed so that the individual radios are properly configured to provide orderly handoffs; i.e., they provide good coverage in the building but without interfering with one another.

In certain embodiments, most or all radios are SDRs (software definable radios), which may be components of vRANs. A vRAN includes an application processor in front of an SDR. SDRs may have a wide spectral band available, e.g., about 20 MHz to 6 GHz. In some cases, an SDR supports any protocol at any frequency band between 20 MHz and 6 GHz.

In some implementations, vRANs include two primary components, a Head End (HE) and a number of remote software definable radio units (RRUs) fed by the HE. In certain embodiments, the HE is implemented in one or more control panels such as control panel 917 shown in FIG. 9 and the RRUs are implemented in digital architectural elements such as elements 923 also shown in FIG. 9. In certain embodiments, the data is delivered from a control panel to RRUs on coaxial cables implemented via the MoCA standard.

However, other implementations may be employed such as systems in which one or more of the RRUs are standalone units that are not integrated with sensors, etc. And in some implementations, the HE is implemented in a remote site or even over the internet, e.g., via cloud resources.

Figure 17A:
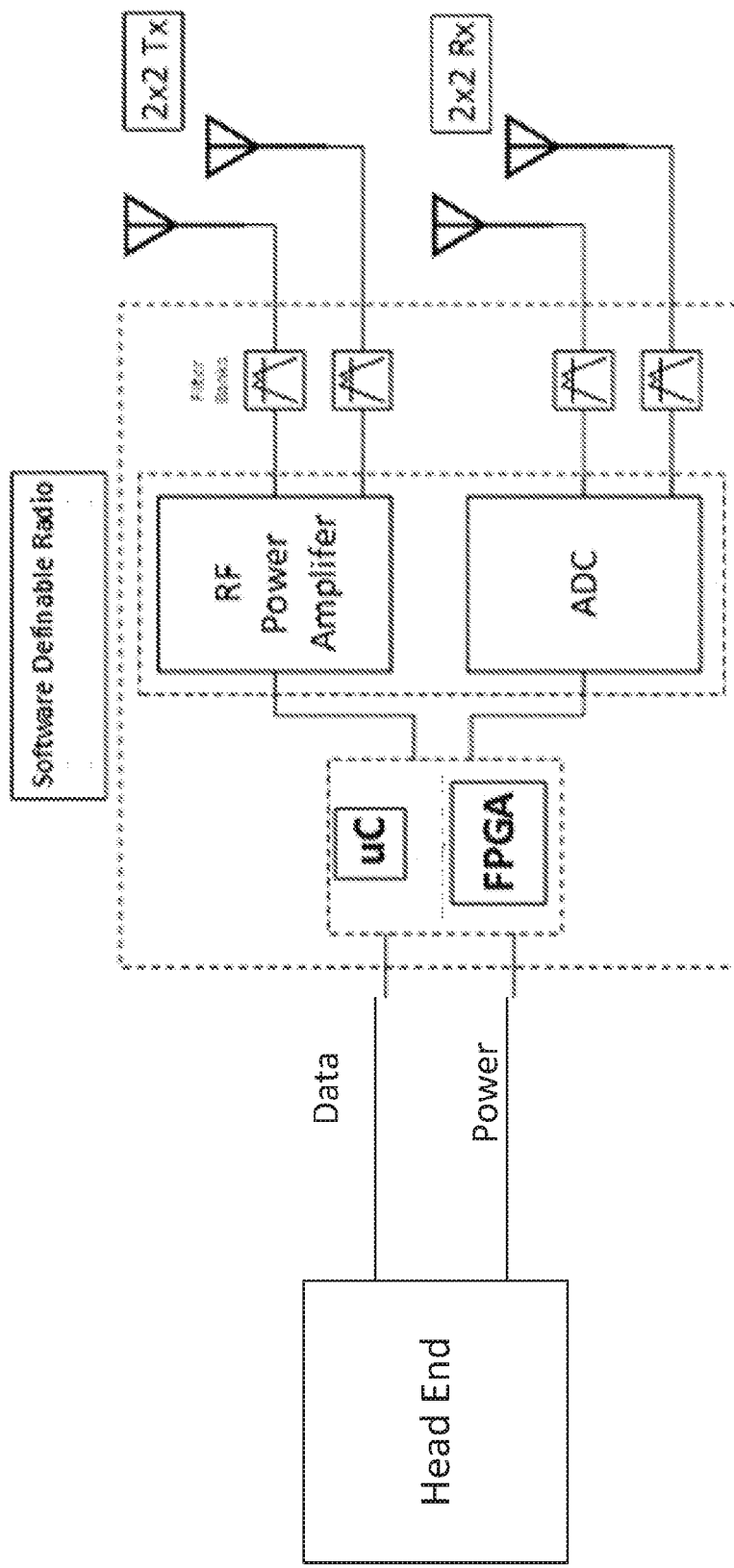
FIG. 17A presents a block diagram of an example software-definable radio that may be employed in certain embodiments.

FIG. 17A is a block diagram of an example SDR/RRU. In this diagram, data and power are provided from a HE to a board or other component having a microcontroller and a programmable logic device (e.g., an FPGA) or other high performance processor. This component stores operating parameters that define the RRU's operating properties (e.g., the radio's protocol, frequency band, modulation mode, and transmission power). It also executes software instructions for operating the radio for the associated data transmission. In certain embodiments, an FPGA or other processor is configured with a real time operating system to process live data. It may be configured with the transmitter ID, specific frequency, channel bandwidth, modulation, power, etc. The FPGA may be built from licensable TP blocks, like an ARM A53 core for the RF processor and an ARM A9 application core for managing the RF section. In one example, the processor is an FPGA such as a ZYNQ 7045 available from Xilinx, Inc. of San Jose Calif.

The SDR may also include a radio chip including an RF power amplifier and an analog-to-digital converter. One example of a suitable radio chip is the AD9361 available from Analog Devices, Inc. of Norwood, Mass. One example of a suitable complete RRU is the USRP E320 available from Ettus Research of Santa Clara, Calif.

Figure 17B:
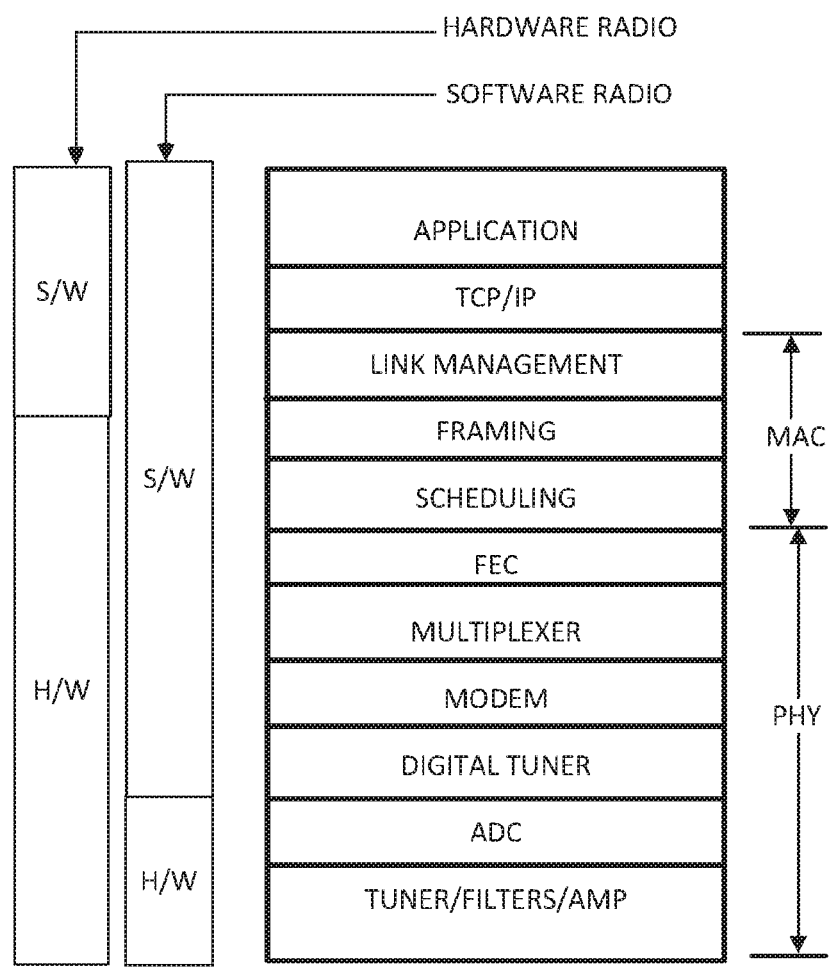
FIG. 17B presents a comparison of the network stacks for a conventional hardware radio and a software-definable radio.

FIG. 17B shows an example stack for radios used for data transmission. As shown, many functions in the middle of the stack are implemented in hardware for hardware based radios, while those same functions may be implemented in software for SDRs. The software component of the SDR may employ an open source product such as GNU Radio, or non-open source software such as the "Titanium Cloud" available from Wind River Systems, Inc. of Alameda, Calif.

An example sequence for a self-organizing radio characteristics process follows. Assume that some or all radios on a floor (e.g., there are 100 of them) of a multi-floor building are assigned a particular protocol and frequency band (e.g., CBRS band 48).

1. Turn on all 100 radios on a floor and send instructions to configure all of them according to a particular protocol/band (CBRS, band 48), using the appropriate spectrum allocation, etc. In some embodiments, a field service engineer or an operator in network operations center takes action to instruct the radios that they are to operate in this protocol. In an alternative approach, an automated process chooses the protocols, frequency bands, etc. of the various radios. In certain embodiments, a subset of the antennas is selected for one frequency band and another subset is selected for a different frequency band. In general, both the frequency band and the protocol are chosen for each antenna/radio on the floor. In one example, different radios/antennas are chosen for different cellular protocols; e.g., at a 28 GHz band, some radios are chosen for ATT and others for Verizon.

2. An engineer, an operator, or automated logic sends instructions to the radios to adjust their output power. This may be done in a round robin manner; e.g. sequentially, each radio gradually increases its power to, e.g., 1 mW.

3. Poll each device to determine its signal strength, any interference it experiences vis-à-vis neighboring antennas, etc.

4. Based on 2 and 3, determine which radios to set at which powers (e.g., determine which radios to crank up and which to dial back). As an example, when a first antenna is located in the middle of a floor or the middle of a room and is flanked by two other antennas at approximately 180° apart (adjacent neighbors), operations 2 and 3 may suggest that the first antenna can operate at a relatively high power. However, a second antenna located at the corner of the floor or room, and having adjacent antennas that are at approximately 90° angles, might set the radio for the second antenna at a lower power vis-á-vis the power of radios for adjacent antennas.

Overall, the process may provide a profile of adjacency and signal strength. The power provided by the individual antennas may be optimized on the basis of the principle "speak only as loud as necessary." In some implementations, the exact location of antennas need not be known or determined, only the adjacency.

The process may account for heterogeneous radios, with some operating in one protocol and others operating in one or more other protocols. For example, one in four radios on a floor may be configured to implement CBRS, the remaining three of four radios on the floor may implement 5G cellular, operating at 28 GHz (multiple bands), which are optionally physically connected to an antenna on the exterior of the building (e.g., a donor antenna or a sky sensor). The 5G cellular may be divided among different carriers (e.g., Sprint v. ATT), each having its own subset of antennas. Given that the different radios may operate in different spectral regions, and these different radios may be adjacent one another, they might not interfere with one another, or at least not as significantly as radios operating in the same portion of the spectrum.

As indicated, the radios' configurations may be adjusted to load balance in a way that accounts for occupant usage patterns. The SDR control system for the antennas on a floor or for some other portion of a building may consider traffic patterns as a function of time. At different times, it then tunes bandwidth available to specific ones of its radios by, for example, making more bandwidth available to radios/antennas located where there is greatest need at any particular instant in time.

CONCLUSION

It should be understood that the certain embodiments described herein can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Python using, for example, conventional or object-oriented techniques. The software code may be stored as a series of instructions, or commands on a computer-readable medium, such as a random-access memory (RAM), a read-only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Although the foregoing embodiments have been described in some detail for purposes of clarity of understanding, it will be apparent that certain changes and modifications may be practiced within the scope of the appended claims. It should be noted that there are many alternative ways of implementing the processes, systems, and apparatus of the present embodiments. Additionally, one or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure. Accordingly, the present embodiments are to be considered as illustrative and not restrictive, and the embodiments are not to be limited to the details given herein.

What is claimed is:

1. A data communications network in a building comprising one or more external antennas, wherein:
   at least one of the external antennas is associated with a window, a sky sensor or a digital architectural element and is disposed on a roof or exterior wall of the building;
   the one or more external antennas are coupled to a network infrastructure of the building via one or more data carrying lines and/or wireless links; and
   the network infrastructure comprises the one or more data carrying lines, one or more network switches, and at least one control panel, the at least one control panel being coupled to one or more window controllers configured to control one or more electrically switchable windows.

2. The data communications network according to claim 1, wherein at least one of the external antennas is configured for communication with an external wireless network.

3. The data communications network according to claim 1, wherein the network infrastructure comprises one or more building network antennas and associated radios installed in and/or on the building and configured to provide wireless data connection in an interior of the building and/or adjacent to the building.

4. The data communications network according to claim 3, wherein the radios are configured to provide Wi-Fi, CBRS or cellular wireless data connection in the interior of the building and/or adjacent to the building.

5. The data communications network according to claim 1, wherein the one or more external antennas comprise one or more donor antennas configured for communication with an external cellular network.

6. The data communications network according to claim 1, wherein the at least one control panel is configured to connect to an external cellular network via a backhaul comprising a high speed cable.

7. The data communications network according to claim 1, wherein the one or more data carrying lines of the network infrastructure support data communication at 1 Gb/second or faster.

8. The data communications network according to claim 1, wherein at least one of the external antennas includes a radiating element disposed exterior to the building coupled with an electrical connector disposed in an interior of the building by way of a pass-through arrangement.

9. The data communications network according to claim 8, wherein the pass-through arrangement is configured to provide a weather tight seal between the building interior and the building exterior.

10. The data communications network according to claim 8, wherein the pass-through arrangement includes an electrical coupling between the electrical connector and the radiating element.

11. The data communications network according to claim 10, wherein the electrical connector is configured to connect with the network infrastructure of the building.

12. The data communications network of claim 1, further comprising:
    a plurality of antennas and/or radios distributed in a building; and
    at least one logic device;
    wherein the at least one logic device comprises logic for configuring the plurality of antennas and/or radios by:
    supplying power to the antennas and/or radios;
    varying an operational parameter of at least one of the antennas and/or radios while measuring a signal strength at the other antennas and/or radios as a function of the varied operational parameter; and
    selecting a value of the operational parameter for operation of the at least one of the antennas and/or radios based on the measured signal strength.

13. The system according to claim 12, wherein the logic for configuring the plurality of antennas and/or radios further includes: determining the location of each of the antennas in the building.

14. The system according to claim 12, wherein the operational parameter is an antenna and/or radio protocol, frequency or power.

15. The system according to claim 12, wherein the logic for configuring the plurality of antennas and/or radios includes: assigning antenna and/or radio protocols to the antennas and/or radios prior to varying the operational parameter; and wherein the operational parameter is a frequency or power.

16. The system according to claim 12, wherein the logic further includes:
    sequentially varying an operational parameter of each of the antennas and/or radios while measuring a signal strength at the other antennas and/or radios as a function of the varied parameter; and
    selecting a value of the operational parameter for each of the antennas and/or radios based on the measured signal strength.

17. The system according to claim 12, wherein the at least one logic device is a local logic device or a remote logic device.

18. A method of providing connection to an external wireless network, the method comprising:
    communicating with the external wireless network using one or more external antennas, at least one of the external antennas being associated with a sky sensor or a digital architectural element including a sensor assembly and disposed on a roof or exterior wall of a building; and
    transmitting data between the one or more external antennas and a network infrastructure of the building using one or more data carrying lines and/or wireless links, wherein
    the network infrastructure comprises the one or more data carrying lines, one or more network switches, and at least one control panel, the at least one control panel being coupled to one or more window controllers configured to control one or more electrically switchable windows.

19. The method according to claim 18, wherein the network infrastructure comprises one or more building network antennas and associated radios installed in and/or on the building and the method comprises the one or more building network antennas providing wireless data connection in an interior of the building and/or adjacent to the building.

20. The method according to claim 18, further comprising the at least one control panel communicating with an external cellular network via a backhaul comprising a high speed cable.

21. The method according to claim 18, further comprising the at least one control panel communicating with one or more window controllers to control one or more IGUs.

22. The method of claim 18, further comprising configuring the one or more building network antennas and associated radios by:
  supplying power to the antennas and/or radios;
  varying an operational parameter of at least one of the antennas and/or radios while measuring a signal strength at the other antennas and/or radios as a function of the varied operational parameter; and
  selecting a value of the operational parameter for operation of the at least one of the antennas and/or radios based on the measured signal strength.

23. The method according to claim 22, further comprising determining the location of each of the antennas in the building.

24. The method according to claim 22, wherein the operational parameter is an antenna and/or radio protocol, frequency or power.

25. The method according to claim 22, wherein the method comprises assigning antenna and/or radio protocols to the antennas and/or radios prior to varying the operational parameter, and wherein the operational parameter is a frequency or power.

26. The method according to claim 22, further comprising:
  sequentially varying an operational parameter of each of the antennas and/or radios while measuring a signal strength at the other antennas and/or radios as a function of the varied parameter; and
  selecting a value of the operational parameter for each of the antennas and/or radios based on the measured signal strength.

27. A data communications network in a building comprising one or more antennas internal to the building and one or more antennas external to the building and a wired or wireless coupling between at least one external antenna and at least one internal antenna, wherein:

the at least one external antenna is disposed on a roof or exterior wall of the building and associated with a window, a sky sensor or a digital architectural element and is communicatively coupled with an external cellular network;

the at least one internal antenna is configured to transmit a wireless signal received by the external antenna from the external cellular network to one or more locations internal or proximate to the building; and the data communications network is configured to control wireless coverage to the one or more locations, wherein:

the at least one external antenna is coupled to a network infrastructure of the building via one or more data carrying lines and/or wireless links; and the network infrastructure comprises one or more data carrying lines, one or more network switches, and at least one control panel, the at least one control panel being coupled to one or more window controllers configured to control one or more electrically switchable windows.

28. The data communications network of claim 27, wherein some of the one or more locations are internal to the building and others of the one or more locations are external to the building.

29. The data communications network of claim 27, wherein a plurality of internal antennas are distributed within the building.

30. The data communications network of claim 27, wherein the network infrastructure has a vertical data plane between building floors and a horizontal data plane all within a single floor or multiple contiguous floors.

31. The data communications network of claim 30, wherein the vertical data plane includes multiple control panels and a high capacity data carrying line.

32. The data communications network of claim 27, wherein the building includes at least one rooftop donor antenna and at least one control panel configured to communicate with the external cellular network via a physical electrical or optical line.

33. The data communications network of claim 32, wherein the rooftop donor antenna is configured to provide downlinks into the building to provide wireless service to occupants and/or interior devices.

* * * * *